(12) United States Patent
Jones et al.

(10) Patent No.: US 9,205,375 B2
(45) Date of Patent: Dec. 8, 2015

(54) REMOVING CARBON DIOXIDE FROM WASTE STREAMS THROUGH CO-GENERATION OF CARBONATE AND/OR BICARBONATE MINERALS

(75) Inventors: Joe David Jones, Austin, TX (US); David St. Angelo, Austin, TX (US)

(73) Assignee: SKYONIC CORPORATION, Austin, TX (US)

( * ) Notice: Subject to any disclaimer, the term of this patent is extended or adjusted under 35 U.S.C. 154(b) by 0 days.

(21) Appl. No.: 12/235,482

(22) Filed: Sep. 22, 2008

(65) Prior Publication Data

US 2009/0127127 A1 May 21, 2009

Related U.S. Application Data

(60) Provisional application No. 60/973,948, filed on Sep. 20, 2007, provisional application No. 61/032,802, filed on Feb. 29, 2008, provisional application No. 61/033,298, filed on Mar. 3, 2008.

(51) Int. Cl.
*B01D 53/62* (2006.01)
*B01D 53/73* (2006.01)
(Continued)

(52) U.S. Cl.
CPC ............. *B01D 53/62* (2013.01); *B01D 53/73* (2013.01); *B01D 53/75* (2013.01); *B01D 53/965* (2013.01);
(Continued)

(58) Field of Classification Search
USPC ......... 210/767, 912, 913, 914, 800, 807, 702, 210/704, 705, 719, 721, 723, 724, 749, 757, 210/758
See application file for complete search history.

(56) References Cited

U.S. PATENT DOCUMENTS 2,383,674 A   8/1945   Osborne ................. 422/423
3,082,282 A   3/1963   Gruneberg et al. ....... 429/442
(Continued)

FOREIGN PATENT DOCUMENTS

CA   2 581 157       3/2006
DE   3611655   *    4/1986
(Continued)

OTHER PUBLICATIONS

Search Report, issued by Georgian National Center of Intellectual Property "SAK:ATENT", issued in Georgian Application No. AP 2005 009999, dated Jan. 8, 2010. (English Translation).
(Continued)

*Primary Examiner* — Melvin C Mayes
*Assistant Examiner* — Sheng H Davis
(74) *Attorney, Agent, or Firm* — Norton Rose Fulbright US LLP

(57) ABSTRACT

Apparatuses and methods for removing carbon dioxide and other pollutants including heavy metals from a gas stream are provided. The methods include obtaining a water-condensate from the flue-gas stream; obtaining a chloride salt; admixing the salt with water, steam, or both to produce a solution; electrolyzing the solution to produce a hydroxide and chlorine gas; admixing a portion of the hydroxide with the flue-gas stream to produce carbonate products, bicarbonate products, or a mixture of carbonate and bicarbonate products in an admixture; separating said carbonate and/or bicarbonate products from the admixture, thereby removing carbon dioxide from the flue-gas stream; adding a portion of the hydroxide to the water-condensate to change the pH of the water-condensate from acidic to basic, resulting in precipitation of the heavy metals; and passing the water-condensate through a filtering medium.

8 Claims, 20 Drawing Sheets

(51) Int. Cl.

| | |
|---|---|
| *B01D 53/75* | (2006.01) |
| *B01D 53/96* | (2006.01) |
| *C01B 7/01* | (2006.01) |
| *C01B 7/03* | (2006.01) |
| *C01B 7/04* | (2006.01) |
| *C01B 9/02* | (2006.01) |
| *C01B 11/06* | (2006.01) |
| *C01F 11/24* | (2006.01) |

(52) U.S. Cl.
CPC ... *C01B 7/01* (2013.01); *C01B 7/03* (2013.01); *C01B 7/035* (2013.01); *C01B 7/04* (2013.01); *C01B 9/02* (2013.01); *C01B 11/062* (2013.01); *C01F 11/24* (2013.01); *B01D 2251/304* (2013.01); *B01D 2251/502* (2013.01); *B01D 2251/604* (2013.01); *B01D 2257/302* (2013.01); *B01D 2257/404* (2013.01); *B01D 2257/504* (2013.01); *B01D 2257/602* (2013.01); *Y02C 10/04* (2013.01); *Y02C 10/06* (2013.01); *Y02W 10/37* (2015.05)

(56) References Cited

U.S. PATENT DOCUMENTS

| | | | |
|---|---|---|---|
| 3,801,698 A | 4/1974 | Lowrance et al. | 423/234 |
| 3,855,398 A | 12/1974 | Hoffman et al. | 423/422 |
| 4,032,616 A | 6/1977 | Artur et al. | 423/190 |
| 4,069,117 A | 1/1978 | Cooper | 423/220 |
| 4,108,769 A * | 8/1978 | Krieg et al. | 210/720 |
| 4,128,701 A | 12/1978 | Maricle | 429/21 |
| 4,147,599 A | 4/1979 | O'Leary et al. | 205/482 |
| 4,620,969 A | 11/1986 | Wilkinson | 423/421 |
| 4,720,375 A | 1/1988 | Ainscow et al. | 423/175 |
| 4,749,453 A | 6/1988 | Harris | 204/98 |
| 4,764,286 A | 8/1988 | Bon et al. | 210/757 |
| 5,080,799 A * | 1/1992 | Yan | 210/661 |
| 5,344,617 A | 9/1994 | Johnson | 422/172 |
| 5,888,256 A | 3/1999 | Morrison | 44/552 |
| 6,340,736 B1 | 1/2002 | Coenen et al. | 528/196 |
| 6,375,909 B1* | 4/2002 | Dangtran et al. | 423/235 |
| 6,488,740 B1 | 12/2002 | Patel et al. | 95/71 |
| 6,592,829 B2 | 7/2003 | Chakravarti et al. | 422/171 |
| 6,676,824 B2 | 1/2004 | Urquhart et al. | 205/504 |
| 6,846,584 B2 | 1/2005 | Dutil et al. | 429/19 |
| 6,890,497 B2 | 5/2005 | Rau et al. | 423/220 |
| 6,908,570 B2 | 6/2005 | Green | 252/184 |
| 6,958,136 B2 | 10/2005 | Chandran et al. | 423/235 |
| 7,361,279 B2 | 4/2008 | Hernandez et al. | 210/668 |
| 7,427,449 B2 | 9/2008 | Delaney et al. | 429/19 |
| 7,517,435 B2 | 4/2009 | Guth et al. | 203/47 |
| 7,527,770 B2 | 5/2009 | Monzyk et al. | 422/186.3 |
| 7,595,001 B2 | 9/2009 | Arakel et al. | 210/710 |
| 7,655,069 B2 | 2/2010 | Wright et al. | 95/92 |
| 7,655,193 B1 | 2/2010 | Rau et al. | 422/169 |
| 7,699,909 B2 | 4/2010 | Lackner et al. | 95/236 |
| 7,708,806 B2 | 5/2010 | Wright et al. | 95/139 |
| 7,727,374 B2 | 6/2010 | Jones | 205/508 |
| 7,735,274 B2 | 6/2010 | Constantz et al. | 106/735 |
| 7,744,761 B2 | 6/2010 | Constantz et al. | 210/652 |
| 7,749,476 B2 | 7/2010 | Constantz et al. | 106/668 |
| 7,754,169 B2 | 7/2010 | Constantz et al. | 106/465 |
| 7,833,328 B2 | 11/2010 | Lackner et al. | 96/281 |
| 7,875,163 B2 | 1/2011 | Gilliam et al. | 205/210 |
| 7,887,694 B2 | 2/2011 | Constantz et al. | 423/230 |
| 7,909,911 B2 | 3/2011 | Lackner et al. | 95/51 |
| 7,931,809 B2 | 4/2011 | Constantz et al. | 210/652 |
| 7,947,239 B2 | 5/2011 | Lackner et al. | 423/220 |
| 7,993,432 B2 | 8/2011 | Wright et al. | 95/139 |
| 7,993,500 B2 | 8/2011 | Gilliam et al. | 204/263 |
| 8,062,418 B2 | 11/2011 | Constantz et al. | 106/738 |
| 8,105,558 B2 | 1/2012 | Comrie | 423/210 |
| 8,114,214 B2 | 2/2012 | Constantz et al. | 106/738 |
| 8,114,374 B2 | 2/2012 | Blencoe et al. | 423/432 |
| 8,137,444 B2 | 3/2012 | Farsad et al. | 96/235 |
| 8,137,455 B1 | 3/2012 | Constantz et al. | 106/738 |
| 8,177,909 B2 | 5/2012 | Constantz et al. | 106/738 |
| 8,202,659 B2 | 6/2012 | Coustry et al. | 423/421 |
| 8,535,630 B2 | 9/2013 | Wen et al. | 423/220 |
| 8,673,256 B2 | 3/2014 | Blencoe et al. | 423/419.1 |
| 2002/0129450 A1 | 9/2002 | Kim | 8/115 |
| 2003/0219371 A1 | 11/2003 | Amendola | 423/351 |
| 2004/0051080 A1 | 3/2004 | Ernst et al. | 423/438 |
| 2004/0089841 A1 | 5/2004 | Green | 252/182.32 |
| 2004/0096384 A1 | 5/2004 | Echigo et al. | 423/247 |
| 2004/0178149 A1* | 9/2004 | Hernandez et al. | 210/688 |
| 2004/0213705 A1 | 10/2004 | Blencoe et al. | 422/129 |
| 2004/0219090 A1 | 11/2004 | Dziedzic et al. | 423/437.1 |
| 2004/0265202 A1 | 12/2004 | Chandran et al. | 423/239.1 |
| 2005/0002847 A1 | 1/2005 | Maroto-Valer et al. | 423/432 |
| 2005/0011770 A1 | 1/2005 | Katsuyoshi et al. | 205/742 |
| 2005/0013750 A1 | 1/2005 | Monykz et al. | 422/186.3 |
| 2005/0031522 A1 | 2/2005 | Delaney et al. | 423/419.1 |
| 2006/0051274 A1 | 3/2006 | Wright et al. | 423/220 |
| 2006/0076228 A1* | 4/2006 | Guth et al. | 203/47 |
| 2006/0185985 A1* | 8/2006 | Jones | 205/508 |
| 2006/0186562 A1 | 8/2006 | Wright et al. | 261/94 |
| 2006/0289003 A1 | 12/2006 | Lackner et al. | 128/200.4 |
| 2007/0187247 A1 | 8/2007 | Lackner et al. | 204/518 |
| 2008/0031801 A1 | 2/2008 | Lackner et al. | 423/438 |
| 2008/0087165 A1 | 4/2008 | Wright et al. | 95/51 |
| 2008/0138265 A1 | 6/2008 | Lackner et al. | 423/224 |
| 2008/0245660 A1 | 10/2008 | Little et al. | 204/242 |
| 2008/0245672 A1 | 10/2008 | Little et al. | 205/555 |
| 2008/0248350 A1 | 10/2008 | Little et al. | 429/21 |
| 2009/0001020 A1 | 1/2009 | Constantz et al. | 210/652 |
| 2009/0010827 A1 | 1/2009 | Geerlings et al. | 423/164 |
| 2009/0020044 A1 | 1/2009 | Constantz et al. | 106/738 |
| 2009/0074656 A1 | 3/2009 | Billings | 423/648.1 |
| 2009/0081096 A1 | 3/2009 | Pellegrin | 423/232 |
| 2009/0101008 A1 | 4/2009 | Lackner et al. | 423/224 |
| 2009/0101050 A1 | 4/2009 | Lackner et al. | 110/216 |
| 2009/0120288 A1 | 5/2009 | Lackner et al. | 95/68 |
| 2009/0127127 A1 | 5/2009 | Jones | 205/464 |
| 2009/0169452 A1 | 7/2009 | Constantz et al. | 423/230 |
| 2009/0202413 A1 | 8/2009 | Saxena | 423/277 |
| 2009/0232861 A1 | 9/2009 | Wright et al. | 424/405 |
| 2009/0294366 A1 | 12/2009 | Wright et al. | 210/683 |
| 2009/0320688 A1 | 12/2009 | Lackner et al. | 96/257 |
| 2010/0051859 A1 | 3/2010 | House et al. | 252/182.32 |
| 2010/0092368 A1 | 4/2010 | Neumann et al. | 423/437.1 |
| 2010/0095842 A1 | 4/2010 | Lackner et al. | 95/107 |
| 2010/0105126 A1 | 4/2010 | Wright et al. | 435/257.1 |
| 2010/0116137 A1 | 5/2010 | Wright et al. | 95/150 |
| 2010/0202937 A1 | 8/2010 | Lackner et al. | 422/187 |
| 2011/0027142 A1 | 2/2011 | Wright et al. | 422/187 |
| 2011/0027143 A1 | 2/2011 | Wright et al. | 422/187 |
| 2011/0027157 A1 | 2/2011 | Wright et al. | 423/230 |
| 2011/0033357 A1 | 2/2011 | Wright et al. | 423/230 |
| 2011/0033358 A1 | 2/2011 | Wright et al. | 423/230 |
| 2011/0056382 A1 | 3/2011 | Lackner et al. | 96/329 |
| 2011/0079144 A1 | 4/2011 | Wright et al. | 95/54 |
| 2011/0079146 A1 | 4/2011 | Wright et al. | 95/92 |
| 2011/0079147 A1 | 4/2011 | Wright et al. | 95/92 |
| 2011/0079149 A1 | 4/2011 | Wright et al. | 96/143 |
| 2011/0079150 A1 | 4/2011 | Wright et al. | 96/143 |
| 2011/0081709 A1 | 4/2011 | Wright et al. | 435/257.1 |
| 2011/0081710 A1 | 4/2011 | Wright et al. | 435/257.1 |
| 2011/0081712 A1 | 4/2011 | Wright et al. | 435/296.1 |
| 2011/0083554 A1 | 4/2011 | Wright et al. | 95/92 |
| 2011/0091955 A1 | 4/2011 | Constantz et al. | 435/168 |
| 2011/0135551 A1 | 6/2011 | House et al. | 423/234 |
| 2014/0147351 A1 | 5/2014 | Blencoe et al. | 423/419.1 |

FOREIGN PATENT DOCUMENTS

| | | |
|---|---|---|
| DE | 19631794 | 8/1997 |
| EP | 2070578 | 6/2009 |
| FR | 002731422 | * 9/1996 |
| GB | 1536767 | 4/1979 |
| GB | 2460910 | 6/2010 |
| GE | 1999-1612 | 4/1999 |
| GE | 2001-2514 | 8/2001 |

(56) References Cited

FOREIGN PATENT DOCUMENTS

| | | |
|---|---|---|
| GE | 2004-3357 | 10/2004 |
| JP | 51-023499 | 2/1976 |
| JP | 52085997 | 7/1977 |
| JP | 61-048587 | 3/1986 |
| JP | 10-001307 | 1/1998 |
| JP | A H10-15551 | 1/1998 |
| JP | A 2000-279756 | 10/2000 |
| JP | 2002-293537 | 10/2002 |
| JP | 2004174369 | 6/2004 |
| JP | 2006088095 | * 9/2004 |
| JP | 2004-352587 | 12/2004 |
| JP | A 2006-137620 | 6/2006 |
| KR | 1985-0001577 | 10/1985 |
| RU | 2 019 271 | 9/1994 |
| RU | 2 031 695 | 3/1995 |
| RU | 2054959 | 2/1996 |
| RU | 2199374 | 2/2003 |
| RU | 2334547 | 8/2005 |
| WO | WO 2004037391 | 5/2004 |
| WO | WO 2005/108291 | 11/2005 |
| WO | WO 2005/108297 | 11/2005 |
| WO | WO 2006/009600 | 1/2006 |
| WO | WO 2006/023743 | 3/2006 |
| WO | WO 2006/034339 | 3/2006 |
| WO | WO 2006/036396 | 4/2006 |
| WO | WO 2006/084008 | 8/2006 |
| WO | WO 2006/113673 | 10/2006 |
| WO | WO 2007/016271 | 2/2007 |
| WO | WO 2007/018558 | 2/2007 |
| WO | WO 2007/003013 | 11/2007 |
| WO | WO 2008/018928 | 2/2008 |
| WO | WO 2008/042919 | 4/2008 |
| WO | WO 2008/061210 | 5/2008 |
| WO | WO 2008/124538 | 10/2008 |
| WO | WO 2008/131132 | 10/2008 |
| WO | WO 2009/039445 | 3/2009 |
| WO | WO 2009/061836 | 5/2009 |
| WO | WO 2009/086460 | 7/2009 |
| WO | WO 2009/102816 | 8/2009 |
| WO | WO 2009/105566 | 8/2009 |
| WO | WO 2009/149292 | 12/2009 |
| WO | WO 2010/019600 | 2/2010 |
| WO | WO 2010/022399 | 2/2010 |
| WO | WO 2010/132395 | 11/2010 |
| WO | WO 2011/011740 | 1/2011 |

OTHER PUBLICATIONS

Invitation to Pay Additional Fees issued in PCT International Application No. PCT/US2008-077122, dated Mar. 4, 2009.
Presentation given to President's Council of Advisors on Science and Technology on Sep. 20, 2005.
Office Action in Japanese Patent Application 2007-533607 dated Oct. 4, 2010 (English translation included).
Office Communication issued in Japanese Patent Application No. 2010-526027, dated Jul. 26, 2012.
Office Communication issued in Japanese Patent Application No. 2010-184832, dated Sep. 12, 2012. (English translation).
Office Communication issued in Korean Patent Application No. 10-2010-7020491, dated Jun. 14, 2012. (English translation).
Office Communication, issued in Canadian Patent Application No. 2,716,016, mailed on Feb. 8, 2012.
Search Report and Office Action issued in Taiwanese Patent Application No. 099137495, dated Apr. 25, 2013.
Air and Gas Duct Structural Design Committee of the Energy Division of the Air and Gas Structural Design Committee. *The Structural Design of Air and Gas Ducts for Power Stations and Industrial Boiler Applications*. Ronald L. Schneider, chmn. New York, NY: ASCE Publications, Aug. 1, 1995. pp. 11-15.
Cadmium Chloride, Material Safety Data Sheet, CAS No. 7790-78-5, ESPI Metals, available on the internet at http://www.espimetals.com/index.php/msds/460-cadmium-chloride. Revised/Verified Sep. 2005. Accessed Dec. 28, 2011.
Calcium Nitrate Tetrahydrate, Material Safety Data Sheet, CAS No. 13477-34-4, available on the internet at http://avogadro.chem.iastate.edu/MSDS/Ca%28NO3%292-4H2O.htm. MSDS Creation Date: Jan. 21, 1998. Revision #4 Date: Oct. 3, 2005. Accessed Dec. 28, 2011.
Cobalt Iodide, Material Safety Data Sheet, CAS No. 45238-00-3, ESPI Metals, available on the internet at http://www.espimetals.com/index.php/msds/527-cobalt-iodide. Revised/Verified Dec. 2004. Accessed Dec. 28, 2011.
Cobalt(II) Sulfate Heptahydrate, Material Safety Data Sheet, CAS No. 10026-24-1, Chemical Book, available on the internet at http://www.chemicalbook.com/ProductMSDSDetailCB0323842_EN.htm. Copyright 2008. Accessed Dec. 28, 2011.
Goldberg et al., "CO2 mineral sequestration studies in US," *Proceedings of First National Conference on Carbon Sequestration*, May 14-17, 2001, Washington, DC., section 6c, United States Department of Energy, National Energy Technology Laboratory. available at: http://www.netl.doe.gov/publications/proceedings/01/carbon_seq/6c1.pdf.
Kelley, "Energy requirements and equilibria in the dehydration, hydrolysis, and decomposition of magnesium chloride", Technical Paper 676, United States Government Printing Office, pp. 1-26, 1945.
Kirk-Othmer Encyclopedia of Chemical Technology, $4^{th}$ ed. vol. 15 p. 343, 1998, New York: John Wiley and Sons.
Kirsh et al., "Kinetic analysis of thermal dehydration and hydrolysis of $MgCl_2.6H_2O$ by DTA and TG," *Journal of Thermal Analysis*, 32:393-408, 1987.
Lackner et al., "Magnesite disposal of carbon dioxide," submitted to $22^{nd}$ International Technical Conference on Coal Utilization and Fuel System, Clearwater, Florida, Mar. 16-19, 1997.
Lithium Bromide, Material Safety Data Sheet, CAS No. 7550-35-8, ChemCas, available on the internet at http://www.chemcas.com/material/cas/archive/7550-35-8_v1.asp. Material Safety Data Sheet Creation Date: Jun. 29, 1999. Revision #3 Date: Mar. 18, 2003. Accessed Dec. 28, 2011.
Magnesium Nitrate Hexahydrate, Material Safety Data Sheet, CAS No. 13446-18-9, available on the internet at http://avogadro.chem.iastate.edu/MSDS/MgNO3-6H2O.htm. Material Safety Data Sheet Creation Date: Sep. 2, 1997. Revision #6 Date: Aug. 11, 2004. Accessed Dec. 28, 2011.
Manganese (II) Chloride Tetrahydrate, Material Safety Data Sheet, CAS No. 13446-34-9, available on the internet at http://avogadro.chem.iastate.edu/MSDS/MnC12.htm. Material Safety Data Sheet Creation Date: Dec. 12, 1997. Revision #2 Date: Mar. 18, 2003. Accessed Dec. 28, 2011.
Office Communication issued in Australian Patent Application No. 2005286729, dated Mar. 5, 2010.
Office Communication issued in Australian Patent Application No. 2005286729, dated Sep. 27, 2010.
Office Communication issued in Australian Patent Application No. 2010212414, dated Mar. 28, 2011.
Office Communication issued in Australian Patent Application No. 2010212413, dated Mar. 25, 2011.
Office Communication issued in Chinese Patent Application No. 20050038754.5, dated Jun. 2, 2010. (English translation).
Office Communication issued in Chinese Patent Application No. 20050038754.5, dated Nov. 21, 2008. (English translation).
Office Communication issued in Chinese Patent Application No. 20050038754.5, dated Oct. 30, 2009. (English translation).
Office Communication issued in Chinese Patent Application No. 200580038754.5, dated May 4, 2011. (English translation).
Office Communication issued in European Patent Application No. 05799708.2, dated Jan. 20, 2011.
Office Communication issued in European Patent Application No. 08831664.1-2113, dated Sep. 10, 2009.
Office Communication issued in Georgian Patent Application No. AP 2005 009999, dated Jul. 26, 2010.
Office Communication issued in Georgian Patent Application No. AP 2005 009999, dated Jan. 8, 2009. (English translation).
Office Communication issued in Georgian Patent Application No. AP 2005 009999, dated Sep. 28, 2011. (English translation).
Office Communication issued in Korean Patent Application No. 10-2007-7009233, dated Nov. 1, 2010. (English Translation).

(56) References Cited

OTHER PUBLICATIONS

Office Communication issued in Russian Patent Application No. 2007115051, dated Sep. 18, 2009. (English translation).
Office Communication issued in Russian Patent Application No. 2007115051, dated Apr. 1, 2010. (English translation).
Office Communication issued in Taiwanese Patent Application No. 09413312, dated Dec. 15, 2010 (English translation).
Office Communication issued in U.S. Appl. No. 12/790,121, dated Oct. 28, 2010.
Office Communication issued in U.S. Appl. No. 12/790,121, dated Sep. 2, 2011.
Office Communication issued in U.S. Appl. No. 11/233,509, dated Oct. 2, 2009.
Office Communication issued in U.S. Appl. No. 11/233,509, dated May 27, 2009.
Office Communication issued in U.S. Appl. No. 11/233,509, dated Dec. 24, 2008.
Office Communication issued in U.S. Appl. No. 11/233,509, dated Sep. 4, 2008.
PCT International Preliminary Report on Patentability issued in International Application No. PCT/US2008/077122, dated Apr. 1, 2010.
PCT International Search Report and Written Opinion issued in International Application No. PCT/US2005/033814, dated Feb. 15, 2006.
PCT International Search Report and Written Opinion issued in International Application No. PCT/US2010/061111, dated Feb. 18, 2011.
PCT International Search Report and Written Opinion issued in International Application No. PCT/US11/43470, dated Dec. 6, 2011.
PCT International Search Report issued in International Application No. PCT/US2008/077122, dated Oct. 30, 2009.
Proceedings of First National Conference on Carbon Sequestration, May 14-17, 2001, Washington, DC. United States Department of Energy, National Energy Technology Laboratory. CD-ROM USDOE/NETL-2001/1144; also available at http://www.netl.doe.gov/publications/proceedings/01/carbon_seq/carbon_seq01.html.
Pulvirenti et al., "Acid generation upon thermal concentration of natural water: The critical ate content and the effects of ionic composition," *Journal of Contaminant Hydrology*, 109:62-81, 2009.
Shore et al., "V.F.1—Platinum Group Metal Recycling Technology Development," Department of Energy Hydrogen Program, United States. Department of Energy Fiscal Year 2008 Annual Progress Report, pp. 35-938. Published Nov. 2008. Available on the internet at http://www.hydrogen.energy.gov/pdfs/progress08/v_f_1_shore.pdf. Accessed Dec. 28, 2011.
Sodium Iodide, Material Safety Data Sheet, CAS No. 7681-82-5, Chemical Book, available on the internet at http://www.chemicalbook.com/ProductMSDSDetailCB6170714_EN.htm. Copyright 2008. Accessed Dec. 28, 2011.
U.S. Appl. No. 60/612,355 entitled "Removing Carbon Dioxide From Waste Streams Through Co-Generation of Synthetic Carbonate Minerals ," by Joe David Jones, filed Sep. 23, 2004.
U.S. Appl. No. 60/642,698 entitled "Removing Carbon Dioxide From Waste Streams Through Co-Generation of Synthetic Carbonate Minerals ," by Joe David Jones, Jan. 10, 2005.
U.S. Appl. No. 60/718,906 entitled "Removing Carbon Dioxide From Waste Streams Through Co-Generation of Synthetic Carbonate Minerals ," by Joe David Jones, filed Sep. 20, 2005.
U.S. Appl. No. 60/973,948 entitled "Removing Carbon Dioxide From Waste Streams Through Co-Generation of Carbonate and/or Bicarbonate Minerals," by Joe David Jones, filed Sep. 20, 2007.
U.S. Appl. No. 61/032,802 entitled "Removing Carbon Dioxide From Waste Streams Through Co-Generation of Carbonate and/or Bicarbonate Minerals ," by Joe David Jones, filed Feb. 29, 2008.
U.S. Appl. No. 61/033,298 entitled "Removing Carbon Dioxide From Waste Streams Through Co-Generation of Carbonate and/or Bicarbonate Minerals," by Joe David Jones, filed Mar. 3, 2008.
U.S. Appl. No. 61/288,242 entitled "Carbon Dioxide Sequestration Through Formation of Group-2 Carbonates and Silicon Dioxide", by Joe David Jones, filed Dec. 18, 2009.
U.S. Appl. No. 61/362,607 entitled "Carbon Dioxide Sequestration Involving Energy-Efficient Conversion of Group 2 Chlorides to Group 2 Hydroxides," by Joe David Jones, filed Jul. 8, 2010.
U.S. Appl. No. 61/370,030 entitled "Carbon Dioxide Sequestration Involving Energy-Efficient Conversion of Group 2 Chlorides to Group 2 Hydroxides," by Joe David Jones and Al Yablonsky, filed Aug. 2, 2010.
U.S. Appl. No. 61/406,536 entitled "Carbon Dioxide Sequestration Involving Energy-Efficient Conversion of Group 2 Chlorides to Group 2 Hydroxides," by Joe David Jones and Al Yablonsky, filed Oct. 25, 2010.
U.S. Appl. No. 61/451,078 entitled "Carbon Dioxide Sequestration Involving Energy-Efficient Conversion of Group 2 Chlorides to Group 2 Hydroxides," by Joe David Jones and Al Yablonsky, filed Mar. 9, 2011.
Wei, Xinchao, "Technological evaluation of mineral sequestration of $CO_2$ by carbonation," Thesis submitted to College of Engineering and Mineral Resources at West Virginia University in partial fulfillment of the requirements for the degree of Master of Science in Mining Engineering, 2003.
Office Action in Georgian Patent Application AP 2008 011762 dated Sep. 30, 2011 (English translation included).
Office Action Issued in Russian Patent Application No. 2012144036/05 (070703), dated Nov. 14, 2013.

\* cited by examiner

| | Temperature | | | Reactor Dimensions | | | Reactant Inputs | | | |
|---|---|---|---|---|---|---|---|---|---|---|
| | | | | | | | Sorbant | Simulated Flue-Gas Coal Lignite | | |
| | Approx Start Temp C | Approx Operating Temp C | Max Temp C | Stage Height cm | Tortuosity | Reactant Volume ml | Concentration (M/l) | CO2 Feed L/min | N2 FEED L/min | % CO2 IN FEED |
| 1 | | | | 41 | 0 | 3321 | 1.00 | 1.400 | 12.1 | 10% |
| 2 | | | | 30 | 0 | 2430 | 4.00 | 2.400 | 12.6 | 16% |
| 3 | | 41 | 51 | 30 | 0.00 | 2430 | 3.25 | 1.900 | 10 | 16% |
| 4 | | 39 | 54 | 30 | 0.00 | 2430 | 5.00 | 2.600 | 13.4 | 16% |
| 5 | | 38 | 52 | 30 | 0.00 | 2430 | 4.00 | 2.400 | 12.6 | 16% |
| 6 | 51 | 54 | 57 | 30 | 0.00 | 2430 | 4.00 | 2.400 | 12.6 | 16% |
| 7 | 52 | 52 | 53 | 30 | 0.00 | 2430 | 10.00 | 2.400 | 12.6 | 16% |
| 8 | 24 | 24 | 24 | 30 | 0.00 | 2430 | 10.00 | 2.400 | 12.6 | 16% |
| 9 | 24 | 24 | 25 | 30 | 0.00 | 2430 | 0.25 | 2.400 | 12.6 | 16% |
| 10 | 24 | 26 | 29 | 30 | 0.00 | 2430 | 0.50 | 2.400 | 12.6 | 16% |
| 11 | 20 | 23 | 27 | 30 | 0.00 | 2430 | 0.75 | 2.400 | 12.6 | 16% |
| 12 | 26 | 30 | 36 | 30 | 0.00 | 2430 | 1.25 | 2.400 | 12.6 | 16% |
| 13 | 21 | 21 | 22 | 30 | 0.00 | 2430 | 0.18 | 2.400 | 12.6 | 16% |
| 14 | 50 | 50 | 57 | 30 | 0.00 | 2430 | 10.00 | 2.400 | 12.6 | 16% |
| 15 | 22 | 29 | 37 | 30 | 0.00 | 2430 | 0.18 | 2.400 | 12.6 | 16% |
| 16 | 34 | 35 | 36 | 30 | 0.00 | 2430 | 0.18 | 2.400 | 12.6 | 16% |
| 17 | 23 | 24 | 25 | 30 | 0.00 | 2430 | 0.18 | 2.400 | 12.6 | 16% |
| 18 | 23 | 25 | 29 | 30 | 0.00 | 2430 | 0.18 | 2.400 | 12.6 | 16% |
| 19 | 28 | 27 | 28 | 30 | 0.00 | 2430 | 0.18 | 2.400 | 12.6 | 16% |
| 20 | 25 | 26 | 27 | 30 | 0.00 | 2430 | 0.18 | 2.400 | 12.6 | 16% |
| 21 | 25 | 24 | 25 | 30 | 0.00 | 2430 | 0.18 | 2.400 | 12.6 | 16% |
| 22 | 19 | 20 | 20 | 30 | 0.00 | 2430 | 0.18 | 0.860 | 5.5 | 14% |
| 23 | 20 | 20 | 21 | 30 | 0.00 | 2430 | 0.18 | 0.860 | 5.5 | 14% |
| 24 | 22 | 22 | 22 | 30 | 0.00 | 2430 | 0.18 | 0.860 | 5.5 | 14% |
| 25 | 22 | 22 | 22 | 30 | 0.00 | 2430 | 0.18 | 0.860 | 5.5 | 14% |
| 26 | 23 | 23 | 23 | 30 | 0.00 | 2430 | 0.18 | 0.860 | 5.5 | 14% |
| 27 | 23 | 23 | 23 | 30 | 0.00 | 2430 | 0.18 | 0.860 | 5.5 | 14% |
| 28 | 23 | 24 | 23 | 30 | 0.00 | 2430 | 0.18 | 2.400 | 12.6 | 16% |
| 29 | 23 | 29 | 25 | 30 | 0.00 | 2430 | 0.18 | 2.400 | 12.6 | 16% |
| 30 | 28 | 28 | 27 | 30 | 0.00 | 2430 | 0.18 | 2.400 | 12.6 | 16% |
| 31 | 26 | 27 | 24 | 30.00 | 0.00 | 2430 | 0.18 | 2.400 | 12.6 | 16% |
| 32 | 26 | 27 | 26 | 30.00 | 0.00 | 2430 | 0.18 | 2.400 | 12.6 | 16% |
| 33 | 25 | 25 | 24 | 30 | 0.00 | 2430 | 0.18 | 2.400 | 12.6 | 16% |

FIG. 2B

| | Gas/Liq Contact Time | CO2 Absorption Rates (Max/Average) For Ideal Stage | | Resulting Proudct Stoichiometry | Req'd Gas/Liq Reactor Dimension |
|---|---|---|---|---|---|
| | Operating Time (For Average) MINS | Highest CO2 Absorption Rate | Apparent Average Halosis Per Stage | Product Ion Ratio (1.0 bicarb 2.0 carb) | |
| 1 | 30 | 98.4 | 56.8 | 1.55 | 0.00 |
| 2 | 45 | 91.7 | 40.4 | 1.95 | 0.00 |
| 3 | 44.04 | 92.8 | 69.4 | 2.00 | 0.99 |
| 4 | 58.30 | 71.1 | 53.3 | 2.00 | 1.63 |
| 5 | 44.20 | 78.6 | 60.7 | 2.00 | 1.27 |
| 6 | 54.20 | 85.3 | 46.7 | 1.80 | 2.09 |
| 7 | 6.36 | 60.6 | 60.6 | 2.00 | 1.30 |
| 8 | 6.36 | 42.7 | 42.7 | 2.00 | 0.99 |
| 9 | 15.00 | 83.9 | 83.9 | 1.13 | 0.31 |
| 10 | 15.00 | 90.0 | 58.3 | 1.21 | 0.76 |
| 11 | 30.00 | 94.5 | 48.2 | 1.17 | 0.95 |
| 12 | 60.00 | 94.7 | 43.2 | 1.32 | 1.47 |
| 13 | 15.00 | 81.1 | 40.6 | 1.10 | 0.97 |
| 14 | 240.00 | 60.5 | 46.9 | 2.00 | 2.07 |
| 15 | 60.00 | 80.8 | 53.0 | 1.95 | 1.13 |
| 16 | 300.00 | 33.1 | 27.4 | 2.00 | 2.59 |
| 17 | 5.00 | 71.1 | 54.0 | 1.50 | 0.74 |
| 18 | 60.00 | 33.2 | 28.8 | 1.69 | 1.97 |
| 19 | 30.00 | 21.5 | 16.2 | 1.49 | 3.64 |
| 20 | 5.00 | 75.1 | 54.3 | 1.60 | 0.79 |
| 21 | 15.00 | 3.1 | 2.7 | 1.22 | 20.95 |
| 22 | 20.00 | 52.2 | 29.7 | 1.90 | 1.31 |
| 23 | 60.00 | 14.6 | 12.2 | 1.56 | 3.72 |
| 24 | 45.00 | 8.9 | 8.8 | 1.72 | 5.47 |
| 25 | 20.00 | 20.2 | 18.4 | 1.48 | 2.49 |
| 26 | 15.00 | 16.2 | 16.2 | 1.32 | 3.00 |
| 27 | 15.00 | 0.6 | 0.6 | 1.28 | 84.42 |
| 28 | 5.00 | 0.6 | 24.5 | 1.00 | 1.88 |
| 29 | 60.00 | 33.2 | 28.8 | 1.69 | 1.71 |
| 30 | 30.00 | 21.5 | 16.2 | 1.49 | 3.47 |
| 31 | 5.00 | 75.1 | 54.3 | 1.60 | 0.71 |
| 32 | 20.00 | 75.1 | 20.6 | 1.00 | 2.60 |
| 33 | 60.00 | 3.1 | 2.7 | 1.02 | 20.23 |

FIG.2C

POWER PLANT AND FLUE-GAS MODEL

| Reactions | | | CO2 Emissions | |
|---|---|---|---|---|
| $C_s + O_{2g} = CO_{2g}$ | | | kg/MWh | 850 |
| $S_s + O_{2g} = SO_{2g}$ | | | lbm/MWh | 1,872 |
| $N_{2g} + O_{2g} = 2NO_g$ | | | | |
| $1/2 N_{2g} + O_{2g} = NO_2$ | | Air | Moles | Moles % |
| $H_{2g} + 1/2 O_{2g} = H_2O$ | | N2 | 813037501 | 78% |
| | | O2[1] | 232467599.6 | 22% |
| | | H2O | 10423558 | 1% |
| | Heat Rates BTU/kWh | | 1042355771 | 101% |
| BTU/ lb coal | 13,000 | (kW) | | 1,000,000 |
| BTU/kg coal | 28,660 | kWhr/yr | | 8,760,000,000 |
| | | BTU/yr | | 87,600,000,000,000 |
| | | kg coal/yr | | 3,056,566,154 |

2233800 tons of carbon (12) per year
25.5kg carbon per million btu -- 10k heat rate coal plants   7446000 tons of CO2 per year

| Coal Composition (Bituminous) | Wt % | M.W. | kg/yr | kgMoles/yr | Moles % |
|---|---|---|---|---|---|
| C | 70% | 12.0107 | 2,139,596,308 | 178140850 | 62.9% |
| H2O | 5% | 18.0153 | 152,828,308 | 8483251 | 3.0% |
| C (ash) | 10% | 12.0107 | 305,656,615 | 25448693 | 9.0% |
| O2 | 7% | 31.988 | 213,959,631 | 6688747 | 2.4% |
| H2 | 4% | 2.0153 | 122,262,646 | 60667219 | 21.4% |
| S | 3% | 32.065 | 91,696,985 | 2859722 | 1.0% |
| N2 | 1% | 28.0134 | 30,565,662 | 1091109 | 0.4% |
| Total | 100% | | 3,056,566,154 | 283379590 | 100% |

| Flue Gas | M.W. | kgMoles/yr | Mole % | kg/yr | Wt% |
|---|---|---|---|---|---|
| N2[2] | 28.013 | 813,721,545 | 72.16% | 22,795,107,137 | 68.95% |
| CO2 | 43.999 | 178,140,850 | 15.80% | 7,446,067,528 | 22.52% |
| H2O | 18.015 | 79,574,028 | 7.06% | 1,433,549,980 | 4.34% |
| C (ash) | 12.011 | 25,448,693 | 2.26% | 305,656,615 | 0.92% |
| O2 | 31.988 | 27,455,807 | 2.43% | 878,256,355 | 2.66% |
| SO2 | 64.053 | 2,859,722 | 0.25% | 183,173,771 | 0.55% |
| NO2[3] | 45.995 | 325,651 | 0.03% | 14,978,240 | 0.05% |
| NO | 30.001 | 81,413 | 0.01% | 2,442,427 | 0.01% |
| Total | | 1,127,607,709 | 100% | 33,059,232,053 | 100% |
| 100% | | Amount of Flue Gas Processed | | | |

1 The value for the moles of O2 of is calculated from combustion of carbon, sulfer and hydrogen times 1.1
2 The mole fraction of N2 that reacts to form NOx is assumed to be 0.0005
3 The moles of NO2 is assumed to be 4 times the moles of NO.

FIG.9B

DECARBONATOR PROCESS LOAD
AND INTERMEDIATE CAUSTIC REQUIREMENT 25.5kg carbon per million btu -- 10k heat rate coal plants
2233800 tons of carbon (12) per year
7446000 tons of $CO_2$ per year    100.001% of EIA ref value

| Decarbonator | M.W. | Input kg/yr | % Captured | Output kg/yr | Wt% |
|---|---|---|---|---|---|
| N2 | 28.013 | 22,795,107,137 |  | 22,795,107,137 | 94.04% |
| CO2 | 43.999 | 7,446,067,528 | 100.00% |  |  |
| H2O | 18.015 | 1,433,549,980 |  | 1,433,549,980 | 5.91% |
| C (ash) | 12.011 | 305,656,615 |  |  |  |
| O2 | 31.988 | 878,256,355 | 99.00% | 8,782,564 | 0.04% |
| SO2 | 64.053 | 183,173,771 | 99.00% | 1,831,738 | 0.01% |
| NO2 | 45.995 | 14,978,240 | 99.00% | 149,782 | 0.00% |
| NO | 30.001 | 2,442,427 | 99.00% | 24,424 | 0.00% |
| Total |  | 33,059,232,053 |  | 24,239,445,625 | 100% |

| Caustic Req'd | M.W. | CO2 Captured MT/yr | NaOH kgMoles/yr | NaOH MT/yr |
|---|---|---|---|---|
| NaOH | 40 | 7,446,068 | 169,233,808 | 6,769,352 |

FIG.9C

ELECTROLYSIS SECTION LOAD AND REQUIREMENTS

Electrolysis Output

| | | |
|---|---|---|
| NaOH (MT/yr) | 6,769,352 | |
| NaOH (MT/day) | 18,546 | |
| NaOH (kg/day) | 18,546,171 | |
| NaOH (g/day) | 18,546,170,690 | |
| NaOH (lb/day) | 40,887,305 | |
| NaOH (moles/day) | 463,654,267 | |
| NaOH (moles/hr) | 19,318,928 | |
| Chlorine | 84,616,904 | kg-moles/year Cl2 |
| Hydrogen | 186,157 | metric tons /year Hydrogen |

| | | |
|---|---|---|
| kw-hr/ton H2/O2 energy (ref value) | 39,000 | fact of nature, EIA 2005 ref value, compressed H2 |
| kw-hr/year H2 (fuel cell) | 6,171,110,792 | kw-hr/year |
| kw-hrs/year (generation) | 8,760,000,000 | |
| of power generated by the plant | 70% | |
| of power used in electrolysis returned | 63% | |

Electrolysis Input current = (moles/hr) x (96,485 coulombs/mole) x (1hr/3600 sec) /(.97 current efficiency) = Current (Amps)

| | | |
|---|---|---|
| Current (A) | 533,787,729 | |
| Current (kA) | 533,788 | math |
| NaCl (tons per year) | 9,883,254 | stoichiometry |
| DI H2O | self-generated | |
| HCl | self-generated | |

Electrolysis Equipment Requirements

| | |
|---|---|
| Total Cells Area (m2) | 106,758 |
| Single Cell Area (m2) | 1 |
| Number of Cells Req'd | 106,758 |

NaCL + aHCL + H20 ---> NaOH + (1/2+a/2) H2 + (1/2 + a/2) Cl2
169,233,808 kg-moles of NaOH made each year
93078594.15 kg-moles of H2/year (includes Protonation)
2 kgs H2 per mole H2
186157188.3 kgs-H2 per year
186157.1883 mTonsH2 per year

FIG.9D

WASTE-HEAT CALCULATION

| | | gms.hr | kgs/hr | Hc | Delta T (930-150) | kJ Heat/hr |
|---|---|---|---|---|---|---|
| CO2 | 0.16 | 198 | 8730.159 | 8.730159 | 0.78 | 780 | 5311.429 |
| N2 | 0.84 | 1041.667 | 29166.67 | 29.16667 | 1.039 | 780 | 23637.25 |
| total | | 1240 | 37897 | 38 | | | 28949 |

| | |
|---|---|
| 28949 | kJ/hr heat |
| 25% | recovery from Rankine/nh3 process (this is a conservative value) |
| 7237.17 | kJ/hr heat converted to DC electricity |
| 1.05435 | kJ/BTU |
| 0.948452 | BTU/kJ |
| 6864.106 | BTU/hr converted to DC electricity |
| 0.000293 | kw-hr/BTU |
| 2.011183 | kw -hr generated |

1 hr basis

| | |
|---|---|
| 2.01 | kw-hr generated |
| 27777.78 | liters of gas processed |
| 29.16667 | kgs of CO2 absorbed |
| 8 | kgs of NaOH produced to absorb it |

1 ton NaOH basis
| | |
|---|---|
| 126 | factor of above |
| 253.409 | kw-hr/ton NaOH generated from waste heat |

FIG.9E

ENERGY BALANCE/ ECOLOGIC EFFICIENCY

Other Key Measures

| | |
|---|---|
| Cell Voltage, no optimizations counted in | 2.1 experimental result |
| Reactant/Carbon Mole Ratio (operating) | 1 experimental result |
| Coal (1) or Gas (0) | 1 COAL/STEAM POWER PLANT |
| Hydrogen return efficiency | 85% (15% of hydrogen power consumed in compression) Compressed H2 delivered to market |

ENERGY BALANCE

| | | |
|---|---:|---:|
| kw-hrs/year (generation) | 8,760,000,000 | 100% |
| kw-hrs/year (electrolysis) | -9,819,559,059 | -112% |
| kw-hrs/year (energy content H2 at efficiency) | 6,171,110,792 | 70% |
| kw-hrs/year (wasteheat DC) | 1,715,415,117 | 20% |
| inc power to skymine 100% | -1,933,033,150 | 22% |
| Max CO2 remove-able | | |

<u>SOLUTION: POWERED BY CO2-PRODUCING POWER GENERATION</u>
      1643093079 Supplemental CO2 produced (powerXtonCO2/power)
      18% of total CO2 (by first iteration calculation)
      82% CO2 reduction (from equation)
      18% percent total power consumed (first iteration)
  4.532 $(\partial CO_2/\partial E)$
      22% power required to absorb/convert 100% of Plant CO2

<u>SOLUTION: POWERED NON-CO2-PRODUCTING POWER GENERATION</u>
      zero Supplemental CO2 produced
      of total CO2 (by first iteration calculation)
    100% CO2 reduction (from equation)
     18% percent total power consumed (first iteration)
  5.532 $(\partial CO_2/\partial E)$
     18% power required to absorb/convert 100% of Plant CO2

FIG.9F

ECOLOGICAL EFFICIENCY OF VARIOUS MODELLED POWER PLANTS INCORPORATING OUR $CO_2$-REMOVAL PROCESS

| | | | | | | Power Process from $CO_2$-Producing Power | | Power Process from non-$CO_2$-Producing Power | |
|---|---|---|---|---|---|---|---|---|---|
| absorption | energy recovery heatrate | DC efficiency | Voltage | electrolysis costs alone | hydrogen recovery | waste heat recovery | thermodynamic efficiency $(\partial CO_2/\partial E)$ | Power to remove 100% $CO_2$ | thermodynamic efficiency $(\partial CO_2/\partial E)$ | Power to remove 100% $CO_2$ |

STATUS QUO OPERATION OF OFF-SHELF ELECTROLYSIS AND GAS/LIQUID CONTACTORS

| | | | | | | | | | | |
|---|---|---|---|---|---|---|---|---|---|---|
| carbonate | 10000 | 35% | 5.00 | -534% | 58% | 0% | 0.210 | 476% | 1.210 | 83% |
| carbonate | 7500 | 35% | 5.00 | -400% | 44% | 0% | 0.280 | 357% | 1.280 | 78% |

ALTERATION: FORCE BICARBONATE FORMATION

| | | | | | | | | | | |
|---|---|---|---|---|---|---|---|---|---|---|
| bicarbonate | 10000 | 35% | 5.00 | -267% | 29% | 0% | 0.420 | 238% | 1.420 | 70% |
| bicarbonate | 7500 | 35% | 5.00 | -200% | 22% | 0% | 0.560 | 178% | 1.560 | 64% |

ALTERATION: H2 IN HIGH DC RETURN SYSTEMS

| | | | | | | | | | | |
|---|---|---|---|---|---|---|---|---|---|---|
| bicarbonate | 10000 | 60% | 5.00 | -267% | 50% | 0% | 0.460 | 217% | 1.460 | 68% |
| bicarbonate | 7500 | 60% | 5.00 | -200% | 37% | 0% | 0.614 | 163% | 1.614 | 62% |

ALTERATION: WASTE HEAT RECOVERY FROM PROCESS GAS

| | | | | | | | | | | |
|---|---|---|---|---|---|---|---|---|---|---|
| bicarbonate | 10000 | 60% | 5.00 | -267% | 50% | 20% | 0.506 | 198% | 1.506 | 66% |
| bicarbonate | 7500 | 60% | 5.00 | -200% | 37% | 15% | 0.675 | 148% | 1.675 | 60% |

ALTERATION: PRODUCE COMPRESSED H2 W/O DC LOSSES

| | | | | | | | | | | |
|---|---|---|---|---|---|---|---|---|---|---|
| bicarbonate | 10000 | 85% | 5.00 | -267% | 70% | 20% | 0.565 | 177% | 1.565 | 64% |
| bicarbonate | 7500 | 85% | 5.00 | -200% | 53% | 15% | 0.754 | 133% | 1.754 | 57% |

ALTERATION: ALTER VOLTAGE/CURRENT TO A NEW OPT VIS-À-VIS AREA TRADE-OFF

| | | | | | | | | | | |
|---|---|---|---|---|---|---|---|---|---|---|
| bicarbonate | 10000 | 85% | 2.84 | -152% | 70% | 20% | 1.624 | 62% | 2.624 | 38% |
| bicarbonate | 7500 | 85% | 2.84 | -114% | 53% | 15% | 2.166 | 46% | 3.166 | 32% |

ALTERATION: ALTER VOLTAGE/CURRENT TO A DEMONSTRATED SUB-OPTIMAL POINT

| | | | | | | | | | | |
|---|---|---|---|---|---|---|---|---|---|---|
| bicarbonate | 10000 | 85% | 2.10 | -112% | 70% | 20% | 4.532 | 22% | 5.532 | 18% |
| bicarbonate | 7500 | 85% | 2.10 | -84% | 53% | 15% | 6.042 | 17% | 7.042 | 14% |

ALTERATION: ALTER VOLTAGE/CURRENT TO A LIKELY LOWER PHYSICAL LIMIT (THEO +0.25V)

| | | | | | | | | | | |
|---|---|---|---|---|---|---|---|---|---|---|
| bicarbonate | 10000 | 85% | 1.80 | -96% | 70% | 20% | 16.521 | 6% | 17.521 | 6% |
| bicarbonate | 7500 | 85% | 1.80 | -72% | 53% | 15% | 22.028 | 5% | 23.028 | 4% |

EXAMPLE: CARBONATE FORMATION WITH SUFFICIENT ALTERATIONS CAN BE MADE ECOLOGICALLY EFFICIENT

| | | | | | | | | | | |
|---|---|---|---|---|---|---|---|---|---|---|
| carbonate | 10000 | 60% | 2.10 | -224% | 99% | 20% | 0.951 | 105% | 1.951 | 51% |
| carbonate | 7500 | 60% | 2.10 | -168% | 75% | 15% | 1.268 | 79% | 2.268 | 44% |

FIG.10

REMOVING CARBON DIOXIDE FROM WASTE STREAMS THROUGH CO-GENERATION OF CARBONATE AND/OR BICARBONATE MINERALS

CROSS-REFERENCES TO RELATED APPLICATIONS

This application claims benefit of priority to U.S. Provisional Application Ser. No. 60/973,948, filed Sep. 20, 2007, U.S. Provisional Application Ser. No. 61/032,802, filed Feb. 29, 2008, U.S. Provisional Application Ser. No. 61/033,298, filed Mar. 3, 2008, and International Application No. PCT/US08/77122, filed Sep. 19, 2008, entitled "Removing Carbon Dioxide From Waste Streams Through Co-Generation of Carbonate and/or Bicarbonate Minerals." The entire text of each of the above-referenced disclosures (including the appendices) is specifically incorporated by reference herein without disclaimer.

BACKGROUND OF THE INVENTION

1. Field of the Invention

The present invention generally relates to the field of removing carbon dioxide and, collaterally with that removal, other pollutants from waste streams. More particularly, the present invention relates to removing carbon dioxide and other pollutants from waste streams through the absorption of carbon dioxide and other pollutants from concentrated flue-gas-like streams and then the co-generation of carbonate and/or bicarbonate materials that entrain and neutralize any incidental pollutants absorbed.

2. Related Art

Considerable domestic and international concern in both private and commercial sectors has been increasingly focused over the last four decades on emissions from industries into the air. In particular, attention has been focused on the greenhouse gases that have the property of affecting the retention of solar heat in the atmosphere, producing the "greenhouse effect." The greenhouse effect occurs when incoming heat from the sun is trapped in the atmosphere and hydrosphere of the earth, raising the average atmospheric temperature, ocean temperature, and other mean and average temperature measures of planet Earth, up to and including the point of climatic change; the effect is generally agreed as an operating effect in the Earth's thermal balance, though the rates, the extent to which man's combustion of materials affects it and the extent, direction, and magnitude of the effect are debated. Despite the degree of debate, all would agree there is a benefit to removing $CO_2$ (and other chemicals) from point-emission sources if the cost for doing so were sufficiently small.

Greenhouse gases are predominately made up of carbon dioxide and are produced by municipal power plants and large-scale industry in site-power-plants, though they are also produced in any normal carbon combustion (such as automobiles, rain-forest clearing, simple burning, etc.), though their most concentrated point-emissions occur at power-plants across the planet, making reduction or removal from those fixed sites an attractive point to effect a removal-technology. Because energy production is a primary cause of greenhouse gas emissions, methods such as reducing carbon intensity, improving efficiency, and sequestering carbon from power-plant flue-gas by various means has been researched and studied intensively over the last thirty years.

Reducing carbon intensity involves the alternate use of non-carbon energy sources such as nuclear, hydroelectric, photovoltaic, geothermal, and other sources of electric power to reduce the percentage of power produced through exclusive carbon combustion. While each of these techniques of power-generation continues to gain in terms of total energy production, the projections of world electricity demand are expected to increase at rates faster than energy production from these methods. Therefore, carbon greenhouse gas emissions are expected to increase despite growth in non-carbon energy sources.

Improving efficiency has generally focused on techniques of improving the combustion of carbon through pre-combustion, decarbonization, oxygen-fired combustion, etc. by first decreasing the amount of $CO_2$ produced and then oxidizing all potential pollutants as completely as possible. Also, the technique increases the amount of energy generated per carbon dioxide emission released for improved efficiency. While strides in this area have improved combustion efficiency, there is little more improvement to be extracted from this field of endeavor.

Attempts at sequestration of carbon (in the initial form of gaseous $CO_2$) have produced many varied techniques, which can be generally classified as geologic, terrestrial, or ocean systems. These techniques are primarily concerned with transporting generated carbon dioxide to physical sites and injecting the carbon dioxide into geologic, soil, or ocean repositories. Each of these sequestering techniques involves large costs in preparing $CO_2$ for transport, accomplishing the transport, and performing the injection into a "carbon bank." As such, these techniques are generally not economically feasible and in many cases consume more energy than the original carbon produced.

Sequestration can also include several industrial processes which include scrubbing, membranes, lower-cost $O_2$, and hydrates. However, each of these technologies suffer due to the capital plant costs raised to uneconomic levels, and the effect of $CO_2$ capture on the cost of electricity is prohibitive.

The referenced shortcomings are not intended to be exhaustive, but rather are among many that tend to impair the effectiveness of previously known techniques for removing carbon dioxide from waste streams; however, those mentioned here are sufficient to demonstrate that the methodologies appearing in the art have not been altogether satisfactory and that a significant need exists for the techniques described and claimed in this disclosure.

SUMMARY

Embodiments of the present invention relate to methods of removing an initial amount of carbon dioxide from a gas stream comprising: obtaining a hydroxide in an aqueous mixture; obtaining chlorine; admixing the hydroxide with the gas stream to produce carbonate products, bicarbonate products, or a mixture of carbonate and bicarbonate products in an admixture; separating said carbonate and/or bicarbonate products from the admixture, thereby removing a portion of the initial amount of carbon dioxide from the gas stream; combining chlorine with water to form hypochlorous acid; decaying the hypochlorous acid to form hydrochloric acid and oxygen; and combining the hydrochloric acid with calcium carbonate to form calcium chloride and a reduced amount of carbon dioxide. In other embodiments, the method further comprises obtaining hydrogen; and combusting the hydrogen in a power plant. In some embodiments, the reduced amount of carbon dioxide is one-half of the initial amount of carbon dioxide. In another embodiment, the hydroxide is sodium hydroxide.

Other embodiments of the present invention relate to a method of removing an initial amount of carbon dioxide from a gas stream comprising: obtaining a hydroxide in an aqueous mixture; obtaining hydrochloric acid; admixing the hydroxide with the gas stream to produce carbonate products, bicarbonate products, or a mixture of carbonate and bicarbonate products in an admixture; separating said carbonate and/or bicarbonate products from the admixture, thereby removing a portion of the initial amount of carbon dioxide from the gas stream; and combining the hydrochloric acid with calcium carbonate to form calcium chloride and a reduced amount of carbon dioxide. In some embodiments, the method further comprises obtaining hydrogen; and combusting the hydrogen in a power plant. In another embodiment, the reduced amount of carbon dioxide is one-half of the initial amount of carbon dioxide. In another embodiment, the hydroxide is sodium hydroxide.

Other embodiments of the invention relate to an apparatus comprising: a electrolysis chamber comprising at least one cathode and at least one anode, the electrolysis chamber adapted to produce hydroxide, hydrogen, and chlorine during use; a first set of mixing equipment operably connected to the electrolysis chamber and to a conduit adapted to contain a gas stream during use, the mixing equipment adapted to admix hydroxide from the electrolysis chamber with the gas stream during use to create an admixture in which carbon, sulfur, and/or nitrogen compounds in the gas stream can react with the hydroxide; a second set of mixing equipment operably connected to the electrolysis chamber and adapted to admix the chlorine with water during use to create hypochlorous acid; process equipment adapted to decay the hypochlorous acid to create hydrochloric acid and oxygen; a third set of mixing equipment adapted to combine the hydrochloric acid and calcium carbonate to create calcium chloride and carbon dioxide during use; and a separation chamber operably connected to the mixing equipment and adapted to separate the admixture into a separate gas phase and solid and/or liquid phase.

Other embodiments of the invention relate to an apparatus comprising: a electrolysis chamber comprising at least one cathode and at least one anode, the electrolysis chamber adapted to produce hydroxide, hydrogen, and oxygen during use; a first set of mixing equipment operably connected to the electrolysis chamber and to a conduit adapted to contain a gas stream during use, the mixing equipment adapted to admix hydroxide from the electrolysis chamber with the gas stream during use to create an admixture in which carbon, sulfur, and/or nitrogen compounds in the gas stream can react with the hydroxide; a chamber operably connected to the anode side of the cell and adapted to separate the admixture into a separate gas phase and liquid phase; and a chamber operably connected to the cathode side of the cell and adapted to separate the admixture into a separate gas phase and liquid phase.

Other embodiments of the invention relate to an apparatus comprising: a electrolysis chamber comprising at least one cathode and at least one anode, the electrolysis chamber adapted to produce hydroxide, while suppressing hydrogen, by consuming oxygen during use; a first set of mixing equipment operably connected to the electrolysis chamber and to a conduit adapted to contain a gas stream during use, the mixing equipment adapted to admix hydroxide from the electrolysis chamber with the gas stream during use to create an admixture in which carbon, sulfur, and/or nitrogen compounds in the gas stream can react with the hydroxide; a chamber operably connected to the anode side of the cell and adapted to separate the admixture into a separate gas phase and liquid phase; and a chamber operably connected to the cathode side of the cell and adapted to separate the admixture into a separate gas phase and liquid phase.

Other embodiments of the invention relate to a method of separating heavy metals from water in a flue-gas condensate from a process in which carbon dioxide is removed from a gas stream at a power plant, comprising: obtaining a chloride salt; admixing the salt with water, steam, or both to produce a solution; electrolyzing the solution to produce a hydroxide and chlorine gas; admixing a portion of the hydroxide with a flue-gas stream to produce carbonate products, bicarbonate products, or a mixture of carbonate and bicarbonate products in an admixture; separating said carbonate and/or bicarbonate products from the admixture, thereby removing carbon dioxide from the gas stream; adding a portion of the hydroxide to the flue-gas condensate to change its pH from acidic to basic, resulting in precipitation of the heavy metals; and passing the condensate through a filtering medium. In some embodiments, the filtering medium comprises activated charcoal. In other embodiments, the condensate is gravity-fed through the filtering medium. In still other embodiments, the condensate is actively pumped through the filtering medium.

Other embodiments of the invention relate to a method of recycling chlorine gas from a process in which carbon dioxide is removed from a gas stream at a power plant, comprising: obtaining a chloride salt; admixing the salt with water, steam, or both to produce a solution; electrolyzing the solution to produce a hydroxide and chlorine gas; admixing the hydroxide with a flue-gas stream to produce carbonate products, bicarbonate products, or a mixture of carbonate and bicarbonate products in an admixture; separating said carbonate and/or bicarbonate products from the admixture, thereby removing carbon dioxide from the gas stream; reacting the chlorine gas with water and light to produce muriatic acid and oxygen; and returning the oxygen to the air-inlet of the power plant. In some embodiments, the muriatic acid is neutralized by reacting it with Group-I bicarbonate products separated from the admixture to produce a Group-1-chloride salt, water, and carbon dioxide gas. In other embodiments, the muriatic acid is neutralized by reacting it with Group-II-carbonate products separated from the admixture to produce a Group-II-chloride salt and carbon dioxide gas. In still other embodiments, the muriatic acid is neutralized by reacting it with Group-I-carbonate products separated from the admixture to produce a Group-I-chloride salt and a Group-I-bicarbonate. In still other embodiments, the reaction is accomplished by simple mixing. In still other embodiments, the reaction is accomplished across a membrane, and DC-power from the acid-base battery so formed is extracted.

Other embodiments of the invention relate to a method of removing carbon dioxide from a gas stream at a power plant, comprising: obtaining a chloride salt; admixing the salt with water, steam, or both to produce a solution; electrolyzing the solution to produce a hydroxide and chlorine gas; admixing the hydroxide with a flue-gas stream to produce carbonate products, bicarbonate products, or a mixture of carbonate and bicarbonate products in an admixture; and separating said carbonate and/or bicarbonate products from the admixture, thereby removing carbon dioxide from the gas stream; wherein the admixing occurs in a pair of bubble-columns that comprise a carbonator column, in which carbonate is formed from the hydroxide and the carbon dioxide, and a bicarbonator column, in which bicarbonate is formed from the carbonate. In some embodiments, the bicarbonator column is wetted and packed, but contains essentially zero-liquid-level, and is paired with a liquid carbonator column. In other embodiments, the bicarbonator and carbonator columns are both wetted and packed, but contain essentially zero-liquid-level.

Other embodiments of the invention relate to a method of removing carbon dioxide from a gas stream at a power plant, comprising: obtaining a chloride salt; admixing the salt with water, steam, or both to produce a solution; electrolyzing the solution to produce a hydroxide and chlorine gas; admixing the hydroxide with a flue-gas stream to produce carbonate products, bicarbonate products, or a mixture of carbonate and bicarbonate products in an admixture; and separating said carbonate and/or bicarbonate products from the admixture, thereby removing carbon dioxide from the gas stream; wherein the admixing occurs in a single bubble-column in which the hydroxide is converted to carbonate in the upper section of the column, which is then converted to bicarbonate in the lower section of the column.

Other embodiments of the invention relate to a method of removing carbon dioxide from a gas stream at a power plant, comprising: obtaining a chloride salt; admixing the salt with water, steam, or both to produce a solution; electrolyzing the solution to produce a hydroxide and hydrogen gas; admixing the hydroxide with a flue-gas stream to produce carbonate products, bicarbonate products, or a mixture of carbonate and bicarbonate products in an admixture; and separating said carbonate and/or bicarbonate products from the admixture, thereby removing carbon dioxide from the gas stream; wherein waste-heat from the power plant is used to elevate the temperature at which the electrolysis occurs to a temperature at which the energy required for the electrolysis is equal to the theoretical maximum energy returnable from the hydrogen gas produced by the electrolysis.

Other embodiments of the invention relate to a method of separating heavy metals from water in a flue-gas condensate from a process in which carbon dioxide is removed from a gas stream at a power plant, comprising: obtaining a chloride salt; admixing the salt with sulfuric acid and heat to obtain a sulfate solution; evaporating the resulting hydrochloric acid from the admixture; electrolyzing the sulfate solution to produce a hydroxide and oxygen gas; admixing a portion of the hydroxide with a flue-gas stream to produce carbonate products, bicarbonate products, or a mixture of carbonate and bicarbonate products in an admixture; separating said carbonate and/or bicarbonate products from the admixture, thereby removing carbon dioxide from the gas stream; adding a portion of the hydroxide to the flue-gas condensate to change its pH from acidic to basic, resulting in precipitation of the heavy metals; and passing the condensate through a filtering medium. In some embodiments, the filtering medium comprises activated charcoal. In other embodiments, the condensate is gravity-fed through the filtering medium. In still other embodiments, the condensate is actively pumped through the filtering medium. In still other embodiments, the oxygen is consumed in the electrolysis cell to suppress the production of hydrogen.

Other embodiments of the invention relate to a method of producing hydrochloric acid from a process in which carbon dioxide is removed from a gas stream at a power plant, comprising: obtaining a chloride salt; admixing the salt with sulfuric acid to produce a sulfate solution; evaporating the resulting hydrochloric acid from the admixture; electrolyzing the sulfate solution to produce a hydroxide and oxygen gas; admixing the hydroxide with a flue-gas stream to produce carbonate products, bicarbonate products, or a mixture of carbonate and bicarbonate products in an admixture; and separating said carbonate and/or bicarbonate products from the admixture, thereby removing carbon dioxide from the gas stream. In some embodiments, the hydrochloric acid is neutralized by reacting it with Group-I-bicarbonate products separated from the admixture to produce a Group-I-chloride salt, water, and carbon dioxide gas. In other embodiments, the hydrochloric acid is neutralized by reacting it with Group-II-carbonate products separated from the admixture to produce a Group-II-chloride salt and carbon dioxide gas. In still other embodiments, the hydrochloric acid is neutralized by reacting it with Group-I-carbonate products separated from the admixture to produce a Group-I-chloride salt and a Group-I-bicarbonate. In still other embodiments, the reaction is accomplished by simple mixing. In still other embodiments, the reaction is accomplished across a membrane, and DC-power from the acid-base battery so formed is extracted. In still other embodiments, the oxygen is consumed in the electrolysis cell to suppress the production of hydrogen.

Other embodiments of the invention relate to a method of removing carbon dioxide from a gas stream at a power plant, comprising: obtaining a chloride salt; admixing the salt with sulfuric acid to produce a sulfate solution; evaporating the resulting hydrochloric acid from the admixture; electrolyzing the sulfate solution to produce a hydroxide and oxygen gas; admixing the hydroxide with a flue-gas stream to produce carbonate products, bicarbonate products, or a mixture of carbonate and bicarbonate products in an admixture; and separating said carbonate and/or bicarbonate products from the admixture, thereby removing carbon dioxide from the gas stream; wherein the admixing occurs in a pair of bubble-columns that comprise a carbonator column, in which carbonate is formed from the hydroxide and the carbon dioxide, and a bicarbonator column, in which bicarbonate is formed from the carbonate. In some embodiments, the bicarbonator column is wetted and packed, but contains essentially zero-liquid-level, and is paired with a liquid carbonator column. In other embodiments, the bicarbonator and carbonator columns are both wetted and packed, but contain essentially zero-liquid-level.

Other embodiments of the invention relate to a method of removing carbon dioxide from a gas stream at a power plant, comprising: obtaining a chloride salt; admixing the salt with sulfuric acid to produce a sulfate solution; precipitating the resulting sulfate from the admixture leaving hydrochloric acid; adding the precipitate to an aqueous solution; electrolyzing the aqueous solution to produce a hydroxide and chlorine gas; admixing the hydroxide with a flue-gas stream to produce carbonate products, bicarbonate products, or a mixture of carbonate and bicarbonate products in an admixture; and separating said carbonate and/or bicarbonate products from the admixture, thereby removing carbon dioxide from the gas stream; wherein the admixing occurs in a single bubble-column in which the hydroxide is converted to carbonate in the upper section of the column, which is then converted to bicarbonate in the lower section of the column.

Other embodiments of the invention relate to a method of removing carbon dioxide from a gas stream at a power plant, comprising: obtaining a chloride salt; admixing the salt with sulfuric acid to produce a sulfate solution; evaporating the resulting hydrochloric acid from the admixture; electrolyzing the sulfate solution to produce a hydroxide and hydrogen gas; admixing the hydroxide with a flue-gas stream to produce carbonate products, bicarbonate products, or a mixture of carbonate and bicarbonate products in an admixture; and separating said carbonate and/or bicarbonate products from the admixture, thereby removing carbon dioxide from the gas stream; wherein waste-heat from the power plant is used to elevate the temperature at which the electrolysis occurs to a temperature at which the energy required for the electrolysis is equal to the theoretical maximum energy returnable from the hydrogen gas produced by the electrolysis.

Other embodiments of the invention relate to a method of removing carbon dioxide from a gas stream, comprising: obtaining a chloride salt; admixing the salt with sulfuric acid to produce a sulfate solution; evaporating the resulting hydrochloric acid from the admixture; electrolyzing the sulfate solution to produce a hydroxide and oxygen gas; admixing the hydroxide with a flue-gas stream to produce carbonate products, bicarbonate products, or a mixture of carbonate and bicarbonate products in an admixture; and separating said carbonate and/or bicarbonate products from the admixture, thereby removing carbon dioxide from the gas stream. In one embodiment, the method further comprises process-controlling the method to produce substantially only carbonate products, substantially only bicarbonate products, or a mixture of carbonate and bicarbonate products. In another embodiment, the admixing occurs in two separate chambers, with one chamber being used to produce carbonate products and the other chamber being used to produce bicarbonate products. In another embodiment, the admixing occurs in a bubble column or series of bubble columns. In yet another embodiment, the separation of carbonate and/or bicarbonate products from the admixture involves a heated-precipitation separation process. In still another embodiment, the heat for the separation process is derived from heat exchange with incoming flue-gases. In still another embodiment, the method further comprises transporting the carbonate products to a remote sequestration site; combining the carbonate products with acid in a neutralization reaction to generate pure carbon dioxide; and injecting the carbon dioxide into a carbon bank. In another embodiment, other components of the gas stream are neutralized and/or entrained/captured in the carbonate-formation process. In another embodiment, the energy required by the method is supplemented with waste-heat recovered from the gas stream. In some embodiments, the gas stream is an exhaust stream from a plant. In further embodiments, the plant is a power plant that employs a carbon-based fuel source.

Other embodiments of the invention include a method of removing carbon dioxide from a gas stream, comprising: obtaining a chloride salt; admixing the salt with sulfuric acid to produce a sulfate solution; precipitating the resulting sulfate from the admixture leaving hydrochloric acid; adding the precipitate to an aqueous solution; electrolyzing the solution to produce a hydroxide and chlorine gas; admixing the hydroxide with a flue-gas stream to produce carbonate products, bicarbonate products, or a mixture of carbonate and bicarbonate products in an admixture; and separating said carbonate and/or bicarbonate products from the admixture, thereby removing carbon dioxide from the gas stream.

The terms "comprise" (and any form of comprise, such as "comprises" and "comprising"), "have" (and any form of have, such as "has" and "having"), "contain" (and any form of contain, such as "contains" and "containing"), and "include" (and any form of include, such as "includes" and "including") are open-ended linking verbs. As a result, a method or apparatus that "comprises," "has," "contains," or "includes" one or more steps or elements possesses those one or more steps or elements, but is not limited to possessing only those one or more steps or elements. Likewise, an element of a device or method that "comprises," "has," "contains," or "includes" one or more features possesses those one or more features, but is not limited to possessing only those one or more features. The term "using" should be interpreted in the same way. Thus, and by way of example, a step in a method that includes "using" certain information means that at least the recited information is used, but does not exclude the possibility that other, unrecited information can be used as well. Furthermore, a structure that is configured in a certain way must be configured in at least that way, but also may be configured in a way or ways that are not specified.

The terms "a" and "an" are defined as one or more than one unless this disclosure explicitly requires otherwise. The term "another" is defined as at least a second or more. The terms "substantially" and "about" are defined as at least close to (and includes) a given value or state (preferably within 10% of, more preferably within 1% of, and most preferably within 0.1% of).

As used herein, the terms "carbonates" or "carbonate products" are generally defined as mineral components containing the carbonate group, $CO_3$. Thus, the terms encompass both carbonate/bicarbonate mixtures and species containing solely the carbonate ion. The terms "bicarbonates" and "bicarbonate products" are generally defined as mineral components containing the bicarbonate group, $HCO_3$. Thus, the terms encompass both carbonate/bicarbonate mixtures and species containing solely the bicarbonate ion.

In the formation of bicarbonates and carbonates using some embodiments of the present invention, the term "ion ratio" refers to the ratio of sodium ions in the product divided by the number of carbons present in that product. Hence, a product stream formed of pure bicarbonate ($NaHCO_3$) may be said to have an "ion ratio" of 1.0 (Na/C), whereas a product stream formed of pure carbonate ($Na_2CO_3$) may be said to have an "ion ratio" of 2.0 (Na/C). By extension, an infinite number of continuous mixtures of carbonate and bicarbonate may be said to have ion ratios varying between 1.0 and 2.0.

In some preferred embodiments of the invention, hydrochloric acid is added to the sodium chloride brine feed of a chlor-alkali electrolysis cell, making the following reaction occur:

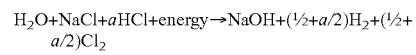

$$H_2O + NaCl + aHCl + energy \rightarrow NaOH + (\tfrac{1}{2} + a/2)H_2 + (\tfrac{1}{2} + a/2)Cl_2$$

In this equation, the term "a" is defined as the "protonation factor" and it represents the ratio of protons ($H^+$ ions) to sodium ions ($Na^+$ ions).

As used herein, the term "sequestration" is used to refer generally to techniques or practices whose partial or whole effect is to remove $CO_2$ from point emissions sources and to store that $CO_2$ in some form so as to prevent its return to the atmosphere. Use of this term does not exclude any form of the described embodiments from being considered "sequestration" techniques.

As used herein, the term "ecological efficiency" is used synonymously with the term "thermodynamic efficiency" and is defined as the amount of $CO_2$ sequestered by certain embodiments of the present invention per energy consumed (represented by the equation "$\partial CO_2/\partial E$"). $CO_2$ sequestration is denominated in terms of percent of total plant $CO_2$; energy consumption is similarly denominated in terms of total plant power consumption.

As used herein, the terms "low-voltage electrolysis" and "LVE" are used to refer to electrolysis at voltages below about 5 volts.

Descriptions of well known processing techniques, components, and equipment are omitted so as not to unnecessarily obscure the present methods and devices in unnecessary detail. The descriptions of the present methods and devices, including those in the appendices, are exemplary and non-limiting. Certain substitutions, modifications, additions and/or rearrangements falling within the scope of the claims, but not explicitly listed in this disclosure, may become apparent to those or ordinary skill in the art based on this disclosure.

Other features and associated advantages will become apparent with reference to the following detailed description of specific embodiments in connection with the accompanying drawings.

BRIEF DESCRIPTION OF THE DRAWINGS

The following drawings illustrate by way of example and not limitation. The drawings form part of the present specification and are included to further demonstrate certain aspects of the present invention. The invention may be better understood by reference to one or more of these drawings in combination with the description of illustrative embodiments presented herein:

FIG. 2B shows experimental absorption/conversion results.

FIG. 2C shows experimental absorption/conversion results.

FIG. 9B shows assumptions and calculations for a flue-gas model for a plant incorporating certain embodiments of the present invention.

FIG. 9C shows the decarbonator process load and intermediate caustic requirement for a plant incorporating certain embodiments of the present invention.

FIG. 9D shows the electrolysis section load and requirements for a plant incorporating certain embodiments of the present invention.

FIG. 9E shows waste-heat calculations for a plant incorporating certain embodiments of the present invention.

FIG. 9F shows energy balance and ecological efficiency calculations for a plant incorporating certain embodiments of the present invention.

FIG. 10 shows the ecological efficiency of various modeled power plants incorporating embodiments of the present invention.

DESCRIPTION OF ILLUSTRATIVE EMBODIMENTS

Figure 1:
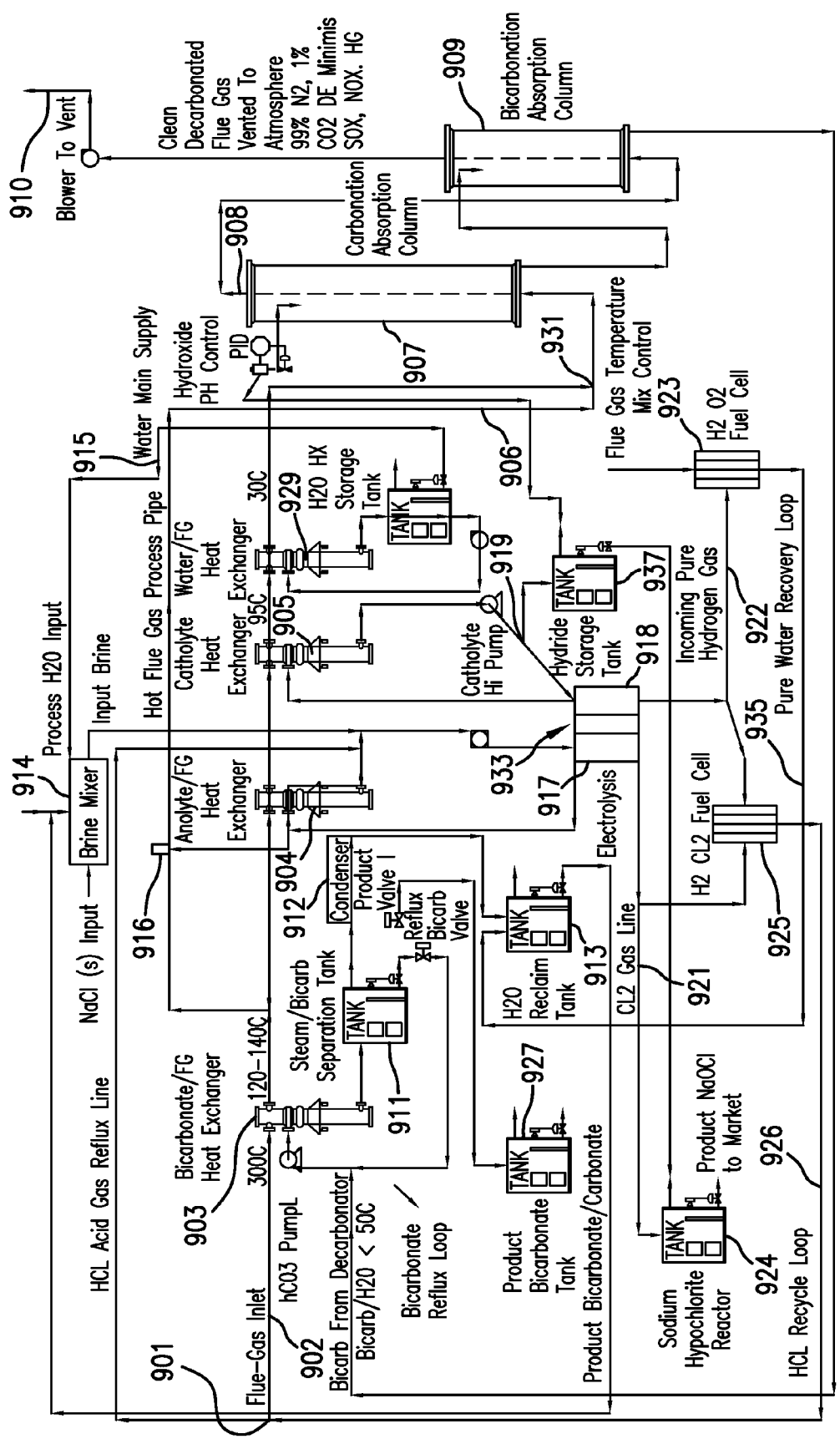
FIG. 1 is a process-flow diagram showing certain embodiments of the present invention.

The present invention relates to sequestration processes in which carbon dioxide is removed from waste streams and converted into carbonate and/or bicarbonate products. Embodiments of the methods and apparatuses of the invention comprise one or more of the following general components: (1) an aqueous decarbonation process whereby gaseous $CO_2$ is absorbed into an aqueous caustic mixture and then reacted with the hydroxide to form carbonate and/or bicarbonate products; (2) a separation process whereby the carbonate and/or bicarbonate products are separated from the liquid mixture; (3) a brine or a sulfate electrolysis process for production of the sodium hydroxide that is used as the absorbent fluid in the decarbonation process; and (4) generation and use of by-products from the decarbonization and electrolysis processes, including chlorine gas, sodium carbonate and bicarbonate, and hydrogen gas. Each of these general components is explained in further detail below.

Various embodiments of the present invention provide advantages over current technologies for absorbing carbon dioxide from waste streams. Some potential advantages that are realizable by the invention include the following.

Unlike processes that physically remove the carbon to a remote site, the co-generation at industrial scale of sodium carbonates and/or bicarbonates from sodium chloride and carbon dioxide by synthesis directly converts the undesirable carbon dioxide gas into chemicals at the point of power-generation, potentially eliminating transportation costs to a sequestration site.

Unlike other efforts at decarbonation of flue-gas streams that are not amenable to retrofitting, embodiments of the present invention may be retrofitted to existing power-plants, greatly lowering the capital costs necessary to implement decarbonation processing. Additionally, the decarbonation processing is scaleable and can be implemented by pilot-to-intermediate-to-full-scale implementation by the addition of incremental reactor units.

Unlike other processes in the art, the decarbonation process of certain embodiments sequesters carbon-dioxide into economically useful chemicals and co-incidentally produces useful by-products such as chlorine gas, sodium carbonate, and hydrogen gas. Because the by-products of the decarbonation process are economically useful, those values offset the costs of sequestration, and in properly designed systems, potentially make the sequestration process profitable in itself.

Due to the co-incidental process of aggressive scrubbing of emitted flue-gases, other undesirable acidic pollutants such as $SO_X$, $NO_X$, $HgO_X$, and others are aggressively scrubbed in the process. Additionally, the scrubbing process can lead to the entrapment and/or entrainment of other gas stream components and/or contaminants in the sodium carbonate (e.g., ash from coal, etc.), thereby removing them from the gas stream.

Particular embodiments of the present invention comprise a method of removing carbon dioxide from a gas stream comprising: obtaining a hydroxide in an aqueous mixture; admixing the hydroxide with the gas stream to produce carbonate products (defined as products containing the carbonate group, $CO_3$), bicarbonate products (defined as products containing the bicarbonate group, $HCO_3$), or a mixture of carbonate and bicarbonate products in an admixture; and separating said carbonate and/or bicarbonate products from the admixture, thereby removing carbon dioxide from the gas stream. The hydroxide can be any form of hydroxide, including but not limited to sodium hydroxide, potassium hydroxide, calcium hydroxide, magnesium hydroxide, and aluminum hydroxide. Those of ordinary skill will understand that it is possible to obtain similar chemistry and decarbonation with any number of hydroxides or mixtures of hydroxides. In some preferred embodiments, the hydroxide is a sodium hydroxide.

In certain embodiments, the method further comprises process-controlling the method to produce substantially only carbonate products or substantially only bicarbonate products. In other embodiments, the method further comprises process-controlling the method to produce a mixture of carbonate and bicarbonate products, which mixture can be comprised of about X % carbonate and about Y % bicarbonate, with X-Y combinations being any of the following: 1-99, 2-98, 3-97, 4-96, 5-95, 6-94, 7-93, 8-92, 9-91, 10-90, 15-85, 20-80, 25-75, 30-70, 35-65, 40-60, 45-55, 50-50, 55-45, 60-40, 65-35, 70-30, 75-25, 80-20, 85-15, 90-10, 91-9, 92-8, 93-7, 94-6, 95-5, 96-4, 97-3, 98-2, or 99-1.

In certain embodiments, the admixing occurs in two separate chambers, with one chamber being used to produce carbonate products and the other chamber being used to produce bicarbonate products. In other embodiments, the admixing occurs in a bubble column or series of bubble columns. In still other embodiments, separation of carbonate and/or bicarbonate products from the admixture involves a heated-precipitation separation process. In some embodiments, the heat for the separation process is derived from heat exchange with incoming flue-gases. The separated carbonate may be in the form of an aqueous slurry or as a solution of hydroxide, carbonate, and water at various concentrations at the time of separation, and if so, it can then be dried by any of a number of methods. In some embodiments, the carbonate need not be dried. For example, a slurry of sodium carbonate can be used in treatment of hard water. Of course, those of skill will know a wide variety of uses to which the carbonate produced via the methods of the invention can be put, for example, slurry mixtures of sodium bicarbonate and sodium carbonate can be slurried to tank-car for use in various forms of detergent manufacture, in glass manufacture as a flux, etc., as well as the previously-mentioned water-treatment uses.

In certain embodiments, the method further comprises transporting the carbonate products to a remote sequestration site; combining the carbonate products with acid in a neutralization reaction to generate pure carbon dioxide; and injecting the carbon dioxide into a carbon bank. In other embodiments, other components of the gas stream are neutralized and/or entrained/captured in the carbonate-formation process, including $SO_X$, $NO_X$, and mercuric-containing material.

In some embodiments, obtaining the hydroxide comprises: obtaining a salt; admixing the salt with water, steam, or both to produce a solution; and electrolyzing the solution to produce a hydroxide. In other embodiments, obtaining the hydroxide comprises: obtaining a salt; admixing the salt with sulfuric acid and heat to produce a sulfate solution; evaporating the hydrochloric acid with additional heat leaving the group-I sulfate; and then electrolyzing that sulfate solution to produce a hydroxide. In certain embodiments, the solution is electrolyzed using a voltage greater than or equal to about 5 volts, while in other embodiments the solution is electrolyzed using a voltage less than about 5 volts. In some embodiments, the solution is electrolyzed using a voltage between 1 volt and 5 volts, including about 1.5 volts, about 2.0 volts, about 2.5 volts, about 3.0 volts, about 3.5 volts, about 4.0 volts, or about 4.5 volts, or at any range derivable between any of these points.

In certain embodiments, acid is added to the solution before it is electrolyzed. The acid can be any form of acid that can provide protonation to the solution, including but not limited to hydrochloric acid. Those of ordinary skill will understand that it is possible to obtain similar chemistry and electrolysis with any number of acids or mixtures of acids. In some preferred embodiments, the acid is hydrochloric acid. In other embodiments, the amount of acid added to the solution is based on a determination of the optimum protonation rate that achieves the lowest energy to produce reactants and the highest energy to recover from products.

In still other embodiments, the electrolyzing step occurs in an electrochemical cell having a catholyte side and an anolyte side and the carbonate and/or bicarbonate products are recycled to the catholyte side of the electrochemical cell. In other embodiments, the energy required by the method is supplemented with waste-heat recovered from the flue gas stream.

Other embodiments of the invention comprise a method of removing carbon dioxide from a gas stream comprising: obtaining sodium hydroxide in an aqueous mixture; admixing the sodium hydroxide with the gas stream to produce sodium carbonate, sodium bicarbonate, or a mixture of sodium carbonate and bicarbonate; and separating said sodium carbonate and/or bicarbonate from the admixture, thereby removing carbon dioxide from the gas stream.

In some embodiments, the method further comprises process-controlling the method to produce substantially only sodium carbonate or substantially only sodium bicarbonate. In other embodiments, the method further comprises process-controlling the method to produce a mixture of sodium carbonate and bicarbonate, which mixture can be comprised of about X % sodium carbonate and about Y % sodium bicarbonate, with X-Y combinations being any of the following: 1-99, 2-98, 3-97, 4-96, 5-95, 6-94, 7-93, 8-92, 9-91, 10-90, 15-85, 20-80, 25-75, 30-70, 35-65, 40-60, 45-55, 50-50, 55-45, 60-40, 65-35, 70-30, 75-25, 80-20, 85-15, 90-10, 91-9, 92-8, 93-7, 94-6, 95-5, 96-4, 97-3, 98-2, or 99-1.

In certain embodiments, the admixing occurs in two separate chambers, with one chamber being used to produce sodium carbonate and the other chamber being used to produce sodium bicarbonate. In other embodiments, the admixing occurs in a bubble column or series of bubble columns. In still other embodiments, separation of sodium carbonate and/or bicarbonate from the admixture involves a heated-precipitation separation process. In some embodiments, the heat for the separation process is derived from heat exchange with incoming flue-gases.

In certain embodiments, the method further comprises: transporting the sodium carbonate to a remote sequestration site; combining the carbonate products with acid in a neutralization reaction to generate pure carbon dioxide; and injecting the carbon dioxide into a carbon bank.

In some embodiments, obtaining sodium hydroxide comprises: obtaining sodium chloride; admixing the sodium chloride with water, steam, or both to produce brine; and electrolyzing the brine to produce sodium hydroxide and chlorine gas. In other embodiments, obtaining the hydroxide comprises: obtaining a salt; admixing the salt with sulfuric acid and heat to produce a sulfate solution and hydrogen chloride as a gas leaving the group-II sulfate solution; and electrolyzing that sulfate solution to produce a hydroxide. In certain embodiments, the brine is electrolyzed using a voltage greater than or equal to about 5 volts, while in others is electrolyzed using a voltage less than about 5 volts. In some embodiments, the solution is electrolyzed using a voltage between 1 volt and 5 volts, including about 1.5 volts, about 2.0 volts, about 2.5 volts, about 3.0 volts, about 3.5 volts, about 4.0 volts, or about 4.5 volts, or at any range derivable between any of these points.

In certain embodiments, the electrolyzing step occurs in an electrochemical cell having a catholyte side and an anolyte side and the sodium carbonate and/or bicarbonate are recycled to the catholyte side of the electrochemical cell. In other embodiments, the energy required by the method is supplemented with heat energy recovered from the waste-gas stream. In still other embodiments, the method further comprises collecting the chlorine gas, while in others hydrogen gas is produced. In some embodiments, the hydrogen gas and the chlorine gas are combusted to form hydrochloric acid, which is added to the brine before it is electrolyzed. In other embodiments, the hydrogen gas is combusted with atmospheric oxygen or oxygen from stock chemicals to produce water, while in others the methods comprise using the hydrogen gas to produce energy. In some embodiments, separation of sodium carbonate and/or bicarbonate from the admixture involves a heated-precipitation separation process in which the heat for the separation process is derived from the energy produced by the hydrogen gas, while in others heat is supplied from the energy of the waste-gas stream. In others, the hydrogen gas is co-burned with coal to improve coal-fired emissions or it is used in a combustion process for fuel-cell recovery of DC electricity.

In some embodiments, the waste-gas stream is an exhaust stream from a plant, while in others the plant is a power plant that employs a carbon-based fuel source. In certain embodiments, the exhaust stream comprises $CO_2$ and $H_2O$.

Particular embodiments of the present invention also comprise an apparatus comprising: a electrolysis chamber comprising at least one cathode and at least one anode, the chamber adapted to produce hydroxide during use; mixing equipment operably connected to the electrolysis chamber and to a conduit adapted to contain a gas stream during use, the mixing equipment adapted to admix hydroxide from the electrolysis chamber with the gas stream during use to create an admixture in which carbon, sulfur, and/or nitrogen compounds in the gas stream can react with the hydroxide; and a separation chamber operably connected to the mixing equipment and adapted to separate the admixture into a separate gas phase and solid and/or liquid phase.

In some embodiments, the electrolysis chamber comprises a membrane cell, a diaphragm, and/or mercury. In certain embodiments, the mixing equipment is a batch reactor or series of batch reactors, while in others the mixing chamber is a gas/liquid absorption/reaction device or series of gas/liquid absorption/reaction devices. In other embodiments, the mixing chamber is a crystallization tower or series of crystallization towers, while in others it is a bubble column or series of bubble columns.

In certain embodiments, the apparatus further comprises a drying chamber operably connected to the separation chamber and adapted to remove liquid from the solid and/or liquid phase during use, while in others, the drying chamber is adapted to heat the solid and/or liquid phase during use. In still other embodiments, the apparatus is further defined as operably connected to a power plant.

In some embodiments, the electrolysis chamber is adapted to produce chlorine gas and sodium hydroxide from sodium chloride and water during use. In other embodiments, the mixing equipment is adapted to admix hydroxide from the electrolysis chamber with carbon dioxide from the gas stream during use to produce carbonate and/or bicarbonate products.

In still other embodiments, the present invention comprises a method of determining optimal operating voltage and current of an electrochemical cell for low-voltage operation with respect to increased area, for a given V/I characteristic at a given protonation. In other embodiments, the invention comprises a method for determining a lower thermodynamic limit on operating voltage for a given electrolytic cell employed in the process. In certain embodiments, a method of defining ecological efficiency ($\partial CO_2/\partial E$) generally for devices that accomplish work to remove $CO_2$ from waste streams is provided, while other embodiments include a method of defining ecological efficiency ($\partial CO_2/\partial E$) specifically for devices that employ the present invention in any of its embodiments. Other embodiments include a method for producing extremely pure hydrogen gas at a low price-indifference point, its cost equaling the retrievable energy content.

I. Overview of Advantages

Like any other method or apparatus that performs work to accomplish an objective, many embodiments of the present invention consume some energy to accomplish the absorption of $CO_2$ and other chemicals from flue-gas streams and to accomplish the other objectives of embodiments of the present invention as described herein. However, one advantage of certain embodiments of the present invention is that they provide ecologic efficiencies that are superior to those of the prior art, as explained in detail in Examples 5 and 6. As is evident from the data in Examples 5 and 6, amplified waste-heat-recovery or non-greenhouse-gas-generated energy for powering the process, use of even-lower-voltage electrolysis, and improving electrical return from hydrogen-energy-recovery can further improve the ecologic efficiency of the process, up to and surpassing the point where the process is fully powered by waste-heat recovery (and the recovery of hydrogen-energy), and absorbs virtually 100% of power-plant emitted $CO_2$.

Additionally, one benefit of employing the extreme chemistry of certain embodiments of the present invention such that they absorb the weak-acid $CO_2$ is that the process virtually completely absorbs the strong acids, $SO_X$ and $NO_X$, and, to a lesser extent, mercury. Tests using $SO_X$/Ar and $NO_X$/Ar in charged-load single-stage decarbonators have demonstrated 99%+ removal of these components of flue-gas (by "99%+," it is meant that the presence of either pollutant in a 14 L/min flue-gas processing case was not detectable in the product air-stream by gas-chromatograph technique, i.e., they were effectively removed). In certain embodiments of the present invention, the incidental scrubbing of $NO_X$, $SO_X$, and mercury compounds can assume greater economic importance; i.e., by employing embodiments of the present invention, coals that contain large amounts of these compounds can be combusted in the power plant with, in some embodiments, less resulting pollution than with higher-grade coals processed without the benefit of the $CO_2$/absorption process of certain embodiments of the present invention.

Further, the scale-ability of certain embodiments of the present invention can be carried out to extreme gradations; i.e., since, in certain embodiments, the process is electrically controlled, that electrical power expense can be virtually scaled to the individual molecule of absorbent produced at any given time. Also, the ability to accurately determine the amount of $CO_2$ absorbed is practical and straightforward: weigh the carbonate/bicarbonate products formed, measure their ion ratio by assay, perform a calculation to determine moles of $CO_2$ absorbed, and the $CO_2$ absorbed is easily confirmed and measured (a factor that may benefit certain incentive regimes for the removal of $CO_2$ and other chemicals in flue-gas).

Another additional benefit of certain embodiments of the present invention that distinguishes them from other $CO_2$-removal processes is that in some market conditions, the products are worth considerably more than the reactants required or the net-power or plant-depreciation costs. In other words, certain embodiments are industrial methods of producing chlor-hydro-carbonate products at a profit, while accomplishing considerable removal of $CO_2$ and incidental pollutants of concern. All other competing CO2 capture methods are simply additional costs-of-operation.

II. Process-Flow Diagram

FIG. 1 depicts a simplified process-flow diagram illustrating general, exemplary embodiments of the apparatuses and methods of the present disclosure. This diagram is offered for illustrative purposes only, and thus it merely depicts specific embodiments of the present invention and is not intended to limit the scope of the claims in any way. As shown in FIG. 1, flue-gas (FG) enters the process at 901, potentially after initially exchanging waste-heat with a waste-heat/DC generation system. FG, entering in this example as a 300° C. mixture of gases, is first delivered by pipe 902 to FG/Bicarbonate Heat Exchanger 903, in which the FG temperature is reduced in this example to 120-140° C. Similarly, the FG continues through Anolyte/FG Heat Exchanger 904 and Catholyte Heat Exchanger 905, lowering its temperature to 95° C., and then through Water/FG Heat Exchanger 929, lowering its temperature further to 30° C. The FG exiting Water/FG Heat Exchanger 929 is then introduced to a valving arrangement, Flue-Gas Temperature Mix Control 931, in which the 30° C. FG can be mixed with 120-140° C. flue-gas, delivered also to Flue-Gas Temperature Mix Control 931 by means of Hot Flue-Gas Process Pipe 906. FG mixtures between 30-140° C. may then be differentially introduced to the bottom of Carbonation/Absorption Column 907, which can be a packed or unpacked bubble column, in which the gas is injected or sparged, with the effect that the gas forms bubbles that rise through the fluid, collecting at Upper Vent 908. In this embodiment, the partially or wholly decarbonated fluid is then injected and passed through Bicarbonation/Conversion Column 909, bubbles through the fluid in that column, is pulled by a blower further, and is ejected to Vent 910.

The fluid used in FG/Bicarbonate Heat Exchanger 903 is sodium bicarbonate/carbonate and various sulfate, nitrate, mercury, and particulates and aerosols absorbed from the flue-gas in the Absorption/Conversion Columns (907 and 909). By its contact with the 300° C. incoming FG, this liquid fluid is heated to temperatures sufficient to develop significant water vapor pressure, producing steam when the fluid is injected into Tank 911, which is then condensed in Condenser 912, with the resulting distilled water being recycled to $H_2O$ Reclaim Tank 913, which is further used, after any needed conditioning, to form brine in Brine Mixer 914. The fluid used in the Anolyte/FG Heat Exchanger 904 is brine made from the addition of group-1 and group-2 salts (in this example NaCl) to water either supplied from Water Main Supply 915 or partially or wholly supplied from $H_2O$ Reclaim Tank 913. This brine is protonated (acidified) by the addition of HCl in the form of HCl gas absorbed by water, or from stock chemical HCl, all controlled by pH Closed-Loop Controller 916. This fluid circulates through Anolyte Section 917 of Electrolysis Cell 933. Similarly, the fluid used in Catholyte/FG Heat Exchanger 905 is NaOH(aq) that is circulated through Catholyte Section 918 of Electrolysis Cell 933. When the pH of the Catholyte exceeds minimum pH (as proxy for concentration) value at Control Point 919, concentrated NaOH is delivered to Hydroxide Storage Tank 920.

The fluid used in Water/FG Heat Exchanger 929 is from a sufficiently large water reservoir at a sufficiently cool temperature to accomplish the heat-exchange. In some embodiments, this heat exchange system can be used as a "prewarming" treatment for bicarbonate/carbonate solutions prior to further heat exchange in Flue-Gas/Bicarbonate Heat Exchanger 905. Also, in some embodiments, the tanking for Water Main Supply 915, $H_2O$ HX Storage Tank 937, and $H_2O$ Reclaim Tank 913 may be partially or wholly consolidated.

Protonated brine circulating through Anolyte Section 917 of Electrolysis Cell 933 is acted upon by the process of electrolysis, forming chlorine gas that is collected and moved through Chlorine Gas Line 921 to, in this example, Sodium Hypochlorite Reactor 924. Sodium ions and hydrogen ions (protons) are transported through the membrane of Electrolysis Cell 933 into Catholyte Section 918. Here, sodium ions displace hydrogen ions in the water, allowing the formation of hydrogen gas, which is taken away in Incoming Pure Hydrogen Gas Piping 922 to $H_2/O_2$ Fuel Cell 923, where it is combined with atmospheric $O_2$ to produce DC electricity, which is recycled to Electrolysis Cell 933 in this example, and pure water, which is recycled through Pure Water Recovery Loop 935 to $H_2O$ Reclaim Tank 913. The chlorine gas delivered to Sodium Hypochlorite Reactor 924 is contacted (bubbled) through sodium hydroxide delivered to the reactor from Hydroxide Storage Tank 920. Sodium hypochlorite results and is tanked to market or further use as a feed-stock chemical. Some of the chlorine and HCl gas produced (using the super-stoichiometric amount, a, will produce a continuous recycle of HCl excepting make-up losses) is here combusted in HCl Fuel-cell 925, which is then recycled through HCl Acid Gas Reflux Line 926 to Brine Mixer 914.

Hydroxide produced and stored, or made from stock chemicals and tanked in Hydroxide Storage Tank 920, is the absorbent fluid introduced to Carbonation/Absorption Column 907. It is then passed through Bicarbonation/Conversion column 909 and is then delivered (as a bicarbonate/carbonate mixture in water) to FG/Bicarbonate Heat Exchanger 903. After removing water through evaporation, a product slurry of concentrated bicarbonate/carbonate is delivered to Product Bicarbonate Tank 927, where it can be drawn for further processing or refinement, or it can be sent to disposal or to market.

Each of the generalized components of the apparatuses and methods of the present disclosure as described above and shown in FIG. 1 are described in further detail below.

III. Aqueous Decarbonation (Absorption) of $CO_2$ from Waste Streams and its Conversion into Carbonate and Bicarbonate As noted above, in certain embodiments, the apparatuses and methods of the present disclosure employ an aqueous decarbonation process whereby gaseous $CO_2$ is absorbed into an aqueous caustic mixture where it then reacts with the hydroxide to form carbonate and bicarbonate products. In many embodiments of the present invention, unlike other capture/sequestration schemes, sodium hydroxide is used as the primary absorbent fluid. Sodium hydroxide, in various concentrations, is known as a ready absorber of $CO_2$. When carbon dioxide is brought into contact with aqueous sodium hydroxide, a continuum of products that range from pure sodium bicarbonate ($NaHCO_3$) to pure sodium carbonate ($Na_2CO_3$) can be formed, and differing conditions can be produced that will drive the equilibrium either direction, even unto completion (or its near vicinity) and in sufficient concentration (by either process chemistry or removal of water by various means) the precipitation of bicarbonate, carbonate, or a mixed precipitate containing both compounds.

Figure 3:
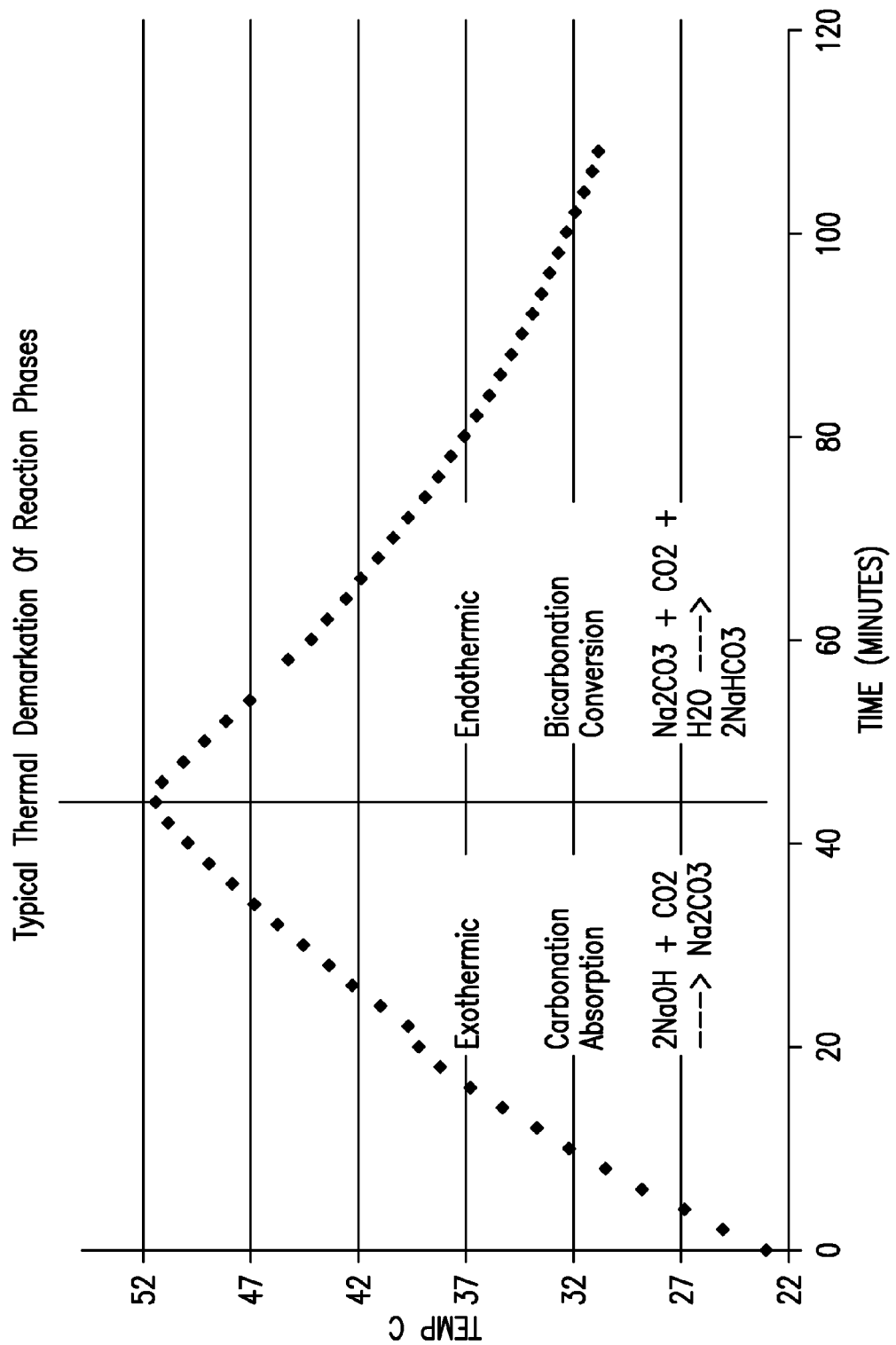
FIG. 3 is a chart showing the thermal behavior approximated by fluid within a reaction chamber as the reaction proceeds for the time indicated.

When carbon dioxide is brought into contact with aqueous sodium hydroxide, the fluid within the reaction chamber approximates the behavior shown in FIG. 3 as the reaction proceeds for the time indicated. The two temperature-excursion phases correspond and identify two distinct reaction regimes:

(1) An initial absorption phase in which $CO_2$ is readily absorbed. The absorption ability of the fluid declines as the OH concentration declines, and absorption ends and in some instances reverses when OH ion concentration is consumed. The reaction is exothermic during this portion and forms almost exclusively carbonate.

(2) A secondary conversion phase in which $CO_2$ is not-readily absorbed. The passage of the flue-gas through the mixture does not cause any net $CO_2$ absorption by the fluid, but the fluid is significantly cooled by loss of heats of vaporization due to any evaporation of water, by any loss of $CO_2$ to the vapor state, and by any endothermic reactions taking place. During this phase, sodium carbonate already formed in solution is converted to sodium bicarbonate, by the following required net stoichiometry:

$$Na_2CO_3(aq) + H_2O(l) + CO_2(aq) \rightarrow 2NaHCO_3(aq)$$

Figure 2A:
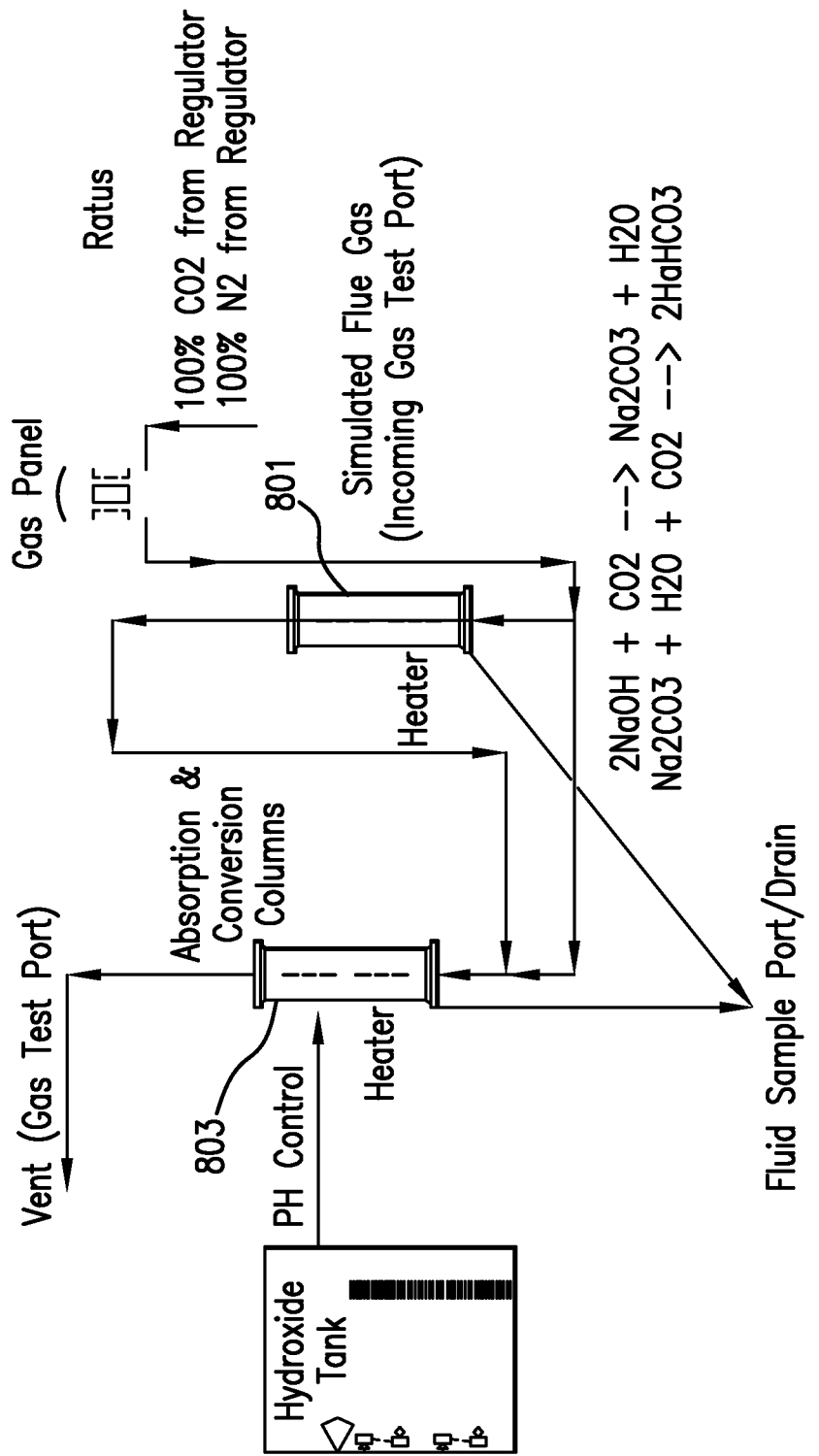
FIG. 2A shows an apparatus for observing the primary features of one embodiment of the decarbonation portion of the present invention.

This sequence of carbonation-first and then bicarbonation-second is reproducibly demonstrable by repeatedly running the apparatus in FIG. 2A (as explained in detail in Example 3) to and past the absorption limits of the fluid with different concentrations of absorbent.

The two phases are distinguished by the characteristics shown in Table 1 below.

TABLE 1

| Phase | Thermo-dynamics | Product | $CO_2$ Absorption | [OH] Presence |
|---|---|---|---|---|
| Carbonation | Exothermic | $Na_2CO_3$ | Robust | Plentiful |
| Bicarbonation | Endothermic | $NaHCO_3$ | Reduces, Nil or negative | De minimis |

While embodiments of the present invention could use the same chamber to accomplish these two processes in situ, the different natures of the reactions suggest that separating the reactions into two chambers and optimizing them separately is the proper path for preferred embodiments. Irrespective of the "internal arrangement" of transfer devices (i.e., the degree of batch-vs-continuous, few numbers of chambers, vessels, stages, etc.), the fundamental two processes occur in this sequence at molarities sufficient to provide good absorption.

Therefore, since some embodiments of the present methods and apparatuses can be process-controlled to produce pure or near-pure sodium bicarbonate, some embodiments of the present invention therefore capture one carbon per sodium produced by electrolysis, instead of ½ (an improvement in delivered ecologic efficiency nominally 2× that of carbonate production). Thus, the amount of electrolysis energy and processing spent to produce a mole of hydroxide has double the "normal" absorption power when used to form bicarbonate, compared to the absorption/energy efficiency of carbonate formation.

In various embodiments of the present invention, all forms of the bicarbonate/carbonate concentration spectrum may be produced. In preferred embodiments, the concentrations, temperatures, pressures, flow-rates, etc. of the fluids can be manipulated to optimize the proportion of "available" $CO_2$ absorbed to optimize the formation of bicarbonate.

Some embodiments of the invention may control pH in the absorbing fluid (OH ion concentration) as a means of controlling the absorption rate of the $CO_2$ and other gases. In some preferred embodiments, increased concentration of salts/carbonates can be used to further drive the reaction to bicarbonate formation. Market pricing of products and economic factors may allow operation to produce carbonate-rich product for a period of time, then bicarbonate-rich product for another period, etc., with the plant average of Na/C then forming a measure of its efficient use of the ionic species created for absorption/conversion.

By separating the two processes into two distinct chambers and transitioning between chambers at the point of OH exhaustion, temperature stasis/fall, and absorption attenuation, the manner in which a decarbonation apparatus can be built and optimized is altered. A person of skill in the art will understand that batch, pseudo-continuous, continuous, etc. versions of this simple two-stage process decarbonation process can be engineered.

Further, intending to accomplish the absorption with the least energy possible, many preferred embodiments of the invention may employ bubble-column reactors (packed or unpacked, with/without horizontal fluid flow, with or without horizontal fluid-flow) that by their nature create large liquid/gas contact area to aid mass transport, from which the overall design benefits by the freedom to utilize stages with short stage height (3 m or less) that yet achieve 90%+ absorption with little resistance or head-of-pressure to overcome in the pumping of the fluids, and therefore are designed with wide horizontal area to achieve industrial scaling (wide shallow pools or the equivalent in vessels), potentially with horizontal movement to accommodate continuous operation. Some embodiments of the invention may utilize gas-liquid contactors of many other configurations, as long as those devices attain the required gas-liquid contact.

Figure 4:
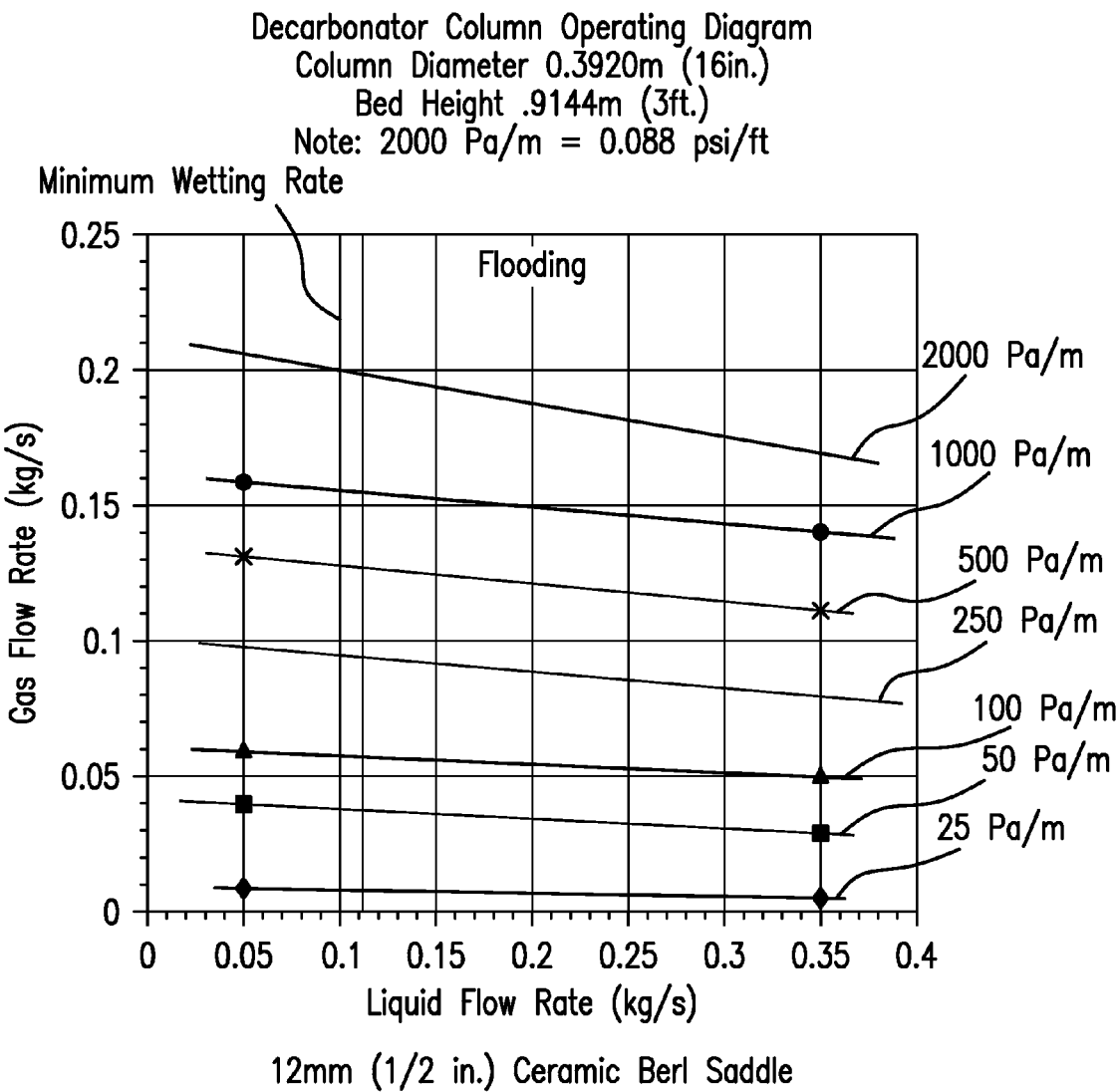
FIG. 4 is a chart showing a flooding study of a 5' column.

FIG. 4 shows a flooding study of a 5' column, in which resistance is approximately 0.01 psig, plus 1.52 psig of head to overcome the fluid-depth of 5'. These losses and other compression-costs are expected to expend less than 1% of the power plant basis, and as such are considered de minimis and not calculated in the examples. FIG. 4 confirms that extremely low resistances in the fluid-path will result in extremely low-energy compression to the effect that the ecologic efficiency of the device is not impaired by excess energy spent on compression or gas handling.

The ecological efficiency of embodiments of the present methods and apparatuses is enhanced by doing the least work possible to absorb $CO_2$, and one factor that detracts from that efficiency is the amount of compression, pumping of fluid and air that is required to accomplish that process. To that end, two high-efficiency absorbers (capable of removing 99% of the $CO_2$ from an incoming flue-gas stream that is 60% $CO_2$ in $N_2$) are designed to operate with "short stages" that achieve high $CO_2$ absorption rates.

Preferred embodiments of the invention use a wide-area liquid-gas transfer surface (bubble-column, packed or clear, or its equivalent in static or moving fluid vessels) to accomplish a high-absorption rate in a short height of fluid absorbent, thereby lowering the resistance necessary to bring the fluids into contact, and this "short stages design" therefore requires that wide, short "pools" or their equivalent in piping, trenches, vessels, etc. be employed to efficiently absorb large quantities of $CO_2$.

The decarbonation reactions of the present disclosure are generally considered by the mainstream industry and all its reference literature to be mass-transfer-limited. In practice, using packed or un-packed columns with wide-area gas-liquid contact absorption in bubble-rising-through-fluid methods, the reaction appears to have little mass-transfer limitations, or said differently, utilizing the present method of bubble-column design for liquid-gas contact appears to overcome the mass-transfer limitations handily: bubbling with zero packing through a sparger with only 30 cm of gas/liquid contact distance has been demonstrated to produce instantaneous rates of 98%+ absorption of $CO_2$ (see FIGS. 2B and 2C as discussed in Example 3), and over industrially-significant timeframes of 15-25 minutes the fluid retains the ability to average as much as 80%+ absorption. This is hardly seriously mass-transfer limited, and practical experimentation, even with a simple charged load run to extinction, demonstrates the ready mass-transfer of this chemisorption.

Three examples of the design of high-absorption $CO_2$/NaOH absorption reactors are explained in detail in Examples 1-3. The conclusions drawn from Examples 1-3 are that high-absorption rates with short stages of NaOH is proven and demonstrated as industrially capable of removing high-percentages of incoming $CO_2$ at low-resistance, in vessels of manufacture-able dimensions.

In summary, certain embodiments of the present invention, with respect to the decarbonation portion of the methods and apparatuses, comprise one or more of the following attributes:
(1) use of short-stages to achieve high-absorption rates of $CO_2$ in a carbonation phase of the reaction;
(2) separation and processing of carbonated fluid in a bicarbonation process through continued contact with $CO_2$-bearing process gas (or other $CO_2$-bearing gas with concentrations of $CO_2$ greater than the partial pressure of $CO_2$-reforming from the absorbent fluid);
(3) possession of a process sequence that can be used, by process control of state variables and concentration, to produce pure bicarbonate, pure carbonate, and all various mixtures between; and
(4) embodiments of the invention can be as efficient as a 1:1 sodium/carbon absorption ratio; this optimizes the $CO_2$ absorbed per kw-hr (a variant of Ecologic Efficiency, ($\partial CO_2/\partial E$), used in producing the reactant.

IV. Separation of Products

As noted above, in certain embodiments, the apparatuses and methods of the present disclosure employ a separation process by which the carbonate and bicarbonate products are separated from the liquid solution. Separation of liquid solution products requires an involved process. The formation of sodium hydrogen carbonate ($NaHCO_3$ or sodium bicarbonate) and sodium carbonate ($Na_2CO_3$ or soda ash) in a liquid equilibrium with sodium hydroxide (NaOH or caustic soda) occurs over a wide range of temperatures and pressures and provides different end-points of the equilibrium given different partial pressures of $CO_2$. By manipulating the basic concentration, temperature, pressure, reactor size, fluid depth, and degree of carbonation, precipitates of carbonate and bicarbonate may be caused to occur. Alternatively, carbonate/bicarbonate products may be separated from their water by the exchange of heat energy with incoming flue-gases, in some preferred embodiments. Further, due to the solubility product constant differences between sodium carbonate and sodium bicarbonate, certain non-intuitive processing points can be reached; e.g., one of the peculiarities of the equilibria of carbonates of sodium in certain caustic solutions is that the addition of heat encourages precipitation of solid; also, at certain conditions, carbonates have been demonstrated to self-precipitate from the aqueous solution at high (93%+) purity.

Alternatively, in certain embodiments the heat for the separation process may be derived from the hydrogen produced in the original electrolysis or from creative uses of the waste-heat contained in the incoming flue-gas stream. The crystallization process inherently purifies the crystallizing mineral through the well-known process of purification by crystallization.

The exit liquid streams, depending upon reactor design, may include water, NaOH, $NaHCO_3$, $Na_2CO_3$, and other dissolved gases in various equilibria. Dissolved trace emission components such as $H_2SO_4$, $HNO_3$, and Hg may also be found. In one embodiment, to separate/remove the exiting liquid streams, e.g., removing/separating the water from the carbonates (in this sense of the word, "carbonates" means mixtures of carbonate and bicarbonate, potentially with hydroxides present as well; any separation technique applied to any such mixture would likely include adding heat energy to evaporate water from the mixture), the water may be boiled causing the water to be evaporated using Reboiler 106, shown in FIG. 6. Alternatively, retaining a partial basic solution (e.g., NaOH at approximately 1 molal) and subsequently heating the solution in a separating chamber may cause the relatively pure $Na_2CO_3$ to precipitate into a holding tank and the remaining NaOH re-circulates back to Reactor 200. In other embodiments, pure carbonate, pure bicarbonate, and mixtures of the two in equilibrium concentrations and/or in a slurry or concentrated form may then be periodically transported to a truck/tank-car. In other embodiments, the liquid streams may be displaced to evaporation tanks/fields, where the liquid, such as water, may be carried off by evaporation.

Figure 6:
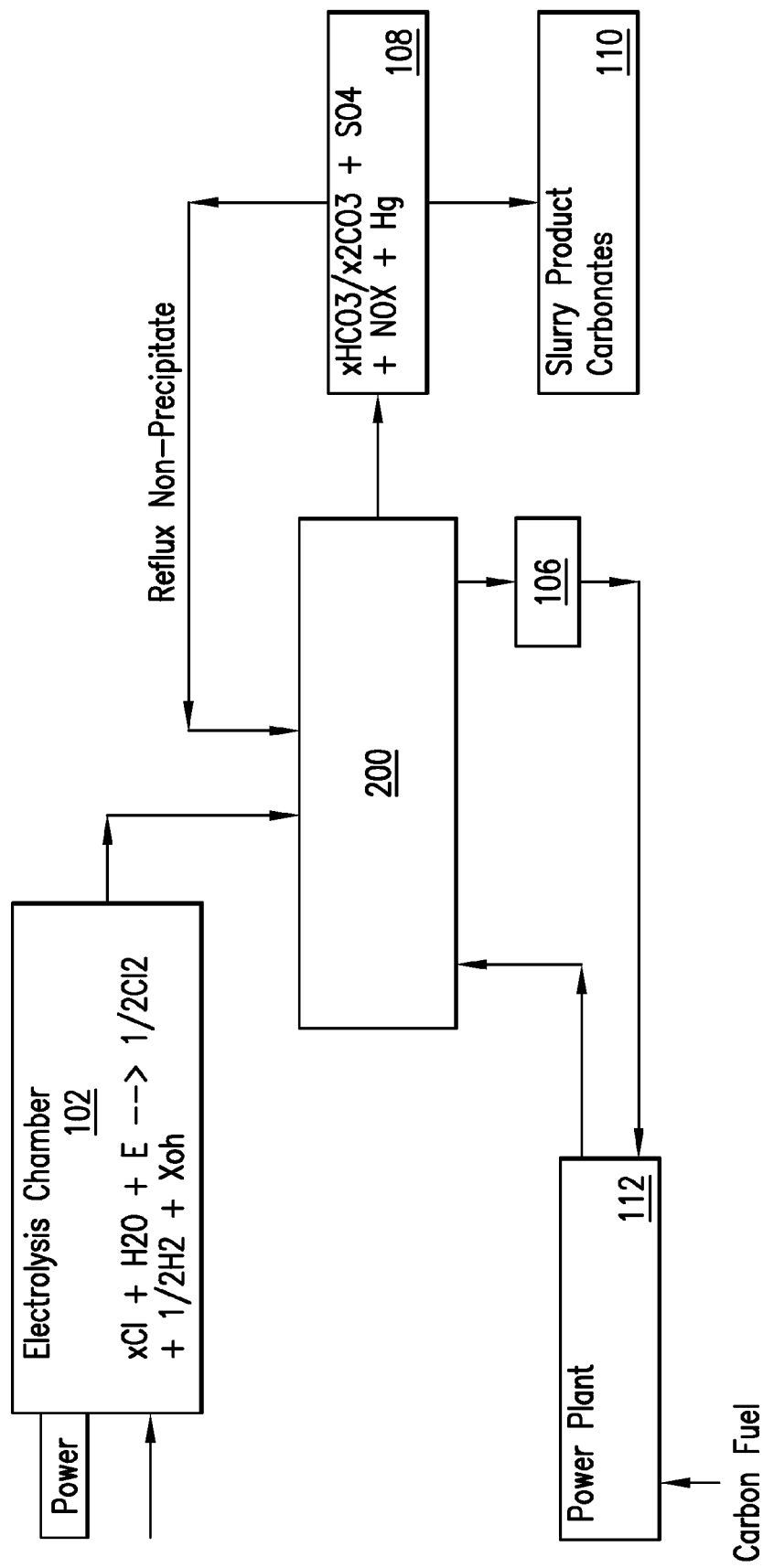
FIG. 6 is block diagram of a system including a reactor where hydrogen is not recovered, according to embodiments of the present invention.

Referring to FIG. 6, the reactor design shown may recover the energy stored in the electrolyzed hydrogen either as a combustion fuel, a boiler gas, or in $H_2/O_2$ fuel cells. Reactor 200 may be employed to produce a steady-state operation where NaOH and $NaHCO_3$ may by produced in approximately 50:50 proportions. The hydrogen gas produced in the original electrolysis may be used to provide heat, and the $NaHCO_3$ may be precipitated in Separation Chamber 108 with the remaining NaOH refluxed to Reactor 200. The slurry from Separation Chamber 108 may be provided to Water Treatment Chamber 110, which may be coupled to Separation Chamber 108. Alternatively, the slurry may be stored and subsequently provided to Water Treatment Chamber 110 as needed.

Figure 7:
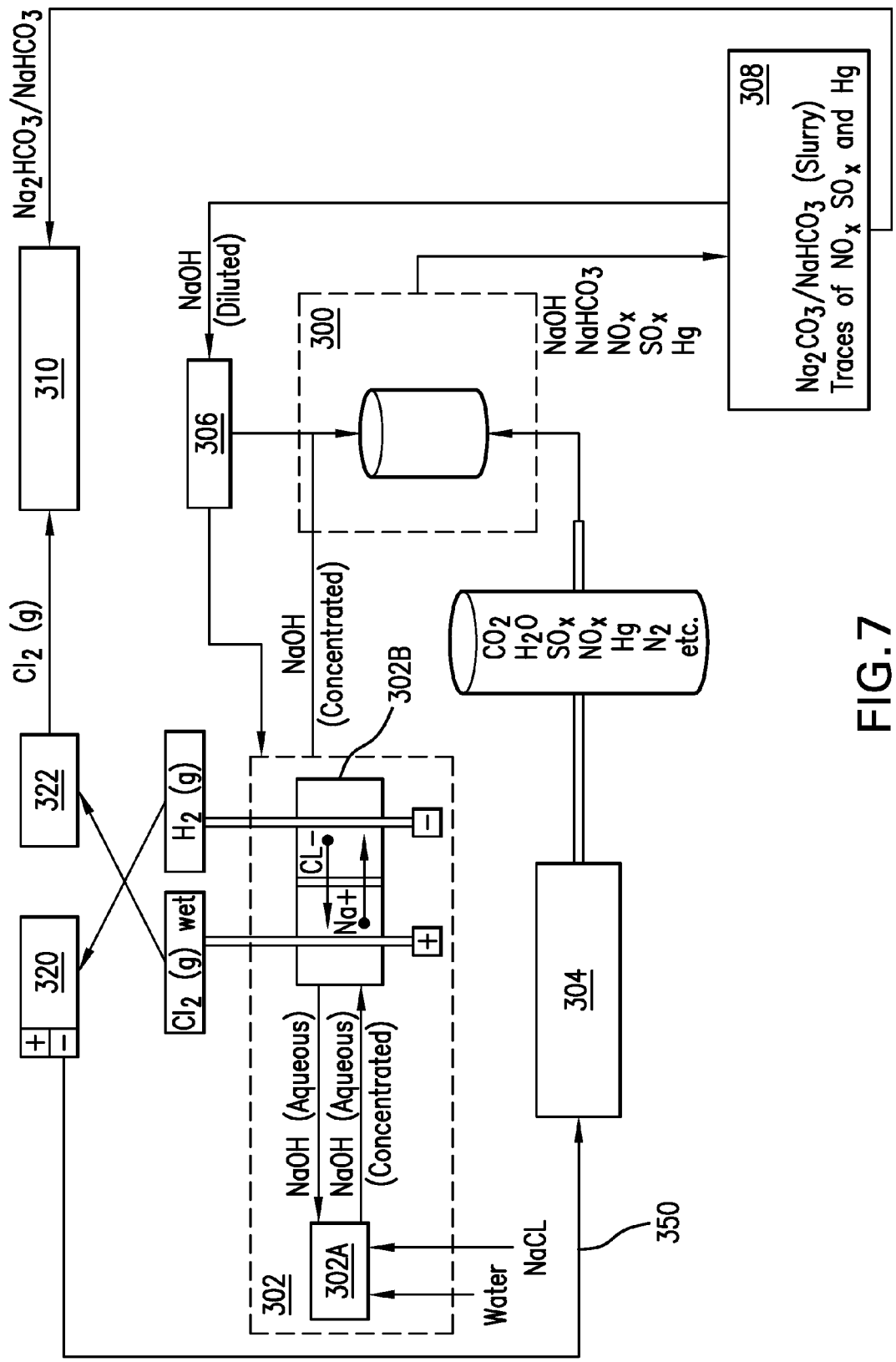
FIG. 7 is a block diagram of a system including a reactor where hydrogen is recovered through fuel-cell DC return, according to embodiments of the present invention.

FIG. 7 illustrates another reactor design, according to an embodiment of the present invention. In particular, FIG. 7 shows a re-capturing of some excess energy used to create the hydrogen by-product. The use of a tandem, on-site high-efficiency fuel-cell may allow for a direct-current recovery that may be used to supplement and partially supply the electrolysis current. Mixing Chamber 300 provides an admixture including, but not limited to, a percentage of NaOH, $NaHCO_3$, and $NO_X$, $SO_X$, and Hg to Separation Chamber 308. Separation Chamber 308 may separate the admixture into solid and/or liquid phases by a providing heat to the admixture. A drying chamber (not shown) of Separation Chamber 308 may remove the liquids from the solid and/or liquid phase during the process by providing the heat. A resulting dilute form of NaOH is provided to Boiler 306 which boils the diluted NaOH into a concentrated form and provides the concentrate to Mixing Chamber 300 via a reflux loop. The water from Boiler 306 can be provided to Electrolysis Chamber 302, in particular Brine Mixer 302A. The resultant $Na_2CO_3/NaHCO_3$ (slurry) from Separation Chamber 308 can be provided for commercial use. In one embodiment, the carbonate slurry can be directly or indirectly (e.g., storing the $NaHCO_3$ for later use in process such as hard-water treatment) provided to a Water Treatment Plant 310. Alternatively, the $NaHCO_3$ can be further refined, dried, shipped, and provided for other industrial uses.

The release of gaseous products includes a concern whether NaOH or components of same can be released safely, i.e., emitting "basic rain" from a power-plant is equally to be avoided as emitting "acid rain." However, sodium hydroxide is normally used as a scrubbing element in power-plant production and is approved for use by the EPA. The handling of sodium hydroxide in power plants as well as the procedures to avoid basic release is well-known in the art. For example, a simple and inexpensive condenser/reflux unit may prevent any significant emission of NaOH in gaseous exhaust.

In a carbonate separation precipitation method according to certain embodiments of the present invention, the carbonate equilibrium sterically binds carbon-dioxide and absorbs the gas on contact, with a substantially instantaneous conversion to carbonate ion. The reaction chain may be mass-transport limited such that once the carbon-dioxide has been absorbed by the base, the subsequent ionic reactions occur at rapid pace.

The sodium carbonate equilibrium has a characteristic where as temperature is raised, $Na_2CO_3$ naturally precipitates and collects, which makes it amenable to be withdrawn as a slurry, with some fractional NaOH drawn off in the slurry. In one embodiment, a bleed-through treatment of this slurry with some of the wet chlorine produced in the chlorine cycle may be used to reduce the NaOH to trace NaCl in the $NaHCO_3$ at levels that either approximate, or are less than, sodium carbonate produced by mining subterranean "trona" or deposits. As such, the sodium carbonate/caustic equilibria provides carbon with complete transport from gas to liquid to solid. In other embodiments, it may be beneficial to use the carbonate loop as a collection medium to collect a slurry of ash, sodium hydroxide, and other various carbonates and impurities and truck off the slurry as road-base.

V. Electrolysis for the Production of Absorbent Fluid at Low Energies

As noted above, in certain embodiments, the apparatuses and methods of the present disclosure employ brine electrolysis for production of the sodium hydroxide that is used as the absorbent fluid in the decarbonation process. Brine electrolysis is an electrochemical process primarily used in the production of concentrated sodium hydroxide (caustic soda) and chlorine gas, and is typically described throughout the relevant literature by the following equation:

$$2NaCl+2H_2O+e-\rightarrow 2NaOH+H_2(g)+Cl_2(g)$$

Brine electrolysis may be accomplished by three general types of standard electrolysis cells: diaphragm, mercury, and membrane cells. Each of these types of cells produces the same output products from the same input reactants. They differ from each other primarily in the way the reactants and products are separated from each other.

In one embodiment, a membrane cell may be used due to several factors. First, environmental concerns over mercury have reduced the demand for the mercury cell. Second, the diaphragm cells may produce a relatively weak caustic product which contains significant concentrations of salt and chloride ion and requires considerable subsequent reprocessing/separation to remove the significant salt content from the caustic. Third, improvements in fluorinated polymer technology have increased the life-time and electrical efficiency of membrane cell technology, where lifetimes in excess of 5 years are routinely guaranteed in the industrial markets. Further, the power-per-ton-of-caustic efficiencies exceeds those of both diaphragm and mercury cells in preferred implementations.

Membrane cell processing units are typified, but not limited to, the following generalized inputs and outputs:

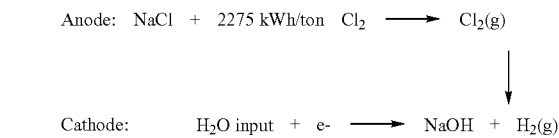

The sodium ion passes through the membrane or diaphragm and transitions from the anode side to the cathode side. Water is consumed on the cathode side in order to liberate hydrogen and form the hydroxide.

It is noted that the power requirements (e.g., 2275 kwh/ton of chlorine) may depend upon individual electrolysis cell designs. As such, the requirements may vary.

Many preferred embodiments may employ membrane cells in this function. Membrane cells have several advantages over other brine-electrolysis processes. First, membrane cells neither contain nor produce any environmentally sensitive emissions (e.g., mercury) and are electrically efficient when compared with diaphragm and mercury cells. They also employ a concentrated/dilute/make-up NaCl loop such that they may be well-suited for use as a continuous "salt loop" processing unit. Next, NaOH produced in membrane cells without further evaporation/concentration may be a naturally appropriate level of concentration for use in a decarbonation process (e.g., 30-33% NaOH by weight). Further, hydrogen produced by membrane cells is "clean," approximately "electronic grade," and relatively clear of NaCl or other contamination. As such, hydrogen may be compressed and tanked off as electronic-grade $H_2$ gas, used for power-production on-site such as combustion mix with low-grade coal or for combustion-technology gains. Alternatively, the hydrogen may be used for a boiler fuel for the separation processes, which may occur after decarbonation. Membrane cell technology may also be easily scaled from laboratory to plant-size production by the addition of small incremental units. Additionally, chlorine gas produced by the membrane process is less "wet" than that produced by other standard electrolytic processes. As such, a one-stage compression cycle may be sufficient for production of water-treatment grade chlorine.

The above represents the published and practiced state of the art as normally accomplished toward the end of producing commercial chlorine gas and caustic soda. However, the aims of certain embodiments of the present invention are different in several respects, which leads to different chemical techniques being employed to accomplish the differing ends of certain embodiments of the present invention.

Additional embodiments are based on sulfate electrolysis. In sulfate electrolysis, the salt is admixed with concentrated sulfuric acid and heat to produce sodium sulfate and gaseous hydrogen chloride. The hydrogen chloride is released for the solution as a gas along with some of the solution water by evaporation. Subsequently this hydrogen chloride is condensed directly into a saleable concentrated hydrochloric acid product. The sodium sulfate solution is then electrolyzed in an electrochemical cell and described by the following equations:

$$2NaCl+H_2SO4+heat\rightarrow Na_2SO_4(aq)+2HCl(g)$$

$$Na_2SO_4+2H_2O+e-\rightarrow 2NaOH+H_2SO_4+2H_2+O_2$$

The first equation above specifies the conversion of the chloride salt into the group-I sulfate. The second equation above specifies that the sulfuric acid is reconstituted during the electrolysis step. Thereby, the sulfuric acid operates in a chemical loop of two steps. Overall, the sulfuric acid is a catalyst that allows salt and water to be transformed into hydrochloric acid and useful byproduct gasses.

As in brine electrolysis, there are several arrangements of the electrochemical cell, with a membrane cell and diaphragm cell being more common. Both kinds of chemical cells operate on the following pair of chemical equations:

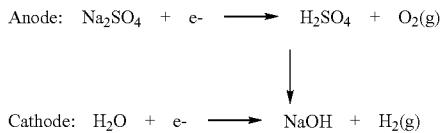

Thus, the sulfuric acid operates in a loop, taking the metallic ion from the salt where it can be electrolyzed at lower energy than brine electrolysis, and then the sulfuric acid is reformed during that electrolysis step. In addition, instead of producing gaseous chlorine ($Cl_2$), a final product of hydrochloric acid (HCl) is produced. The gaseous hydrogen and gaseous oxygen are valuable end products, or these can be consumed on plant in order to recover the energy contained and offset the power consumption of this process. Further, both the hydrogen and oxygen produced by membrane cells are "clean," approximately "electronic grade," and almost entirely clear of NaCl, sulfuric acid, or other contamination. As such, hydrogen and oxygen may be compressed and tanked off as electronic-grade $H_2$ gas and $O_2$ gas, used for power-production on-site such as combustion mix with low-grade coal or for combustion-technology gains. Alternatively, the hydrogen may be used for a boiler fuel for the separation processes, which may occur after decarbonation. Membrane cell technology may also be easily scaled from laboratory to plant-size production by the addition of small incremental units.

In additional embodiments, the oxygen liberated in the sulfate electrolysis step can be recirculated to a gas diffusion electrode at the cathode in order to suppress the hydrogen production (as a gas) and thereby eliminate the production of hydrogen gas. This avoids consuming the energy needed to produce the hydrogen and concomitant necessity to convert the liberated hydrogen back into energy.

A. Use of Low-Voltage Electrolysis Techniques

In some embodiments of the present invention, the brine electrolysis incorporates low-voltage electrolysis (LVE) techniques, thereby improving the thermodynamic energy efficiency of the process. Certain embodiments of the present invention do not exclusively manufacture caustic soda as an end-product, but instead use NaOH primarily as an intermediate absorbent to absorb $CO_2$ from flue-gas prior to its exit to the environment. Because the chlor-alkali business generally involves shipping caustic soda from the manufacturing plant to its point-of-use, transporting large quantities of water in the caustic soda is uneconomic, so caustic is generally concentrated to approximately 55 wt % for shipping as a liquid by the energy-intensive removal of water by steam-evaporation, and in some cases, it is concentrated to an anhydrous solid, generally pelletized form. This concentration is achieved most generally by running electrolysis cells at voltages over 5V (in the parlance, "at significant over-voltage"), which achieves the above-mentioned 30-35% NaOH, which is then followed by a steam-evaporation cycle to achieve the 55% (or to completely dry the product to anhydrous, palletized states, etc.).

Most embodiments of the present invention do not transport NaOH as a product, and it is producible at usable concentrations (as an aqueous absorbent fluid) at voltages significantly below the 5V+ standards used in chlor-alkali plant operation. The impact of employing LVE on the thermodynamic efficiency of the present invention cannot be overestimated or overstated, since power consumed is exactly to the simple DC equation:

$$P=V(\text{voltage})\cdot I(\text{current})\cdot(\text{current Efficiency})$$

Because the current (I) is fixed by the electrochemical process (one pair of electrons for each molecule, etc.), the power is nearly entirely regulated by the voltage (V) required to electrolyze (an additional strong factor is the current efficiency, which is also a function of applied voltage). Since embodiments of the present invention employ LVE with voltages easily demonstrated in brine electrolysis cells, by alteration of operating conditions, as low as 2.15V, through process and geometric modifications to a standard electrochemical membrane cell, embodiments of the present invention consume significantly less power (kw-hr) for each amount of NaOH formed than traditional high-voltage chlor-alkali electrolysis. For these reasons, preferred embodiments of the present invention include electrolysis units that are designed to employ all available techniques to accomplish low-voltage operation, including, but not limited to: narrow-gap operation, higher-pressure, higher temperature, wide-area membranes, altered concentrations of anolyte and catholyte and protonation-ion ratios. Further aspects of LVE are explained in detail in Example 4.

The energy requirements to convert the group-I ion of the chloride salt into the group-I hydroxide are substantial, and this in turn necessitated finding both means to avoid consuming anything more than the thermodynamic minimal energy in electrolysis, but also, in converting the byproducts back into electrical energy themselves. The sulfate electrolysis embodiments use heat from the flue gasses for a great deal of the energy of reaction. Thus the consumption of energy itself from the power plant has changed from consuming a valuable source of energy: electricity; to an energy source considered to be waste by the power plant: exhaust gas heat. Thus, sulfate embodiments are to be preferred.

B. "Point of Indifference" Hydrogen Use

Typical chlor-alkali operation produces hydrogen gas that is either burned on site as boiler-fuel for steam-evaporation (see above), or in many cases, is suppressed entirely by the use of an air-electrode; e.g., a device that blows air containing oxygen on the cathode causing the immediate reduction reaction to occur:

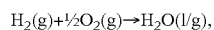

which alters the electrochemical summation of energies and lowers the voltage necessary to produce caustic and chlorine (in some cases as low as 2.8V in various industry literature) at the expense of not producing hydrogen. A benefit to some preferred embodiments of the present invention is that they have no need for hydrogen as a steam-evaporation boiler fuel.

Some embodiments of the present invention may include an "air-electrode" process that suppresses hydrogen production (and zeroes the ability to recover energy from that hydrogen), but many preferred embodiments utilize the production of hydrogen for either energy return or for use as a chemical feed-stock for other processes.

Plants employing certain embodiments of the present invention therefore have a "point of indifference" regarding the use of hydrogen so produced; i.e., the plant produces hydrogen for its energy return (e.g., 60% of its energy content in an example case, for instance), and that amount of energy has a certain economic value, and instead of using the hydrogen for energy return, the hydrogen may be traded or sold for amounts in excess or equal to that economic value of the electrical energy alone. In this manner, plants of this type represent "hydrogen wells" of a sort. Hydrogen is produced and consumed for its electric value, and anyone desiring the hydrogen for other purposes need only trade that electric value or its economic equivalent to maintain the economics of the process. This embodiment has beneficial implications for future "hydrogen economy" schemes: having a ready source of hydrogen, available at a price-indifference cost point lower than its innate energy content, may prove a useful and advantageous feature of this technology.

C. Use of Protonated Brine Optimization Techniques

Certain embodiments of the present invention intentionally optimize the production of hydrogen instead of suppressing it, by the following means of Protonated Brine Optimization. The general chlor-alkali industry has, in some occasions, employed the addition of HCl in the form of hydrochloric acid to the brine (NaCl) in the anolyte chamber. This "protonation" of the brine has the effect of lowering the voltage required to produce a specified amount of caustic in that it lowers the power required to make the reactant/absorbent of certain embodiments of the present invention. In the normal body of work of chlor-alkali plants, the cause of this voltage-lowering effect is attributed to "neutralizing NaOH that returns across the membrane," a process that has been studied versus membrane selectivity, etc. and is well-understood. Generally speaking, this "neutralization" is seen to produce only salt water [NaOH (returning)+HCl (anolyte)→NaCl+ $H_2O$] and is not shown to alter the stoichiometry of the products. However, one point that is not well-understood or exploited in the art is that the addition of HCl fundamentally does indeed alter the stoichiometry of the equation thus:

$$NaCl + aHCl + H_2O \rightarrow NaOH + (\tfrac{1}{2}+a/2)H_2 + (\tfrac{1}{2}+a/2)Cl_2$$

This additional quantity of hydrogen and chlorine produced is particularly of interest to the present invention, as some embodiments of the present invention rely upon energy-recovery from hydrogen (which is enhanced when more hydrogen is produced and is more economic when more chlorine gas is produced, per mole of absorbent NaOH manufactured). That this additional bounty of hydrogen-for-energy-recovery and chlorine-for-sale is produced while the overall electrical voltage (therefore power and cost) is reduced leads certain embodiments of the present invention to optimize the value "a" for the lowest energy to produce reactants and the highest energy to recover from products. The optimum generally lies between 0.5 and 1.0M HCl in the solution of NaCl(aq). However, the optimization is specific for each cell design, geometry, concentration, temperature, and pressure regime. However, for each electrochemical cell, there is an optimum protonation rate ("a") that achieves a lowest-energy operation. In practice, extremely high "a" values (>0.15M at 90° C. for instance) will possibly blister most commercially-available membranes in short order. Of course, while HCl is a preferred acid for protonation of brine in the invention, many other acids, as known to those of skill in the art, can be used to protonate the brine.

D. Self-Producing the HCl that is Used for Protonation

Because certain embodiments of the present invention both use input HCl and produce $H_2$ and $Cl_2$ gas, the protonation of brine can be made self-reciprocating; i.e., $H_2$ and $Cl_2$ product gases can be burnt (in efficient fuel-cells or in plain burners) to produce HCl gas, which can then be recycled to the anolyte for protonation of the brine. The energy recovered from $H_2/Cl_2$ combustion is higher than that recovered from $H_2/O_2$ combustion. This adds to the thermodynamic efficiency of the invention.

Some preferred embodiments of the present invention use an absorption/conversion/regeneration pathway as a "front-end concentration/absorption process" that is then used to absorb and concentrate $CO_2$ for use in geologic, oceanic, or terrestrial sequestration techniques (for example, those that inject $CO_2$ into carbon banks) by the following means or similar:

(1) All hydrogen is combusted to produce HCl gas.
(2) All HCl gas is reacted with the sodium bicarbonate so produced
(3) Through the associated neutralization reaction, nearly 100% pure $CO_2$ is released, and salt water is regenerated that can be recycled for further absorption cycles.
(4) By this process, the invention is used to absorb, convert, and then release the $CO_2$, with the net effect that the gas is removed from the flue-stream, and concentrated for further sequestration techniques to then process.

E. Mixing Carbonates and Bicarbonates Back into the Catholytic Fluids

Unlike the chlor-alkali industrial use of chlorine/hydrogen cells, some embodiments of the present invention also recycle carbonate and bicarbonate mixtures to the catholyte (caustic) side of the electrochemical cell. Such techniques are wide and varied, but each operating point for the entire process has an optimum recycle of bi/carbonate mixtures to the catholyte, as this can, in some concentrations and conditions, lower cell voltage, and therefore cell power.

F. Use of Waste-Heat-Recovery for Heating of Fluids

Because certain embodiments of the present invention are employed in the presence of a power-plant or large emission of $CO_2$ in the form of flue-gas or other hot gases from combustion, there is ample opportunity to utilize this 'waste' heat in the optimization of the electro-chemical cell, unlike standard chlor-alkali processes. For instance, a typical incoming flue-gas temperature (after electro-static precipitation treatment, for instance) might well be 300° C. Heat exchangers can lower that flue-gas to a point less than 300° C., while warming the anolyte and catholyte fluids (which, for LVE, should generally be retained >90° C.) allows some embodiments of the present invention to operate without the power-losses associated with anolyte and catholyte heaters.

Waste heat is directly utilized in the sulfate electrolysis embodiments by heating the sulfuric acid solution during the addition of the chloride salt. This drives the solid salt into solution with the sulfuric acid and then drives the sodium bisulfate towards sodium sulfate. The heat required to drive this chemical reaction is sufficient to liberate the formed hydrochloric acid via evaporation. The consumption of this heat from the flue gasses avoids having to consume electrical energy in the subsequent electrolysis stage of generating the hydroxide. By the consumption of this heat energy from a waste source at the power plant, vast amounts of electrical energy are not consumed in electrolysis and thus, the energy performance of these embodiments are optimized.

G. Use of Waste-Heat-Recovery for Powering Process Equipment

Generally, since the flue-gas that is available at power-plant exits at temperatures between 100° C. (scrubbed typical), 300° C. (after precipitation processing), and 900° C. (precipitation entrance), or other such temperatures, considerable waste-heat processing can be extracted by cooling the incoming flue-gas through heat-exchange with a power-recovery cycle, of which an example is an ammonia-water cycle ("Kalina" patent process, for example), a steam cycle, or any such cycle that accomplishes the same thermodynamic means. Since some embodiments of the present invention rely upon DC power to accomplish the manufacture of the reagent/absorbent for the present invention, the process can be directly powered, partially or wholly, by waste-heat recovery that is accomplished without the normal transformer losses associated with converting that DC power to AC power for other uses. Further, through the use of waste-heat-to-work engines, significant efficiencies can be accomplished without an electricity generation step being employed at all. In some conditions, these waste-heat recovery energy quantities may be found to entirely power embodiments of the present invention.

VI. Generation and Use of By-Products from the Decarbonization and Electrolysis Processes As noted above, some embodiments of the apparatuses and methods of the present disclosure produce a number of useful by-products from the decarbonization and electrolysis processes, including chlorine gas, sodium bicarbonate, and hydrogen gas. In some embodiments, the hydrogen gas produced by the embodiments of the present invention is incorporated into a hydrogen energy recapture loop. In some embodiments, the present invention may include current fluorinated polymer membrane technologies to reduce chlorine-ion migration for the decarbonization process. The process may therefore function without extensive energy and cost expenditure to separate out the chlorine ion; the decarbonation and separation loops are relatively chloride-free. As such, an embodiment of a decarbonation reactor of the present invention may use common salt, water, and carbon dioxide exhaust combined with electricity to form chlorine gas, sodium bicarbonate, and power-recovery through hydrogen combustion as follows:

$$2NaCl + H_2O + 2CO_2 + e- \rightarrow 2NaHCO_3 + Cl_2 + [½H_2 + atm\ O_2 \rightarrow e-]$$

A. Hydrogen Energy Recapture Loop

Four techniques have developed that may use the hydrogen energy captured by embodiments of the present invention. The first is co-burning of hydrogen with coal to improve coal-fired emissions, and the second technique involves hydrogen/oxygen fuel cell recovery of DC electricity, the third technique involves the burning of hydrogen in a turbine connected to an electrical generator, and the fourth technique involves the mixing of hydrogen with natural gas and burning this mixture in a turbine designed for natural gas power generation and connected to an electrical generator. Alternatively, $H_2$ and $Cl_2$ may combust into $Cl_2$ and HCl directly or through fuel-cell or DC recovery. Sources of heat from waste-heat removal, from either the electrolysis reaction, which produces approximately 135° C. caustic soda to tank, or from the decarbonation process itself, which absorbs various heats-of-solution, heats-of-vaporization, and heat liberated in the exothermic reaction, can be utilized by well-known techniques (i.e., re-boilers, etc.) at power plant locations for the pre-heating of combustion gases or other uses.

In one embodiment, commercial fuel-cell production of DC electricity may be advantageous due to the easy-to-handle and safe operations at sub-atmospheric pressures. Immediate consumption of the produced hydrogen may also directly reduce the electrical load cost for the brine electrolysis. Further, since the hydrogen-energy recovery cycle may be produced with off-peak electrical production of $H_2$, $Cl_2$, and NaOH, where $H_2$ may be subsequently used to provide electricity during on-peak loads, the present disclosure provides for making reactants at low-cost while subsequently producing auxiliary high-cost on-peak electricity and simultaneously performing a decarbonation process. The economic utility of an $H_2$ energy recovery cycle to increase the peak power production of a plant by augmenting the current production with $H_2$ combustion capacity as either fuel or in a fuel cell may provide for the utility of a self-consumption basis.

Alternatively, given a clean carbon-produced source of electronic grade hydrogen gas, municipal utilities, industrial companies, and power-generation facilities may prosper from using hydrogen produced in municipal bus fleets, trains, and other public or private uses of hydrogen fuel.

Perhaps an optimal solution to the energy recapture loop is the suppression of hydrogen production in the sulfate embodiments. The sulfate electrolysis embodiments liberate oxygen on the anode. This oxygen can be pumped to a gas diffusion electrode in the cathode of the electrochemical cell, and thereby, prevent the formation of gaseous hydrogen by converting hydrogen ($H^+$) ions back into water ($H_2O$) immediately at the cathode. This saves the substantial electrical energy that would have been used to produce the gaseous hydrogen. The sulfate embodiments are particularly suited to perform this hydrogen suppression due to the direct production of oxygen and already low electrical energy requirements. The end result is a system that captures carbon dioxide by means of the hydroxide and produces only hydrochloric acid while consuming only a chloride salt.

B. Other Uses of By-Products from the Decarbonization Process

In some embodiments, the chlorine gas may be a primary oxidizing reagent used to kill bacteria in water-treatment plants around the world. Chlorine, and the some 100+ derivative feed-stock chemicals that derive from it, are often cited as being incorporated in as much as 30%+ of US domestic GDP. It may also be used in the manufacturing of the largest industrial chemical, hydrochloric acid. Chlorine is also extensively used in the plastics industry as its most common non-carbon reactant.

Sodium carbonate is a by-product of the process described in the present invention that is commonly used in the production of soap, detergents, and shampoos world-wide, as well as a flux in the manufacture of glass. Further, power utilities, as well as private homes, utilize sodium bicarbonate to soften hard water by the following general reaction:

$$CaCl_2(aq) + NaHCO_3(aq) \rightarrow CaCO_3(precipitate) + NaCl(aq) + HCl(aq)$$

A similar process may be employed using sodium carbonates and bicarbonates from this process to perform ion-exchanges with multiple group 1 and group 2 salts to precipitate various carbonates.

Another example of the by-products produced from the decarbonation process is hydrogen gas. Hydrogen gas, in electronic grade, is a high-form of energy carrier. Conversely, the hydrogen fuel produced can be burned with "dirtier" levels of coal to reduce that fuel's emissions, can be burned as boiler feed in the separation process, or can be utilized in hydrogen-vehicle fleets. In many embodiments, the hydrogen will be burned on site at the power plant in order to significantly reduce the energy penalty associated with the electrochemical processing step that produces the absorbent. Current literature indicates that turbines optimized for burning hydrogen are still a few years away and are expected to end up being able to convert as much as 70% of the thermodynamic energy contained within the gaseous hydrogen into electrical power. Today's best natural gas turbines operating in co-generation form can achieve 61% conversion of natural gas energy into electrical energy.

In further embodiments, it is possible to accomplish the effect of transporting carbon dioxide to remote sequestration sites by the following method, or its equivalent:

(1) At the power-plant site, $CO_2$ and other pollutants are absorbed by the process or any of its variants, along with the production of hydrogen, chlorine, and carbonates.

(2) At the remote sequestration site, hydrochloric acid and carbonates, are again combined in a neutralization reaction that generates virtually pure $CO_2$, CO, produced by these means may then be injected into the carbon bank.

By these means, the same net effect of transporting $CO_2$ between the power site and the sequestration site is achieved without the physical transport of $CO_2$ by liquification and transport by pipe-line, trucking, etc.

VII. Mercury/Heavy Metals Removal

The absorption of carbon dioxide, and the neutralization of stronger acid gases, from the incoming flue-gas-stream is generally enhanced by reducing the temperature of the flue-gas stream and maintaining lower temperatures in the absorbing fluids. This is intuitively obvious and has been shown true in laboratory and field operations.

When this cooling of the incoming flue-gas is accomplished, it can be done in such a way that the heat that is so-transferred can be used by various means that benefit the overall process, namely:

(1) heating of catholyte and anolyte fluids, the benefit being to operate without the energy-expense of electric or heaters using other means, and at higher temperatures, the electrolysis reaction occurs at lower voltages;

(2) evaporation of water from product carbonate/bicarbonate mixtures, the benefit being to accomplish same without the energy-expense of electric heaters to accomplish the separation, and to reclaim water for additional process use;

(3) heating of brine fluids, the benefit being to accomplish same without the energy-expense of electric heaters;

(4) other process heating applications.

When the cooling of the incoming flue-gas is accomplished in such a way that the temperature of the flue-gas falls below the dew-point of the flue-gas-mixture, water and various components fall out of the incoming flue-gas in the form of a water-condensate, which is typically acetic in nature (containing small quantities of acids formed from the $SO_X$ and $NO_X$ present in flue-gas, some carbonic acid, etc.) and contains a spectrum of various heavy metals, of which mercury is the predominant species, but also containing selenium, chromium, arsenic, lead, germanium, vanadium, and many other heavy-metals.

Either the removal of the heavy-metals from the water, or the removal of the water from the heavy-metals, can be beneficial for ecologic or economic reasons. Several methods of separation have been proven to work:

(1) evaporation of the water, either by natural or forced heat/convection means, that leaves the heavy-metals behind as concentrated metallic oxides;

(2) altering the pH of the water-condensate from an acetic to a basic condition, which alters the solubility of the metallic components, causing partial or near-total precipitation. By these means, natural gravimetric precipitation can be employed to remove the metallic oxides by a process of sedimentation; alternatively, the filtration technique mentioned in (4) below may be employed;

(3) processing the fluid through an absorptive resin, such that the heavy-metals are absorbed by the resin;

(4) passing the fluid through a filtering medium, such as activated charcoal, through the use of either passive (gravity-fed) or active pumping.

It has been demonstrated that slight additions of sodium hydroxide (readily available from the fundamental chlor-alkali process described herein) can be used to swing the pH from slightly acetic to slightly basic, causing precipitation of metallic substances to proceed, and that this, followed by forced filtration through an activated charcoal filter, can remove well over 90% of the entrained heavy-metals. For example, in some laboratory and field demonstrations, condensates containing up to 35-50 ppm mercury were shown to recover to less than 0.2 ppb mercury (the lower limit of the assay technique applied).

VIII. Alternate Chlorine-Gas Suppression Paths

It is anticipated that large-scale application of certain of the carbon dioxide sequestration processes described herein would eventually cause the migration of the native chlor-alkali production from its current location(s) to power-plant production. Several market questions arise during this transition.

First, the current chlor-alkali market, as its name suggests, supplies both chlorine and alkali (caustic soda), and considerable work has been done to insure that when one unit of chlorine is marketed, then one unit of caustic soda is simultaneously marketed; in this sense, the two markets—that of chlorine and that of caustic—have long been linked, and have been jointly-managed to sell/consume in stoichiometric ratios.

In the case of certain of the carbon dioxide sequestration processes described herein, only chlorine is produced, with the caustic soda consumed for carbon dioxide sequestration purposes. Caustic soda demand therefore goes unsatisfied by the process, and alternate means of producing for the caustic soda market are expected to emerge, which contain, but are not limited to, the following suggested means:

(1) Soda ash, or sodium carbonate, ($Na_2CO_3$) is a naturally-occurring mineral, found in great quantities in the United States; it is used in many applications as a direct substitute for sodium hydroxide, or caustic;

(2) Sodium hydroxide can be directly manufactured from sodium carbonate, by hydrated the carbonate (adding water) and heating it; i.e. $Na_2CO_3 + H_2O + heat \rightarrow NaOH + CO_2$. Providing that the $CO_2$ from such a process is captured and sequestered, then NaOH is produced for the (relatively small) caustic market that cannot migrate to other industrial bases;

(3) Other carbonates can be converted to hydroxides by similar means; and (4) Other industrial bases can be substituted for sodium hydroxide, depending upon the specific application.

At some point, the chlorine market becomes completely saturated with chlorine produced by certain of the carbon dioxide sequestration processes described herein. This market size may be larger or smaller than the current "static" chlorine market. De-linking the chlorine market from the caustic market, and potentially providing large quantities of chlorine produced by lower-power means can cause market elasticities to occur. Markets may thus expand to accept larger, cheaper, "de-linked" products. However, the presumption can be made that, at some point, the chlorine ion/gas generated by the certain of the carbon dioxide sequestration processes described herein can over-produce compared to the market for chlorine.

After the market has been saturated for chlorine, several means for directing the chlorine to safe uses have been proposed; in some embodiments, these means for directing chlorine first proceed to convert the chlorine from a gas to a liquid by the following general reaction:

$$Cl_2(g) + 2H_2O(l) + h\nu 363\ nm \rightarrow 2HCl(l) + \tfrac{1}{2}O_2(g)$$

Where hv363 nm refers to light of approximately 363 nm wavelength.

In some embodiments, the oxygen so-produced may be returned to the air-inlet of the power-plant itself, where it has been demonstrated throughout the course of power-industry investigations that enriched oxygen-inlet plants have (a) higher carnot-efficiencies, (b) more concentrated $CO_2$ exit streams, (c) lower heat-exchange to warm inlet air, and (d) other advantages over non-oxygen-enhanced plants.

It should be noted that the products of hydrogen and chlorine can also be directly combusted to produce HCl(g) which may then be neutralized as a gas, or can be mixed with water, wherein hydrochloric, or muriatic acid, is generated; it has been demonstrated that $H_2$ and $Cl_2$ can be combusted in a fuel-cell, with the direct-return of DC electric energy; similarly, the high-heat of combustion of $H_2$ and $Cl_2$ can be used to generate electricity in a more-traditional burner/turbine/generator arrangement.

Once the chlorine is converted into its liquid-form, as muriatic acid (hydrated HCl), then various means of neutralizing the acid can be accomplished, of which the following example processes are illustrative, but not exhaustive.

One form of neutralization would be to recombine the so-formed hydrochloric acid with the so-formed sodium carbonate/bicarbonate that originally absorbed the $CO_2$ from a dilute flue-gas stream (approximately 12% $CO_2$) and regenerating a concentrated $CO_2$-stream (approximately 100% molecular $CO_2$) by the following reaction:

$$HCl + NaHCO_3 \rightarrow NaCl + H_2O + CO_2(g)$$

This reaction can be accomplished by simple mixing, or by accomplishing the reaction across an appropriate membrane, DC-power from the acid-base battery so-formed may be extracted; further, the expansion/generation of gases may be trapped to run a generator (similar to techniques accomplished in amine-absorption-and-regeneration processes).

While this total-regeneration of the $CO_2$ gas may seem, at first, antithetical, the process accomplishes several keys to $CO_2$-capture-and-sequestration:

(1) The $CO_2$ has been captured from a dilute stream (12%) and then formed into a concentrated stream (~100%);
(2) Additional energy, in the form of DC power, or power derived from the generation by expanding-gases; and
(3) The reactant required to electrolyze (NaCl) has been regenerated, and, given appropriate conditioning, is prepared to be electrolyzed and absorb another cycle of $CO_2$, thus forming a chemical loop.

Using sodium bicarbonate to neutralize the chlorine is one way to accomplish the neutralization; other bicarbonates may be similarly used, with the result that different product salts are produced, which may be economically advantageous in certain circumstances.

Besides the use of Group-I-bicarbonates, Group-II-carbonates (such as $CaCO_3$, limestone) may be utilized to accomplish the neutralization under the following generalized reaction:

$$G2CO_3 + 2HCl(l/g) \rightarrow G2Cl_2(salt) + CO_2(g)$$

Note that the $CO_2$ so-liberated by the above reaction is 50% of the $CO_2$ generated in the prior example using a Group-1-bicarbonate for neutralization. Also, note that the prior means of energy-recouping (acid/base reactions across a membrane, generation of power from the generation of gases, etc) still apply.

The neutralization of the chloride-ion can also be accomplished by the use of Group-1-carbonates, as in the following example with sodium carbonate:

$$Na_2CO_3(l) + HCl(l) \rightarrow NaCl(l) + NaHCO_3(l)$$

Note that this reaction, as written, does not regenerate any gaseous $CO_2$; in some operating regimes, $CO_2$ is regenerated, leaving NaOH(l) behind; however, if conditions are suitably controlled, a non-generating reaction can be accomplished. Note that the acid-base energy-recovery opportunity (but not the energy from gas-regeneration) is available in this case.

Among all of these reactions, Group-I metals can be substituted for Group-I metals, and similarly, Group-II metals can be substituted for Group-II metals, in various carbonate and bicarbonate mixtures.

IX. Paired Wetted/Packed Bicarbonator w/ Liquid Carbonator

Initial development of efficient units for converting gaseous $CO_2$ into bicarbonate centered on the use of bubble-columns; those devices are known as the most volumetric efficient (Volume/chemical-converted) generalized design. During laboratory absorptions of simulated flue-gas streams, and during field-absorptions of genuine flue-gas streams, it has been demonstrated that the absorbing fluid goes from a predominantly hydroxide form to a predominantly carbonate form, and finally a bicarbonate form. In terms of the thermodynamic energy expense of the process, it appears that one embodiment of the process operates at the least overall input energy (i.e., the lowest electrolysis energy expense) when the ratio of sodium to carbon was a minimum; e.g., 1:1, as in the case of bicarbonate. Some embodiments involve separating the two main processes (i.e., the formation of carbonate from hydroxide, and the formation of bicarbonate from carbonate), both for the purposes of study and individual process optimization, by using a system that contains both a bicarbonator unit and a carbonator unit. Such units have been shown to drive the sodium to carbon ratio to nearly 1:1, or to produce greater than 95% bicarbonate under some controllable conditions. When optimizing for minimal reactor volume at high conversions-to-bicarbonate, a pair of bubble-columns accomplishes both.

However, there are different forms of optimization. For example, lowest-energy consumption, or lowest-energy-penalty in the absorption/conversion step, is a strong consideration, and optimizing for that condition has a different preferred process embodiment; namely, using a bicarbonator column that has very low pressure drop (resistance) to the flow of gas dramatically reduces the energy required to compress (via a blower or other parasitic energy device) flue-gas through the device. Some embodiments employ a bicarbonator column that is wetted and packed, but contains essentially zero-liquid-level. Such embodiments can be paired with a liquid carbonator column, can be paired with a similarly wetted/packed carbonator column, or can be combined into a single "uni-column" design, in which the hydroxide is converted to carbonate while partially through its descent in the column, and then "finished" into bicarbonate by the time it makes its exit from the column. Each of these different column designs tends to optimize a different parameter:

(1) double-bubble-column: most efficient on a volume/conversion basis; can achieve 95%+ conversion to bicarbonate without a subsequent separation/recycle treatment;
(2) wetted/packed-bicarbonate column with liquid carbonator: more efficient on an energy/ton $CO_2$ absorbed basis.

(3) wetted/packed double columns: low-resistance, low energy optimization; and (4) uni-column designs: least number of vessels.

Depending upon the targeted %-removal-of-$CO_2$ and other design parameters key to a specific plant design (% $SO_X$+ $NO_X$ per $CO_2$, space, cost, etc.) then each of these designs or combinations of the above in various orders and arrays may be preferred embodiments.

X. Sulfate Electrolysis

The process of producing the absorbent can be performed by means of brine electrolysis and by means of sulfate electrolysis. The sulfate electrolysis embodiments contain a number of chemical and electro-chemical reactions. And while the production of the caustic remains the fundamental reason that these processes are performed, the co-products consist of hydrogen ($H_2$), oxygen ($O_2$), and hydrochloric acid (HCl). Sulfate electrolysis is fundamentally more electrical energy efficient than brine electrolysis simply because a great deal of the required energy can be obtained from the waste heat of the flue gasses rather than through consuming electrical energy in the electrolysis step. In brine electrolysis there is a fundamental lower limit to the Voltage requirements in order to produce the caustic, and this limit is near 2.15V. In sulfate electrolysis where the hydrogen gas is not suppressed, the fundamental lower limit is close to 1.6V and almost equal to the effective thermodynamic energy contained within the product hydrogen gas. Secondarily, the liberation of pure oxygen makes access to the energy content of that hydrogen more direct. In sulfate electrolysis where hydrogen gas is suppressed, the fundamental lower limit may be close to 0.7V. This is an enormous savings in energy required to perform these reactions and enable the capture of carbon dioxide.

This process produces hydrochloric acid directly through the reaction equation:

$$2NaCl+H_2SO_4+heat \rightarrow Na_2SO_4+2HCl$$

rather than indirectly, as in brine electrolysis, and as described earlier. HCl is easier to transport then chlorine gas and is highly valued as a chemical stock reactant and requires none of the compression energy in order to deliver it to market.

The hydrochloric acid is evaporated with some water as flue gas heat drives the reaction forward, leaving the sodium sulfate and sulfuric acid in the admixture prior to electrolysis. The chemical transition that occur during this electrolysis step in the electro-chemical step are shown in the following equation:

$$Na_2SO_4+2H_2O+e- \rightarrow 2NaOH+H_2SO_4+2H_2+O_2$$

The sulfate ion is recycled back to the initial (salt transformation) step from the Anode, the caustic is produced and delivered to the flue gas handling just like in brine electrolysis, and hydrogen and oxygen are liberated in a stoichiometric ratio.

The skilled reader will immediately recognize that the co-products of HCl, $H_2$, and $O_2$ have already been discussed herein. Embodiments of this invention using sulfate electrolysis will utilize the same subsequent steps as previously described, and can utilize the same calculation methods described herein in optimizing this process with respect to cost, energy consumption or energy efficiency.

A further embodiment of the sulfate electrolysis invention takes the oxygen liberated at the anode and feed this oxygen to a gas diffusion electrode at the cathode, thus suppressing the production of hydrogen and saving vast amounts of electrolysis energy by this suppression. The resulting product of this process is only the hydrochloric acid as a saleable byproduct, and the caustic used to absorb the carbon dioxide from the flue gas stream.

EXAMPLES

The following examples are included to demonstrate preferred embodiments of the invention. These embodiments provide a feasible economic solution to reduce or even substantially eliminate the carbon dioxide and other pollutants from power plants by providing and using the resulting reactants in commercial or industrial processes and/or by recycling energy.

It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

$CO_2$/NaOH Bubble Column Reactor Design by Graphical Methods

In the bubble-column reactor designed for this example, there are four primary flow streams, namely:
(1) Liquid flowing into the fluid of the bubble column at a given volumetric flow-rate (Vl=cubic volume of fluid per time); in the chosen case, the incoming volumetric flow-rate equals the outgoing volumetric flow rate. Hence, both are Vl). In this example, Vl=0.001 $m^3$/sec.
(2) Vg0=the incoming volumetric flow rate of gas, which will be partially or wholly absorbed by the absorbent fluid. In this example, Vg0=0.05 $m^3$/sec.
(3) Vg=the exiting volumetric flow-rate of gas. In this example, Vg=0.02 $m^3$/sec.

Figure 8:
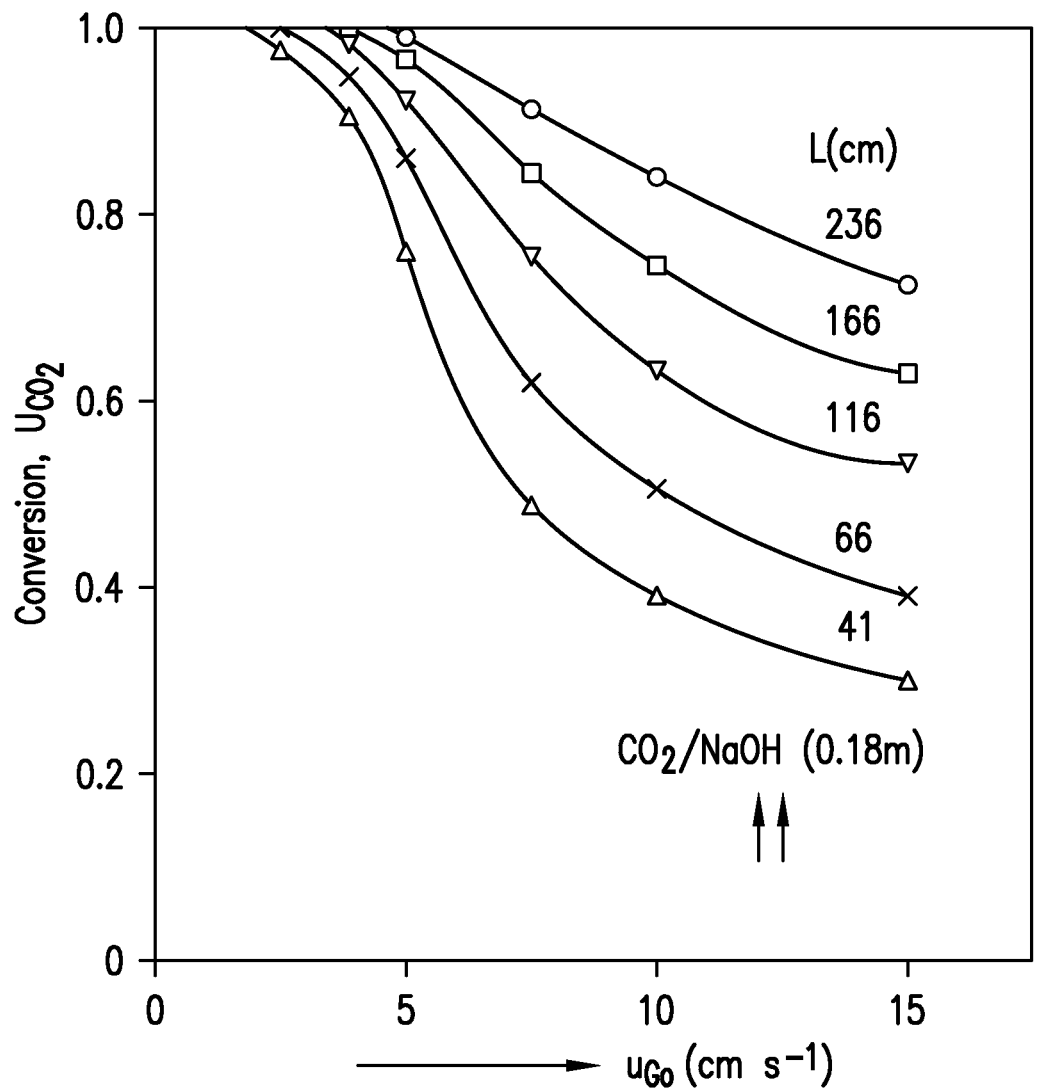
FIG. 8 is a chart showing percent $CO_2$ absorption in a bubble-column vs. fluid depth vs. gas interfacial velocity at low interfacial velocities.

A bubble-column reactor was designed as bound by the above conditions. Sixty-percent incoming $CO_2$ in a flue-gas was to be removed by bubbling through a solution of concentrated sodium hydroxide. The reaction is mass-transfer limited. The objective of the example was to calculate the reactor size (height and diameter) necessary to remove 99.9% of the carbon dioxide. P=2 atm, T=298K. Using the graphical data available in FIG. 8, this example describes the design of both a tall reactor (2.36 m) and a short reactor (0.41 m). FIG. 8 is a chart showing percent $CO_2$ absorption of $CO_2$ in a bubble-column vs. fluid depth vs. gas interfacial velocity at low interfacial velocities (Schumpe et al., 1979).

2.36 m Height Column Solution

The conversion approaches 100% at a superficial velocity (Ug0) of approximately 0.04 m/s. This velocity is in the bubbly-flow range (in water-like solutions this is approximately 0.05 m/s). Knowing the volumetric gas flow requirement (Vg0), the diameter of the column was calculated:

$$Ac=Vg0/Ug0=0.05/0.04=1.25 m2$$

$$Dc=2\sqrt{Ac/\pi}=2\sqrt{1.25/\pi}=1.26 m$$

Therefore, a conversion of 99% of the incoming 60% $CO_2$ requires a column of 2.36 m height, 1.25 $m^2$ area, having a diameter of 1.26 m, and a total volume of 2.95 $m^3$.

0.41 m Height Column Solution

Conversion in a 0.41 m tall column requires a superficial gas velocity of about 0.02 m/s. Similar to above:

$$Ac = Vg0/Ug0 = 0.05/0.02 = 2.50 \text{ m}2$$

$$Dc = 2\sqrt{Ac/\pi} = 2\sqrt{2.5/\pi} = 1.78 \text{ m}$$

Therefore, a conversion of 99% of the incoming 60% $CO_2$ requires a column of 0.41 m height, 2.50 m$^2$ area, having a diameter of 1.78 m, and a total volume of 1.03 m$^3$.

In summary, it is demonstrated through this example that shorter columns are more efficient on a per-volume basis in stripping carbon dioxide from a flue gas; for this example, by a factor of 3. Therefore, for preferred embodiments of the present invention, the design targets short stages and/or multiple-stage reactors composed of short stages.

Example 2

$CO_2$/NaOH Bubble-Column Design by Mass-Transfer Coefficient Solution

The objective of this example was to determine the mass-transfer coefficient, kla (moles/sec/volume), from theoretical build-up. It was determined from this example that this correlative method can potentially lead to inconclusive results; i.e., this example highlights the difficulty in predicting actual results from theory due to the indeterminacy of measuring some of the critical parameters. Therefore, only experimental scaling can conclusively determine the result of a large decarbonation unit.

The following equations for gas-hold-up ($\epsilon g$) and mole-transfer (kLa) are from correlations from Akita and Yoshida (1973), and are valid for carbon dioxide and water systems at relatively large column heights and diameters (i.e., >0.1 m):

$$\text{Gas-Hold-Up } \frac{\epsilon g}{(1-\epsilon g)4} = $$
$$C*[g*Dc2*\rho L/\sigma]1/8*[g*Dc2/vl2]1/12*[\mu g/\sqrt{g}*Dc]$$

and
Mass-Transfer Coefficient $$kLa(1/\text{sec}) = [Cco2*Dco2-h20/Dc2]*[vL/Dco2-h20]$$
$$0.2*[g*Dc2*\rho L/\sigma]0.62*[g*Dc3/vl2]*\epsilon 11$$

Where
$\epsilon g$ = gas hold-up factor
Cco2 = concentration of $CO_2$ in flue-gas
Dc = diameter of column
vL = 0.0001 m2/sec
$\sigma$ = 1 cP = 0.1 Pa*sec
$\rho$L998 kg/m3
and since Dco2–h20P=1.661 m2*Pa/sec,
therefore, Dco2–HO=1.661/5.067*10(5)=3.278*10(–6)m2/sec The driving force is the difference between the equilibrium concentration of carbon dioxide (Cco2*) and the actual liquid phase concentration of carbon dioxide (Cco2), which this example assumes is zero; i.e., the sodium hydroxide present instantaneously neutralizes the aqueous carbon dioxide "acid." The rate of mole transfer per reactor volume can therefore be written as:

$$Nco2 = kLa*[Cco2*-Cco2] = kLa(Cco2*)$$

Rate of Mole Transfer Needed to Remove 99.99% of the carbon dioxide in the flue-gas. $CO_2$ is assumed to be an ideal gas under the conditions of the column.

Cubic volume/sec:

$$Vg0 = 0.05 \text{ m3/sec} \therefore Vco2 = 0.6*Vg0 = 0.03 \text{ m3/s}$$

Mole/Sec:

$$Vco2*P/RT = [0.03M3/\text{sec}*5 \text{ Atm}]/[0.082 \text{ m3 atm/kmolK}*298]*1000 \text{ gmmole/1 kmole} = 6.14 \text{ mole/sec}$$

$$Nco2(\text{mole/sec}) = 0.999(\text{moleCO2removed/molesCO2in})*6.14 \text{ mole/sec} = 6.13 \text{ mole/sec}$$

Other Fluid Properties Necessary for Model Correlation

Setting the initial superficial velocity at the bubbly flow limit (Vg0=0.05 m/s), the area and diameter of the column was calculated:

$$Ac = Vg0/Ug0 = 0.05/0.05 = 1.0 \text{ m}2$$

$$Dc = 2\sqrt{Ac/\pi} = 2\sqrt{1.0/\pi} = 1.13 \text{ m}$$

For the gas-phase hold-up reactions this example sets C=0.2 and assumes that the superficial velocity (Ug) is the average of the entering and exiting velocities; Ug=0.035 m/s=average (0.05 m/s, 0.02 m/s), and using an equation solver, it was found that $\epsilon g$=0.055.

Next, the mole transfer rate constant was solved for:

$$kLa(1/\text{sec}) = \frac{0.6*3.278*10-6 \text{ m2/sec}}{[0.6 \text{ m}]2} * \frac{0.0001 \text{ m2/sec}}{3.278 \times 106 \text{ m2/sec}} * \left[\frac{9.8 \text{ m/s }2*(0.6 \text{ m})2*998 \text{ kg/m }3}{0.0696 \text{ kg/sec }2}\right] * \left[\frac{(9.8 \text{ m/sec }2)*(0.6 \text{ m})3}{[0.0001 \text{ m2/sec}]2}\right]*(0.055)1.1 = 0.386/\text{sec}$$

kLa=0.386/sec

Going back to the driving force equation, the reactor volume (V) was solved for:

$$V = Nco2/[(kLa)(Cco2*)] = 6.13 \text{ mole/sec}/(0.386/\text{sec}*(103.6 \text{ mole/m3})) = 0.15 \text{ m3}$$

and $$Hc = 0.15 \text{ m3/1 m2} = 0.15M$$

Therefore, the dimensions of a bubble column are Dc=1.13 m and Hc=0.15 m, resulting in a significant difference from actual results in real bubble columns.

Several assumptions can explain the difference in the correlative models (that are considered the best models of this behavior) and the actual results:

(1) The sodium hydroxide was assumed to have the properties of water (density, surface tension, etc.); and
(2) The concentration of $CO_2$ in the solution might not be well characterized as zero; this is the more likely operand; e.g., if the $CO_2$ effective concentration is not zero, then the driving force is less, and a taller column is needed.

It should also be noted that this theoretical correlation suffers under a condition that is also its strength: because terms such as (vL=0.0001 m2/sec) are often squared in the denominator, small variations in these numbers produce gigantic effects. This type of theoretical build-up is good for curve-fitting ex-post-facto, but is not a good predictor of mass-transfer for design purposes. Further, there are striking fluid-flow effects on the absorption/conversion rate of $CO_2$, such that designs at-differing-and-progressive scales are indicated.

Example 3

$CO_2$/NaOH Bubble-Column Design (Depth) from Experimental Data

Note that the reliance of certain embodiments of the present invention upon the "short stage efficiency theory" described herein (3 m or less gas-liquid contact distance, or fluid stage height, to achieve >90% absorption) is confirmed by two different calculation techniques that are consistent with practiced chemical engineering design. However, in certain cases (as noted above) certain simplifying assumptions have been made in these design calculations, so experimental verification was indicated and performed with the Results displayed in FIGS. 2B and 2C (explained in further detail below).

Each of these processing runs obtained a certain $CO_2$ absorption over a certain gas-liquid contact distance (namely the height of the fluid in unpacked, open bubble-column cases); e.g., 20% absorption through 30 cm of fluid.

If the gas were then passed through a second column of the same design and state-of-conditions, the same absorption would occur again; i.e., 20% of the remaining 80% of initial $CO_2$ would again be absorbed. This relationship eventually attenuates; however, given the highly absorptive characteristics of the absorbent fluid, and the tendency of the chemisorption to persist with robust absorption even of dilute $CO_2$ in the flue-gas, this effect is ignored for this example and a design of 90% removal is effected.

One can see that further passes of the fluid through the absorption fluid would again reduce remaining $CO_2$ by 20%, etc. until sufficient passes have been accomplished to attain the desired absorption level (in this case 90%).

This results in a "number of base stages" design that determines the depth of fluid (in multiple depths of stages of 30 cm height) that is required to attain 90%. Assuming each stage absorbs the same % $CO_2$/distance as the former, the results in FIGS. 2B and 2C were obtained and are graphically represented in FIGS. 2D and 2E.

FIG. 2A shows an apparatus for observing the primary features of one embodiment of the decarbonation portion of the present invention. The apparatus in FIG. 2A (or one with similar effect) can be operated according to the procedure listed below:

(1) Carbonation Unit 801 is charged with NaOH with a test load (for example, 1M NaOH in 25° C. water) to a depth of 30 cm, packed or unpacked.

(2) Flue-gas, simulated or actual, in this case, for a typical coal-fired flue-gas exhaust (16% $CO_2$, 84% $N_7$, $SO_X$/$NO_X$<1% or in natural ppm rates) is introduced to Carbonation Unit 801, effectively sparged in an unpacked column, effectively sparged or distributed in packed columns, travels through the fluid and, is vented. Gas is at 25° C., CO, is 2 L/min with other gases mixed proportionally, flowing upwards through a circular 4" diameter column; system pressures can be 1 atm psig or less.

(3) It can be noted by means of measuring incoming $CO_2$ concentration (by gas chromatograph sampling, for instance, or with in-line measurement of $CO_2$ concentration) that $CO_2$ is being absorbed by the fluid, that temperatures are rising (exothermic reaction), and liquid assay sampling will show the presence of a carbonate/bicarbonate/hydroxide equilibria, indicating that not only absorption of $CO_2$ is occurring, but its conversion into carbonate or bicarbonate form is proceeding. Practical operating experience indicates that these key "transition points" exist in the pH equilibria:

a. At pH<=8.3, the formation of bicarbonate is favored.

b. At pH>=10, the formation of carbonate is favored.

(4) The absorption/conversion to carbonate reaction proceeds strongly and exothermically until, given the flow dynamics of the gas, at whatever rate the $CO_2$ was being absorbed/converted, the exothermic phase of the reaction ends, temperature plateaus first and then falls, and the absorption capability of the fluid, that falls as the OH ion concentration decreases, effectively zeroes at this point. pH generally closely approximates 8.3 or in its near-neighborhood when absorption levels begin to fall; at pH>8.3, absorption is relatively robust.

(5) The fluid is transferred to Bicarbonation Column 803, and flue-gas is again introduced to the fluid. Absorption of $CO_2$ has ceased and in some cases, will be shown to be negative (the fluid gives up some $CO_2$ to the gas flow traveling through it). The temperature of the fluid continues to fall, partially due to some incidental evaporation to the migrating gas stream, but also due to the reaction of bicarbonation that is taking place between the previously created sodium carbonate and the remaining "orphan" $CO_2$ that is dissolved in the fluid.

(6) The equilibrium continues to be shifted toward bicarbonate, and optimizations of starting hydroxide concentration, fluid and gas temperatures, pressures, flow-rates and velocities, tortuosities, etc. can be accomplished, even up to the point of producing pure bicarbonate (99%+).

FIGS. 2B and 2C depict the results of several test-series conducted with a charged-load (a specific concentration of NaOH was placed in a decarbonation system as shown in FIG. 2A). Several key points are demonstrated by the data in FIGS. 2B and 2C:

(1) Conditions can be modified sufficient to reproducibly create either pure carbonate (runs 4 and 14), or pure bicarbonate (runs 28 and 32), and may be modulated to achieve various results (or "ion ratios" between the extremes of 1.0-2.0).

(2) The reactor dimensions that result from this study are, for all cases with significant absorption, found to be that gas-liquid contact distances generally less than 3 m are sufficient to achieve 90% absorption of incoming gases. Hence, short, low-resistance stages are shown to be designable so as to achieve high rates of absorption consistent with the thermodynamic efficiency limits. In other words, the physical process of removing the $CO_2$ operates at absorption levels that may apparently meet or exceed the thermodynamic efficiency of the system. Such high absorption rates (gas in, gas out) do not account for the energy and, therefore, $CO_2$-production. Therefore, keeping $CO_2$ absorption rates (from the fluid) and thermodynamic efficiency of the plant as two clearly different measures is important to avoid confusion.

Figure 2D:
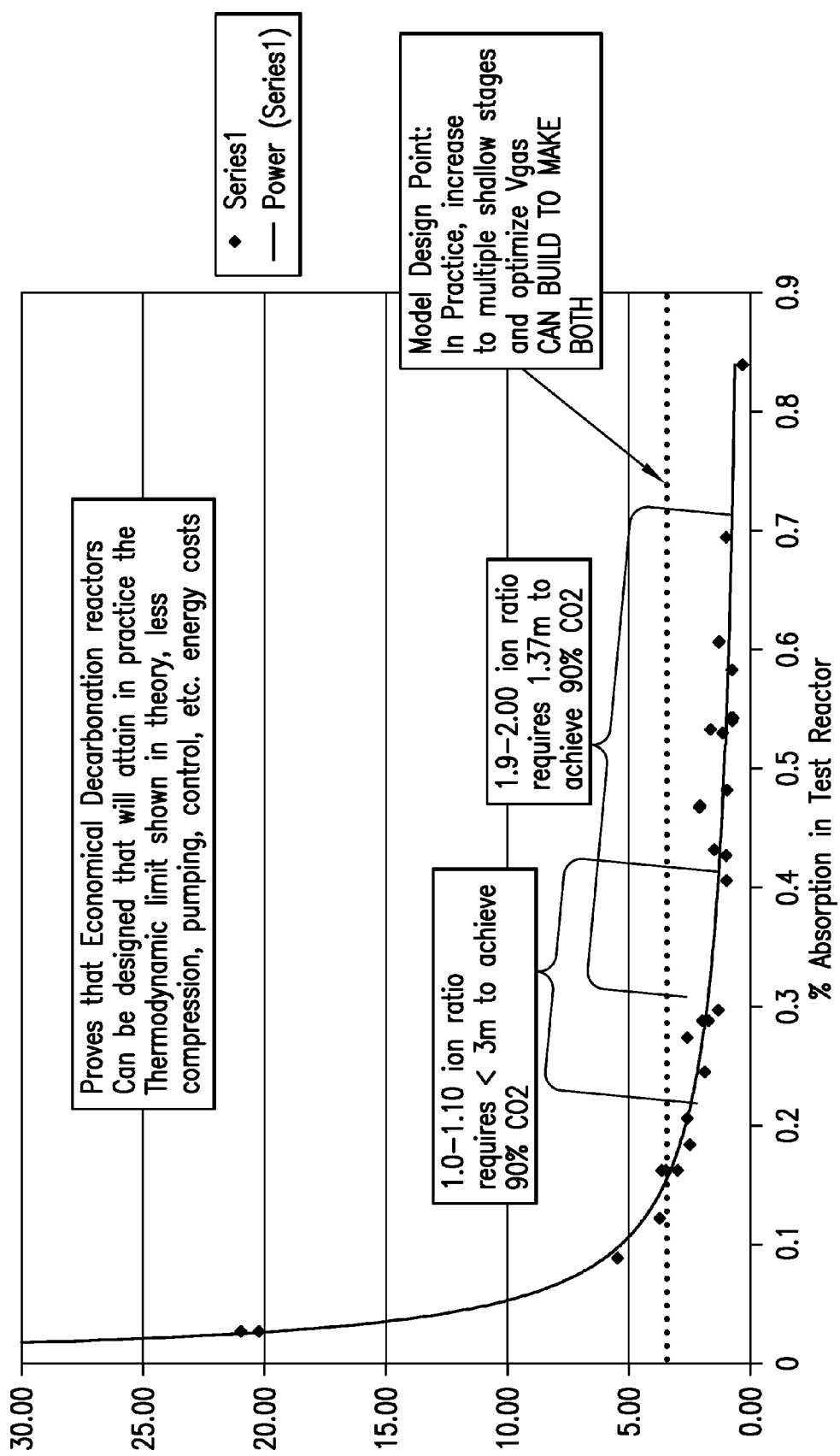
FIG. 2D is a chart showing gas/liquid contact distance (m, depth of fluid) necessary to remove 90% $CO_2$.
Figure 2E:
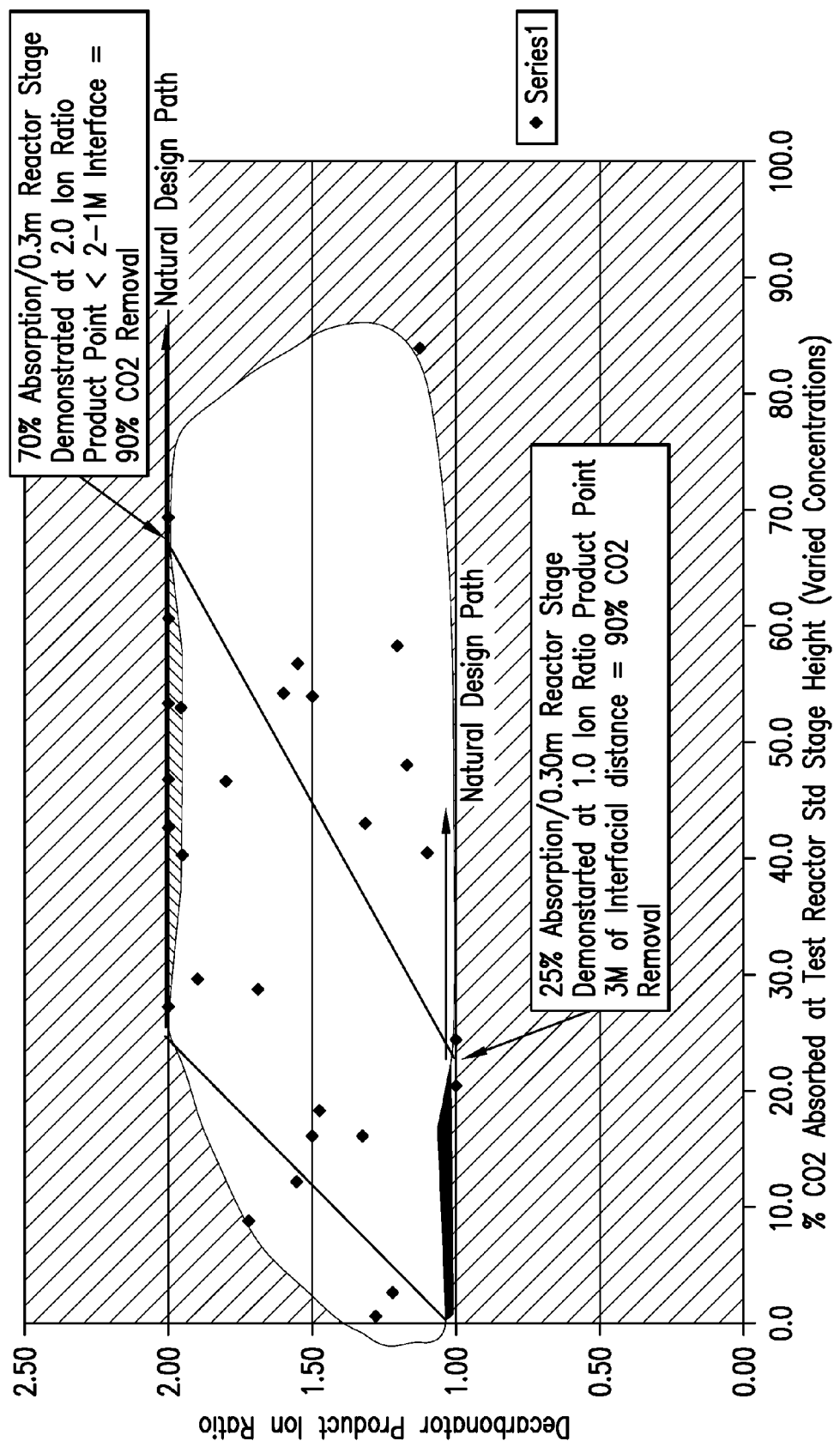
FIG. 2E is a chart showing product ion ratio vs. percent $CO_2$ absorbed in a test reactor.

The results from FIGS. 2B and 2C (absorption of $CO_2$ by the fluid) and the product ion ratio (1.0=bicarbonate, 2.0=carbonate) are depicted in FIGS. 2D and 2E. Several important conclusions can be derived from FIGS. 2B and 2C:

(1) Instantaneous absorption-rates as high as 98% in a single absorption-stage of incoming $CO_2$ are noted.

a. Pure bicarbonate ($NaHCO_3$) was produced in solution at conditions that absorbed 25% of incoming $CO_2$ in a single-stage bubble-column gas-liquid contactor with a depth of 0.30 m fluid depth/gas-liquid contact distance. Extrapolating to a 90% absorption, 3 meters of contact distance is sufficient to absorb 90% of incoming $CO_2$.

b. Pure carbonate ($Na_7CO_3$) was produced in solution at conditions that absorbed 70% of incoming $CO_2$ in a single-stage bubble-column gas-liquid contactor with a depth of 0.30 m fluid depth/gas-liquid contact distance. Extrapolating to a 90% absorption, <2 meters of contact distance is sufficient to absorb 90% of incoming c. Various absorption vs. carbonate ion ratios in products indicate that a continuum of solutions exist between these extremes.

(2) The absorbent fluid retains its absorption characteristics for industrially-worthy lengths of time (e.g., 15-240 minutes in these examples).

(3) The reactor input variables (concentration, temperature, pressure, gas flow-rate, contact time, etc.) can be modulated to produce pure bicarbonate, pure carbonate, or any mixture in-between.

(4) Using these laboratory results to design a 90% $CO_2$ reactor results in solutions under 3 m of gas-liquid contact distance (e.g., approximately fluid depth, column height), and 1 m in many industrial-worthy process corners.

Example 4

Analysis of LVE for Various Chemical Conditions

Figure 5:
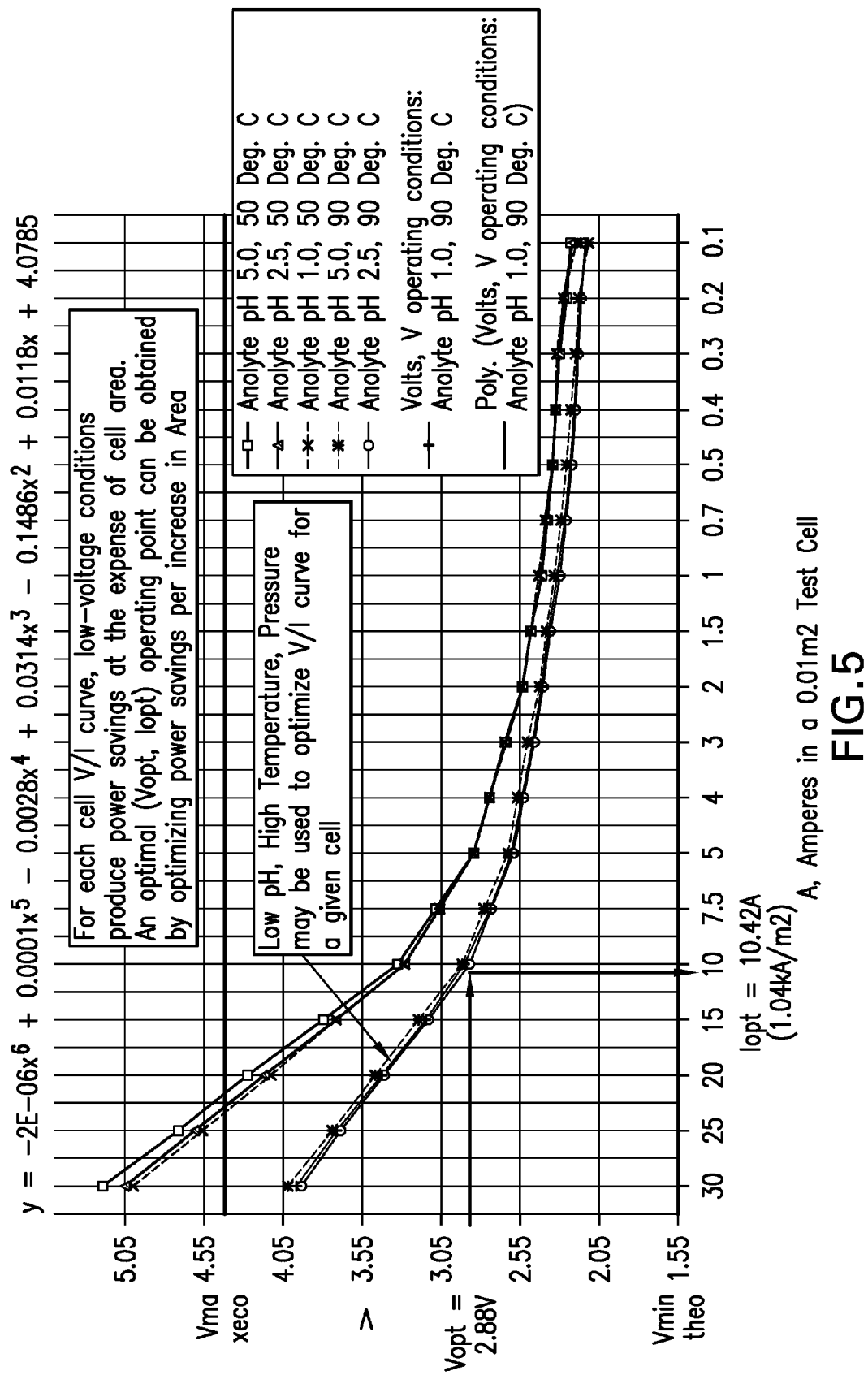
FIG. 5 is a chart showing typical voltage/current characteristic operating lines for various anolyte pH and temperature conditions.

FIG. 5 is a chart showing low-voltage brine electrolysis operating lines for various chemical conditions. It depicts some typical experimental results, in which a membrane chlor-alkali cell is operated under non-standard conditions, namely:

(1) pH of the anolyte fluid (protonated brine) is adjusted by closed-loop pH controlled addition of HCl (hydrochloric acid in water) at pH of 1.0, 2.5, and 5.0;

(2) temperature of the anolyte fluid is held at setpoint, by closed-loop fluid circuits heated by electric heaters; and (3) voltage is modulated for each fluid/protonation/temperature condition, with the current attained by the 0.01 $m^2$ chlor-alkali cell recorded.

In FIG. 5, note the set of example experimental data, which plots actual experimental voltage vs. current (translatable into current densities, $kA/m^2$, as indicated on the chart) for a 0.01 $m^2$ electrolysis cell, 13 mm gap, operating at various combinations of temperature and degree of protonation of the anolyte brine fluid (controlled in this experimental series by closed loop ph-control of HCl(l) addition to the brine loop).

Note the following concerning these typical results in FIG. 5:

(1) At high-voltages (5V) such as are normally used in the chlor-alkali use of such cells, the maximum current (and for a given cell, therefore the maximum current density) is attained.

(2) Higher temperature brine at the same pH has a superior current density at a given voltage.

(3) Lower pH brine has a superior current density at a given voltage compared to higher pH brine.

(4) These general tendencies (higher temperature, higher acid concentration) can be optimized by standard design-of-experiments techniques for each individual electrochemical cell geometric/component design to produce the optimum ($kA/m^2V$) for that cell. Similar experimentation on any chlor-alkali cell with increased operating pressure will result in concluding that increased operating pressure also enhances ($kA/m^2V$).

(5) The slope of the lines ($\Delta V/\Delta A$) is initially large, with relatively large drops of voltage occurring with relatively low drops in current/current-density; however, after an inflection point is reached (at approximately (2.5V, 10 A/0.01 $m^2$)), further reductions in voltage result in more extreme reductions in current and therefore in current density.

(6) This inflection-point and its near-neighborhood of operating conditions represent the optimum voltage-vs-current-density trade-off in an economic sense of efficiency. Standard design-of-experiments optimization can achieve the optimum low-voltage condition for any physical cell embodiment of the invention.

(7) In the context of this example alone, that the 1.0 pH, 90° C. anolyte condition has a superior current/voltage characteristic and is therefore the optimum operating line represented among these various demonstrated operating lines.

(8) The primary drawback of low-voltage electrolysis is the accompanying decrease in current-density; $kA/m^2$ declines with declining voltage. Since the system must produce the same number of Na+ ions to absorb the same amount of carbon dioxide, the $m^2$ area of the membrane surfaces must proportionally increase; e.g., if current density drops by 50%, then twice as much membrane area will be required to produce sufficient absorbent fluid. This has a serious effect on plant cost, as a chlor-alkali plant has costs that are nearly proportional to membrane area. Low-voltage electrolysis offers several advantages that may, in certain embodiments of the invention, allow optimization along low-voltage lines that redress significantly or wholly for this large-area requirement drawback. Namely, lifetimes of membranes and electrolytic cell components that are operated in more benign/less energetic operating conditions that can extend cell and/or membrane life may be experienced. Designing specifically for lower-voltage conditions may attend some ability to relax certain materials and performance criteria that are not as essential in embodiments that employ low-voltage. Certain of these degrees-of-design freedom may result in low-cost cells that partially or wholly absorb the incremental cell membrane cost originally incurred due to low-voltage/low-current-density operation. In these and many other ways, LVE systems, while requiring larger membrane areas than standard chlor-alkali cells for the production of the same amount of NaOH, may wholly or partially assuage some of that additional cost and operational expense.

(9) The trade-off between the benefit (lower voltage and hence lower power) and the detriment (higher area and degrading current density) may be optimized by the technique described in Example 7. For the 1.0/90° C. operating line depicted in FIG. 5 (which for this small example set is the superior V/I characteristic for LVE operation), there can be calculated a Voptive, and from the above relationship, the Ioptive can be obtained. Hence, for a given electrolysis cell geometric design, conditions of temperature, pressure, brine concentration, degree of protonation, membrane choice, etc. may all be done to produce a superior V/I curve or operating line, and then the optimum point on that curve can be calculated by the method of Example 7. In this case, the Voptive is 2.88V and the current density Ioptive is 1.04 $kA/m^2$.

(10) In Example 7, the current at Vopt=2.88V is approximately 5 A in the lightly-protonated and/or low-temperature cases. In just this example, that current (and therefore current density) was more than doubled to 10.4 A.

(11) Additional protonation of the brine, temperature, pressure, concentration, geometric arrangement of the components of the cell, electrical fields, and conditions can be similarly optimized to produce a superior (kA/m$^2$V) metric, but protonation itself increases the amount of stoichiometric hydrogen produced, thereby increasing the energy pay-back of the system. It is important to note that optimizing for the lowest-energy $CO_2$ absorption/conversion can be attained by both optimizing the (kA/m$^2$V) of the system, which lowers the energy required to manufacture the absorbent fluid, but that simultaneously optimizing the hydrogen available for energy-recovery (and then optimizing the efficiency by which that available hydrogen energy is recovered), the entire energy for the process may be optimized to its lowest potential, for a given physical electrochemical cell of specific design.

(12) Given that embodiments of the present invention can effectively absorb $CO_2$ in extremely dilute hydroxides (0.2M and less have been demonstrated) compared to the concentrated hydroxide normally produced in chlor-alkali manufacture (typically 33-35% by weight, then concentrated further by steam-evaporation), the design of chlor-alkali cells for low-concentration operation (as well as low-voltage operation) may provide new degrees of freedom for design optimization at these non-standard conditions.

Embodiments of the present invention are incapable of violating the Second Law of Thermodynamics by making more hydrogen-energy than the energy consumed in making that hydrogen. This places a limit on the minimum voltage that can be applied to the electrochemical cell. Presuming 100% efficiency on the hydrogen return, and using 39000 kw-hr/ton $H_2$ energy content (EIA reference value), would result in a minimum voltage of 1.55V for brine electrolysis. A person of skill in the art can, for any system with a given hydrogen/electric return efficiency and a chosen value for the energy content of the system, compute a minimum achievable voltage for that system.

In practice, thermodynamic inefficiencies (including but not limited to, $I^2R$ losses, current inefficiency in the cell, waste-heat losses, etc.), and the requirement of slight over-voltage to operate, raise the minimum voltage attainable for a given cell. The above figures vary slightly depending upon the value of "a," the protonation ratio, as it varies the amount of hydrogen available for energy-recovery.

That said, current-density at low-voltage determines the amount of electrolysis area (a good scalar for capital expense) required to produce an amount of caustic, and at minimum voltage, the area required is extremely large. Hence, some voltage above minimum voltage is required for operation, the amount depending upon the capital-expense/ecological-efficiency trade-off chosen in the design. Current efficiency (the percent of current spent in manufacturing product) declines at low voltage, so optimizing low-voltage brine electrolysis operation is not the same as attaining a single low-voltage operating condition. Current processes are designed to operate in the LVE regime (below 5V), and at these voltages below 5V power consumption over traditional techniques is significantly enhanced.

Example 5

Thermodynamics of a Large-Scale Plant Design

For this example, a model plant (incorporating certain embodiments of the present invention) exhibiting full-scale operating plant behavior is explained and the energy required to extract a given amount of $CO_2$ quantified and bounded within statistical limits by various means and methods, including the following:

(1) Thermodynamic efficiency ($\partial CO_2/\partial E$) can be approximated as $\Delta CO_2/\Delta E$ over sufficiently short range intervals of E (energy).

Figure 9A:
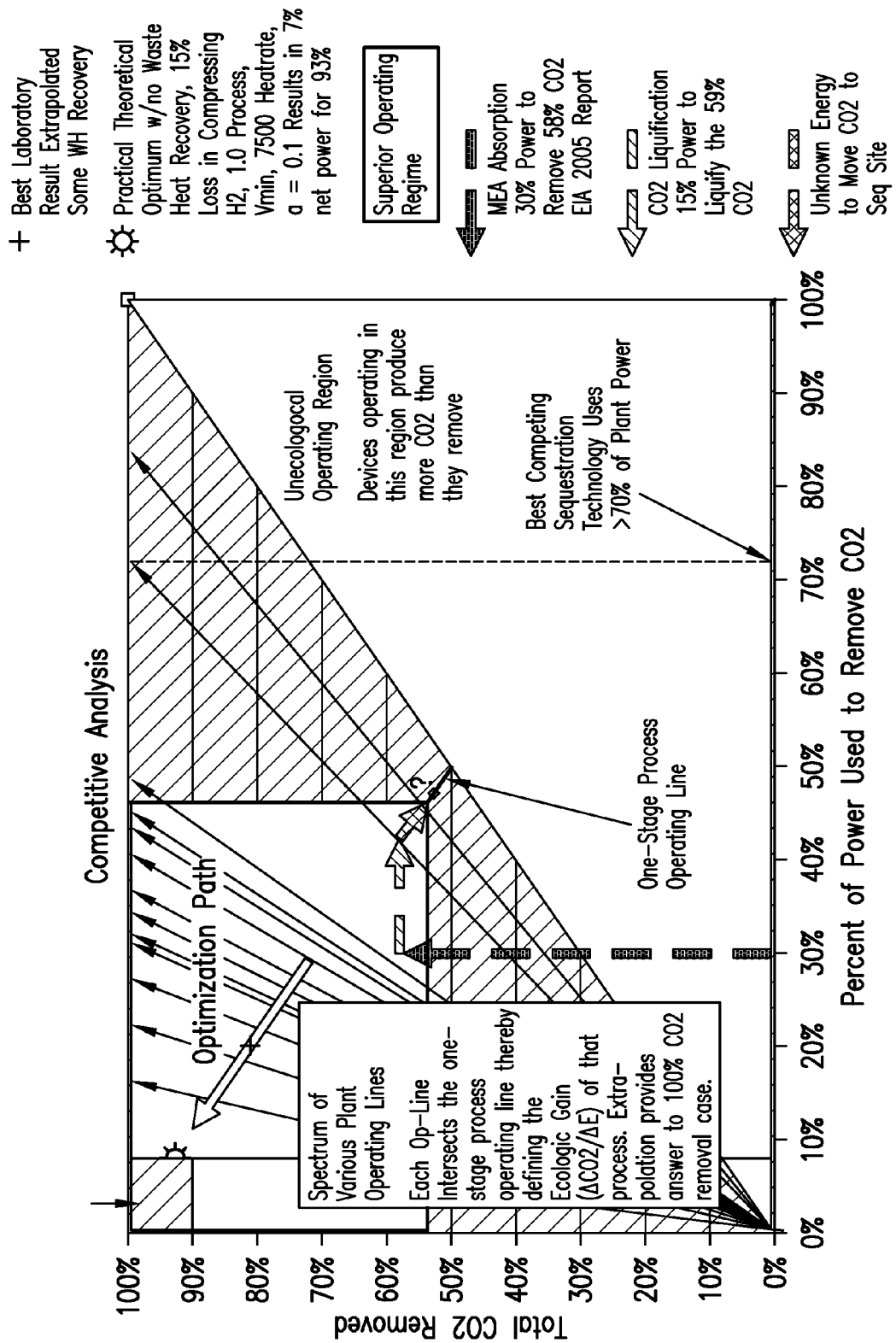
FIG. 9A is a chart showing the theoretical max $CO_2$ absorption and experimental results, according to embodiments of the present invention.

(2) Certain simplifying assumptions can be made regarding a plant design such as is represented in FIG. 9A, among them:

a. The primary energy spent is in the electrolysis process; pumping, compression, controls, etc. are considered de minimis relative to the energies spent making reactants (electrolysis) and in hydrogen energy-recovery. These values assumed zero or <0.1% of power consumed in electrolysis operations.

b. Electrolysis energies spent can be represented approximately by the following equation:

$$E_{out} = V \cdot I \cdot EFF_{current}$$

Where:
V=voltage of operating electrolysis cell
I=current required to produce the chemicals by electrochemical half-reaction, including the greater-than-1:1 stoichiometry caused by the protonation of the brine. 0.05 HCl/NaCl ratio of protonating ions consumed in electrolysis is used in the example.
EFFcurrent=the current efficiency, defining the amount of current used in the actual production of chemical species, with the remainder being lost in I2R losses, etc. 97% is the value used in the example; each electrolysis cell will have its own unique current efficiency, which degrades and varies over the life of the cell.

c. Energy recovered from hydrogen-combustion (by whatever means, combustion as a boiler gas, combustion in a fuel-cell, etc.) as:

$$E_{in} = 39000 \text{kw-hr/toncompressed } H_2 \cdot \text{Ton } H_2 \cdot EFF_{dc}$$

Where:
Ton $H_2$=tons of hydrogen produced by the process including the hydrogen produced by the greater-than-1:1 stoichiometry, caused by the protonation of the brine.
EFFdc=the efficiency of the hydrogen-recovery process in converting the incipient energy of the hydrogen gas into DC energy. 60% of the hydrogen-energy produced is recovered into DC energy and used to power much of the electrolysis process. There are several means by which this kind of efficiency can be achieved, including but not limited to: fuel cell, hydrogen burning turbine, mixing hydrogen with alternate fuel, such as natural gas, and burning in a mechanism optimized for that fuel source. Thermal efficiencies of (power plant scale) hydrogen turbines up to 70% may be found in current literature.

d. Energy returned from waste-heat recovery salvaged from the heat of the incoming flue-gas stream. Incoming heated gases are cooled once entering the process.

In some embodiments of the invention, this cooling can be accomplished by absorption of the waste-heat and the conversion of that heat into electrical DC energy, which can be used to supplement/fully-power/over-power the process that composes the invention. In this example, the supplemental waste-heat recovery is not included.

The plant composition for this example includes a modeling of the flue-gas exiting the power-plant under normal operating conditions, as shown in FIG. 9B. This involves significant assumptions regarding the composition of the fuels, the efficiency of the combustion processes themselves, the relative proportion of elements in the combustion processes, etc. The assumptions for this example are depicted in FIG. 9B and are consistent with the flue-gas output of a typical sub-bituminous coal-fed power-plant with a 10,000 BTU/kw-hr heat-rate.

For a given flue-gas output, there is a hydroxide requirement that can be calculated. Several calculations are required here. The ratio of ions ("ion ratio" is the ratio Na/C in the absorption/conversion reaction) is the same as the ratio of those elements in the product solids formed. In the case of pure bicarbonate, the number would be 1.0, in the case of pure carbonate, the number would be 2.0, and for mixtures of bicarbonate and carbonate, the number would lie between 1.0 and 2.0. The calculation for the caustic requirement for this example is depicted in FIG. 9C. For the example depicted in FIG. 9C, the ion ratio is 1.0.

For a given hydroxide requirement, there is a corresponding electrolysis current requirement, based upon the amount of water, salt, square meters of membrane surface (the scalar for electrochemical cells of this kind), and current density (itself a function of the cell design, chemistry, and operating conditions; here the figure of 3 kA/m$^2$ is used). These calculation of the electrolysis requirement for this example is depicted in FIG. 9D.

For a given amount of electrolysis under protonated conditions, there is a given amount of hydrogen gas produced, which itself represents a certain amount of energy available for recovery, or the hydrogen is used chemically in further processing.

For a given amount of flue-gas processed, there is a certain waste-heat energy content that can be extracted from it at a certain efficiency of conversion into DC energy, and that recovered electricity may be used to offset the DC energy consumed by the process in electrolysis. The waste-heat for this example is depicted in FIG. 9E, with an efficiency chosen, in this case, of 25%, a figure that is exceeded by various waste-heat/DC generation techniques extant in the field.

Given these individual components of energy inputs and outputs, the net effect of these energy transfers may be summed, as in FIG. 9F. Here, energies are presented in kw-hrs and as percentages of the basis-plant power, and a calculation of ecological efficiency for this example is shown.

In some embodiments of the present invention, an additional $H_2/Cl_2$ fuel cell may be employed to combust hydrogen and chlorine gases for the purpose of recycling HCl used for protonation of the brine. In particular, the amount of "super-stoichiometric" HCl can be recycled, and in theory, eliminate the need for stock chemical HCl to be added to the system. In actual practice, a certain amount of make-up HCl must be periodically added to the system. The combustion of $H_2$ in $Cl_2$ releases more energy than does the $H_2/O_2$ combustion. However, the effect of the presence of the additional protons in the electrolysis is to dramatically catalyze the production of NaOH at low voltages and high (kA/m$^2$V) at those low voltages. Hence, for any given apparatus, an optimization can be carried out to recycle a given amount of $H_2/Cl_2$ into HCl and to protonate the incoming brine with that amount of HCl. At some optimum value (usually found between a=0.05 and a=1.0M, or near pH=1 at 90° C.), hydrogen/chlorine fuel cell losses (which outweigh the slight gain over oxygen oxidation presented by the chlorine) and hydroxide energy benefits (better kA/m$^2$V) will be simultaneously optimum for the entire system. It should be noted that in this example, only $H_2/O_2$ combustion is calculated; the $H_2/Cl_2$ combustion has a slight thermodynamic gain from the extra strength of the chlorine oxidation, but the countering effect of thermal inefficiency makes for a slightly negative, but considered de minimis, effect.

A. Calculation of Ecological Efficiency

Calculation of ecological efficiency ($\partial CO_2/\partial E$) and $\Delta CO_2/\Delta E$ for this example was accomplished as follows:

(1) It was presumed that there were three plants:
  a. The basis power plant (exemplified in the flue-gas model in FIG. 9B)
  b. The $CO_2$ Absorption/Conversion plant (which requires supplementary power to process the flue-gas from the basis power plant and returns a portion of that power from hydrogen combustion or the calculated power inherent in hydrogen, if hydrogen is the end-product and is not combusted).
  c. A third, supplemental power-plant that provides the power required by the $CO_2$ Absorption/Conversion plant. In this example, the characteristics of this power plant were assumed to be identical to the basis plant.

(2) The following aspects relating to the $CO_2$ and energy spent in processing 100% of the basis plant were then calculated:
  a. $CO_2$ from the basis plant (flue-gas model)
  b. Energy produced by the basis plant
  c. Net energy required by the $CO_2$ absorption/conversion process
  d. Net energy required by the supplemental power plant is assumed identical to the Net energy required by the $CO_2$ absorption/conversion process.
  e. $CO_2$ produced by the supplemental plant is assumed to be proportional to the energy produced by the supplemental plant, and with the same $\Delta CO_2/\Delta E$ of the basis plant.

(3) The following results for the above calculations were obtained:
  a. Basis Plant—a 10,000 heat-rate plant producing 1 Gw continuously for a 1-year basis produces 8.76 Bkw-hrs each year and produces a basis of 7,446,068 tons of $CO_2$ per year, averaging 1176 kw-hr/ton $CO_2$.
  b. $CO_2$ Absorption/Conversion Plant—for this example calculation (a=0.10, 2.1V operation, pure bicarbonate produced, 15% of hydrogen energy consumed in compression, pumping/compression costs and waste-heat recovery benefits excluded), 3.648 BKw-hr are required to absorb/convert 100% of the basis plant.
  c. Supplemental Power Plant—the plant in this example produces the power required by the $CO_2$ Absorption/Conversion Plant, 3.648 Bkw-hr, and itself produces (by the 1176 Kw-hr/ton $CO_2$ figure from above) a total of 3,101,209 tons of $CO_2$ that is presumed to be emitted to the atmosphere.
  d. Total power generated is therefore 12.48 Gw-hrs. Total delivered power is therefore 8.76 Gw-hrs. Total $CO_2$ generated is therefore 10.55 Mtons. Total $CO_2$ emitted is therefore 3.101 Mtons. 29.1% of total power is consumed in the $CO_2$ absorption/conversion process. 71.9% of total $CO_2$ is consumed.

Several key points are illustrated by the above calculations:
(1) Arithmetically, it is demonstrated that the following formulae apply:

% power consumed=1−% $CO_2$ consumed

% CO2consumed=1−% power consumed

This forms a line, called the One Unit Operating line, shown in FIG. 9A.

(2) For this example, the $(\partial CO_2/\partial E)$ and $\Delta CO_2/\Delta E$ are algebraically identical, namely:

$\Delta CO_2/\Delta E=(\partial CO_2/\partial E)=0.291/0.719=0.41$

Further extrapolated cases can be further modeled, in which cases, the $CO_2$ emitted by the Supplemental Power Plant is itself treated by another $CO_2$ absorption/conversion process unit #2 of correspondingly smaller capacity, and that absorption/conversion unit #2 is correspondingly powered by a Supplemental Power Plant #2, etc., which results in results like those in Table 2 for the first five series of iterations.

TABLE 2

| Power Plant | Produces $CO_2$ (Mton) | Produces Power (kw-hr) | Amount Absorbed | Inc Power Required |
|---|---|---|---|---|
| Basis | 7,446,068 | 8,760,000,000 | 7,446,068 | 3,648,448,267 |
| Iteration 2 | | | 3101209 | 1519540497 |
| Iteration 3 | | | 1291621 | 632872705 |
| Iteration 4 | | | 537947 | 263584854 |

| Power Plant | Supplemental $CO_2$ | % tot E | % tot $CO_2$ | Ecological Efficiency $(\partial CO_2/\partial E)$ |
|---|---|---|---|---|
| Basis | 3101209 | 29% | 71% | 2.40 |
| Iteration 2 | 1291621 | 37% | 89% | 2.40 |
| Iteration 3 | 537947 | 40% | 96% | 2.40 |
| Iteration 4 | 224049 | 41% | 98% | 2.40 |

Several points regarding Table 2 are significant to the model:
(1) Note that the efficiency of the process, whether in the basis case, or any of the successive iterated cases, consistently produces the same $(\partial CO_2/\partial E)$ value for the system; this term is considered constant for systems that approximate the constraints of this model and is called, for these purposes, the ecological efficiency of the process.
(2) It is clear that the value $(\partial CO_2/\partial E)$ is constant in all solutions, so a solution can be derived when then number of iterations is presumed infinite; i.e., when the plant is operated so as to consume 100% of the $CO_2$ produced by the plant, by the simple expedient of using the following equation:

$1/(\partial CO_2/\partial E)$=% of plant power required to absorb/capture 100% of produced $CO_2$ In the example case, this calculates as 41.6%.
(3) Alternatively, it is evident that, when the net power spent in absorption/conversion is zero (neglecting waste-heat recovery), for a given process condition, the $CO_2$ absorbed and converted is likewise zero. Hence, all operating lines for plants of this type theoretically intersect at (0% Power, 0% $CO_2$).
(4) Given any two points in a linear system, straight-line solutions for Operating Lines may be constructed that define the operating characteristics of the $CO_2$ Absorption/Conversion process, by the following means:
  a. for each operating condition, a basis-case solution is accomplished, and the resulting point One Unit Case solution (% Power, % $CO_2$) is plotted on a graph of % $CO_2$ (y-axis) vs. % Net Power consumed (x-axis);
  b. for that case, $(\partial CO_2/\partial E)$ is calculated, and the case at y=100% is solved for the x-coordinate; and
  c. all lines are presumed to travel through the origin. In actual systems, there would be some power consumption (controls, environment, etc.) at even zero absorption, so this is an idealized case. In practice, these lines would be slightly curved and not terminate at the origin.
(5) In this way, a family of operating lines for $CO_2$ absorption/conversion processes of this type can be created.
(6) On this same type of plot, competing technologies can also be plotted and compared graphically, e.g.:
  a. A competing MEA (methyl-ethyl-amine) absorption technology consumes 30% of plant power to accomplish an absorption of 58% of $CO_2$ emitted before absorption was introduced.
  b. Further, an estimated 15% of plant power is expended in liquefying this $CO_2$ through extreme pressure and refrigeration cycling (45% power/58% $CO_2$).
  c. This would then demonstrate a $(\partial CO_2/\partial E)$ value of 1.24; however, there is additional unaccounted energy required to transport/inject/maintain the $CO_2$ in a sequestration-site.
  d. Graphically, this competing technology is shown to be less efficient than the example $CO_2$ absorption/conversion plant operating the process which is one embodiment of the invention; i.e., this model shows the competing technology would require 70%+ of the power plant to eliminate 100% of its $CO_2$ production. Note these points regarding the competing technology as graphically represented in FIG. 9A (refer to legend on chart):
    i. According to 2005 EIA estimates, the absorption of $CO_2$ by a MEA technology requires 30% of the plant power to absorb 58% of the flue-gas $CO_2$ produced. (Note position on chart in FIG. 9A (30%, 58%) for absorption-processing alone.)
    ii. By the same estimates, compression/liquification of that $CO_2$ consumes another 15% of the plant power, moving the operating point of such a plant to (45%, 58%).
    iii. There is no firm estimate of the energy required to transport the liquid $CO_2$ by pipeline or other transportation device, nor for that matter the amount of energy necessary to pump or inject that $CO_2$ into a carbon store of various natures, nor the amount of energy that might be required to maintain that $CO_2$ in said stores for perpetuity. However, though those additional energies are not estimable, it seems reasonable to assume they are non-zero. Hence, the ecological efficiency of such a device is logically worse than a (45%/58%) trade-off in power-spent to secure a certain $CO_2$-reduction benefit. Extrapolating this to a 100% remission case, the MEA/liquification/sequestration technique would consume more than 70% of the plant power. It should be noted that typical competing absorption technologies cannot approach 100% absorption; i.e., the figure of 58% $CO_2$ absorption was for a plant that processed 100% of outgoing flue-gas.

B. Calculation of the Limits of Ecological Efficiency [$(\partial CO2/\partial E)max$]

In practice, for a given system that effectively converts all the $NaOH$ produced to $NaHCO_3$ by absorbing $CO_2$, the primary energy component is the kw-hr/moleNaOH. Although the power per mole NaOH is proportional to both voltage and current, the current is fixed by the stoichiometry of the chemistry. Thus, the power expended per mole $CO_2$ is primarily optimized by achieving the lowest voltage condition that efficiently produces hydroxide.

The minimum voltage at which an electrolysis system according to embodiments of the present invention operates (as configured with varying concentrations, geometric dimensions, flow-rates, etc.) can be determined by observing the Current-Density ($kA/m^2$) vs. V characteristics of the system and determining the lowest voltage at which sufficient, non-zero current densities are obtained to make product. Altering the physical dimensions, electrical field generation devices, cell geometries, compositions of materials, and processing conditions to optimize this characteristic metric ($kA^2/m^2V$) is a primary means to optimize these systems, and typical design-of-experiments techniques are useful for optimizing an industrial process for a given physical plant.

Practical limitations aside, there is one fundamental limit that will apply to all systems with a given H/Na ratio (protonation ratio), namely:

(1) No device can operate that produces more energy through hydrogen-energy recovery than is input to the system in electrolysis. Persons familiar with thermodynamic principles will note this would be a "Second Law Violation."

(2) As a result of this fact, a fundamental thermodynamic limit can be bounded, given a choice of H/Na ratio used in the anolyte consumption:
  a. For this example, H/Na was presumed to be 0.10.
  b. The hydrogen energy return efficiency was set at 100%.
  c. The lowest voltage at which operation can occur, in which the net energy consumed by the system is zero ("Vmintheo") (i.e., the point where electrolysis costs equal the assumed 100% hydrogen return efficiency), was calculated.
  d. In this example, that low voltage is 1.5526V. This number is a strong function of the Na/C ratio, the H/C ratio, and the hydrogen-energy return efficiency. In this optimal case, Na/C is 1.0 and H/C is 1.0.
  e. Following this calculation through to its ecological efficiency, the Single Unit solution is approximately 7% power for 93% $CO_2$ absorption/conversion.
  f. Processing at more efficient operating points than this theoretical minimum is possible by:
    i. supplementing the power consumption with waste-heat recovery; and
    ii. powering the absorption/conversion process either partially or wholly with power whose production does not cause $CO_2$ emission (hydroelectric, solar, wind, nuclear, etc.).

Similarly, presuming ideal hydrogen-return efficiency, etc. as above, the maximum voltage at which operation can be "ecological" ("Vmaxeco") (i.e., in which the $CO_2$ absorption/conversion process removes more $CO_2$ than it creates) was calculated:
  a. H/Na, Na/C, and hydrogen return energy efficiency were set at 1.0, 1.0, and 100%, respectively, as above.
  b. The voltage at which the $CO_2$ removal would be 50% was calculated.
  c. In this example, that Vmaxeco is 4.457V. At this voltage and condition, the process operates on the line $\partial CO_2 = \partial E$, the boundary between ecologically beneficial and ecologically harmful operation.

Hence, ecologically-beneficial operation will occur when the electrolysis system is operated between Vmintheo (1.5526V) and Vmaxeco (4.457V). Operation between those two points may be replicated with many typical electrolysis systems. Laboratory results at or below 2.1V may be readily reproduced by manipulation of geometry, concentration, temperature, pressure, flow-rate, etc. of electrochemical cells designed in this fashion.

C. The Effect of Non-Greenhouse-Generating Power on Ecological Efficiency

Where the supplemental power (that which powers the process) is produced by non-greenhouse-gas (GHG) emitting power (e.g., wind-power, hydroelectric, solar, nuclear, etc.), then there are zero supplemental $CO_2$ emissions, and the ecological efficiency of the present invention is vastly improved. For this example, the term 3101209 tons of $CO_2$ in Table 2 is eliminated along with all the subsequent iterations, etc., leaving this simplified result: all $CO_2$ is absorbed/converted (7,446,069 tons), and the total power required is simply the 8,760,000,000 basis plus the 3,648,448,267 kw-hrs required to accomplish the work necessary to absorb/convert that basis amount of $CO_2$, requiring only 29% of total power to secure 100% of the $CO_2$ emissions in the non-GHG-powered process, compared to 41% of total power to secure 100% of the $CO_2$ emissions in the GHG-powered process. This means that embodiments of the present invention provide a significant "leverage" factor when the process is powered by non-GHG emissions. Rather than using non-GHG power to displace GHG-generating power on a 1%:1% basis, if the non-GHG power is instead used to power processes that are some embodiments of the present invention, 1% of non-GHG-generating power then displaces GHG-generation by a multiplied factor, even in excess of the GHG-generating power examples described herein. One can easily envision cases in which, for a given nation, state, or entity, a certain proportion of non-GHG-generating power, when used in this magnified fashion, could more efficiently attain any $CO_2$ reduction goal; i.e., one could use "clean" power in a highly leveraged manner to clean-up the emissions of other "dirty" power."

Given that in some applications, non-GHG-producing power generation is available, sometimes in sporadic forms (e.g., solar, wind-power "farms", etc.), the ability to utilize that power to make large quantities of absorbent during off-peak periods is extremely advantageous.

Example 6

Ecological Efficiency of Various Modeled Power Plants

FIG. 10 shows the ecological efficiency of various modeled power plants incorporating embodiments of the present invention, and it depicts various conditions that are the primary factors in determining the ecological efficiency, ($\partial CO_2/\partial E$).

From these calculations it can be generally concluded that:
(1) Forming sodium carbonate and using standard chlor-alkali conditions, the process would have an ecological efficiency >1, and while such an operation might be economically viable, it produces more $CO_2$ than it absorbs.
(2) Altering the product equilibrium to favor the production of sodium bicarbonate improves the ecological efficiency of the process. In the case of altering conditions so as to produce virtually pure sodium bicarbonate this advantage is fully-optimized.
(3) Adopting low-voltage electrolysis practice firmly moves the process into an operating region characterized by ecological efficiencies lower than 1.0 (i.e., ecologically beneficial $CO_2$ absorption and conversion processes). Optimizing each physical emulation of the electrolysis system for optimum ($kA/m^2V$) and maximum hydrogen energy production leads to further improvement in ecological efficiency.
(4) Coupling the absorption/conversion process of embodiments of the present invention with any number of available or created-for-purpose machines that convert waste-thermal heat to DC electricity, the initial energy investment in DC electrolysis and AC pumping, etc. may be supplemented or wholly supplied from the waste-heat recovery.

It should be noted that supplying the invention with power from non-green-house gas emitting power generators allows the process to directly approach 100% $CO_2$ absorption (see discussion in Example 5).

Example 7

Determining VoptIve (the Optimum Low-Voltage Operating Voltage with Respect to Cell-Capacity or Area) and IoptIve (the Current at that Operating Voltage), Given a V/I Characteristic Operating Line for an Optimized LVE Chlor-Alkali Cell It has been demonstrated herein that lower-voltage operation lowers the power required to manufacture sodium hydroxide that is used as an absorbent fluid. Table 3 shows calculations made from the VI operating line of the 1.0/90° C. anolyte case in FIG. 5 (discussed above in Example 4).

Several points should be noted regarding the contents of Table 3:
(1) The third column, current efficiency (dimensionless), represents the proportion of current generated that is used in producing product chemicals; losses, such as $I^2R$ losses and waste heating of electrolytic fluids are the primary cause of inefficiencies. Current efficiency declines with declining voltage.
(2) Cell area is normalized for a 3.975V case (where the current density, and therefore the area requirement of the process, is identical to a std 5V electrolysis running with 3.0 kA/m² characteristic). A2/A1 (dimensionless) is calculated.

Figure 11:
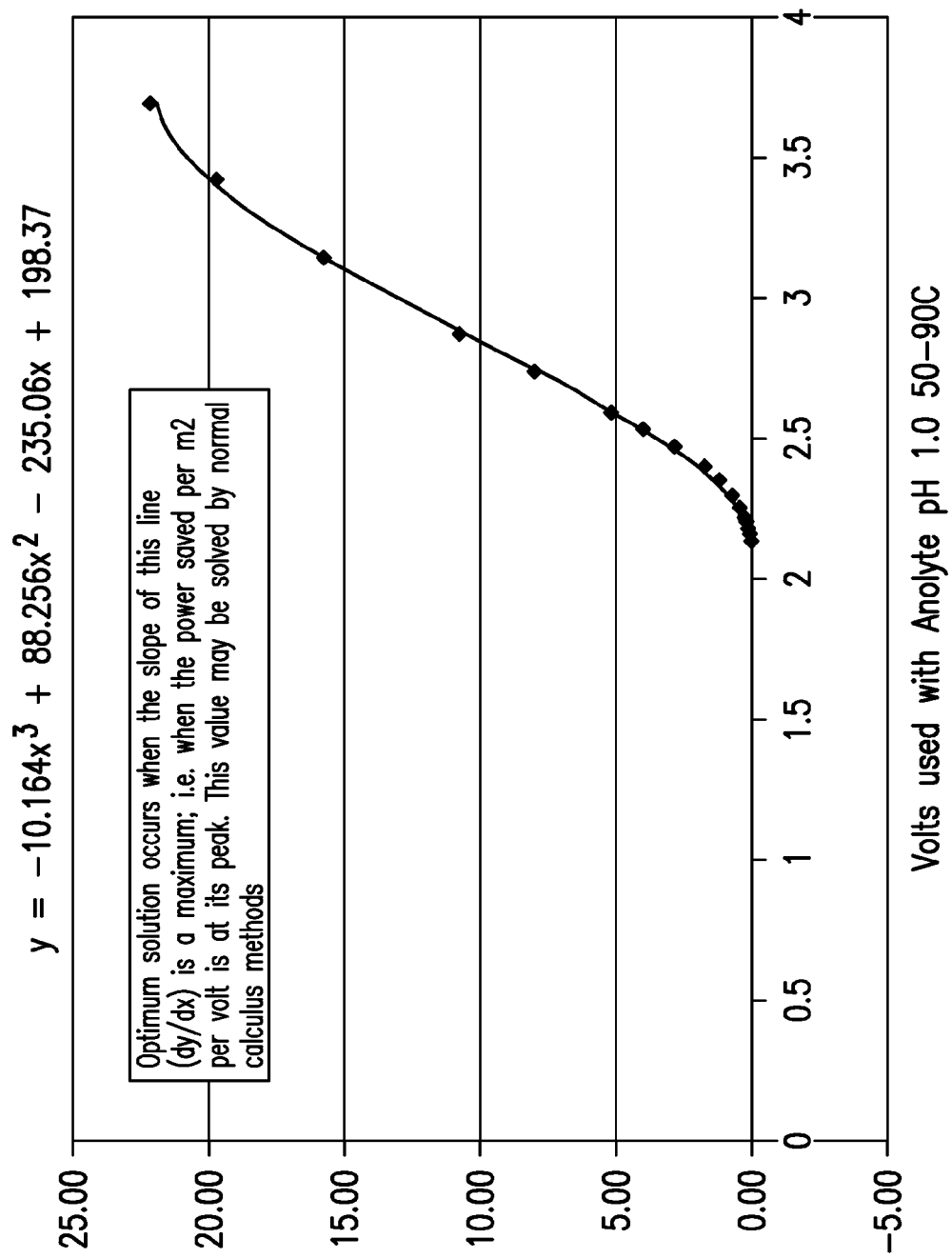
FIG. 11 is a chart showing percentage power saved per $m^2$ area of normalized LVE design.

The last term, % of power-saved per dimensionless area, is plotted in FIG. 11. For such a function, the point at which the maximum slope (change in power usage per change in voltage) represents an optimum; i.e., at low voltage (e.g. 2.1-2.5V) the slope ($\Delta power/\Delta m^2$) is relatively low, then at higher voltages (e.g. 2.5 to approximately 3), the slope ($\Delta power/\Delta m^2$) increases to a larger value, and then declines to lower slopes as the voltage continues to increase. This illustrates that there is a region of high-slope bounded by a region of low-slope on each side; i.e., on either side of that VoptIve point, the change in power usage per voltage delta is less effective.

A function that closely approximates the actual behavior was accomplished first (note the formula of the polynomial trend-line produced by least-squares fit). In this example: $y=-10.164x^3+88.256x^2-235.06x+198.37$ is a close-approximation. Then, the first-derivative of the function was calculated by typical treatment of polynomials: $dy/dx=(3)(-10.164)x^2+(2)(88.256)x-235.06=max$. Values of x (Volts) can be iterated to find the maximum of this first derivative, which can be accomplished by various techniques, resulting in 2.894V as the solution.

Note that voltages lower than 2.894V may be employed, and further power savings will result. Some preferred embodiments will optimize low-power operation below this "natural optimum point." In those cases, the additional area used in the membrane will result in a "sub-optimized" electrolysis system, but low-power operation for the overall decarbonation process may be further benefited by operating below this natural optimum for a given electrolysis sub-system. However, when doing so, the voltage/power benefit is thereafter attenuated, while the area-factor continues to proportionally make operation less efficient per area.

The current and current density that corresponds to this VoptIve can be determined by either forming a similar least-squares relationship for V and I, or by graphically using the operating curve to determine IoptIve. In this example, the calculated value is 10.419 A (or for a 0.01 m² cell area, as in this case), 1.042 kA/m².

TABLE 3

| I, Current (A) | Volts, V operating conditions: Anolyte pH 1.0, 90 Deg. C. | Current Efficiency | $\Delta(kA/m^2)/\Delta V$ | $\Delta Power/\Delta(kA/m^2)$ | Power = V*I*Eff |
|---|---|---|---|---|---|
| 30 | 3.975 | 97% | 1.82 | 0.55 | 115.67 |
| 25 | 3.7 | 96% | 1.87 | 0.53 | 88.83 |
| 20 | 3.433 | 94% | 1.87 | 0.54 | 64.62 |
| 15 | 3.165 | 91% | 1.80 | 0.56 | 43.34 |
| 10 | 2.887 | 88% | 1.79 | 0.56 | 25.30 |
| 7.5 | 2.747 | 83% | 1.74 | 0.58 | 17.15 |
| 5 | 2.603 | 78% | 1.69 | 0.59 | 10.19 |
| 4 | 2.544 | 73% | 1.49 | 0.67 | 7.41 |
| 3 | 2.477 | 67% | 1.43 | 0.70 | 4.98 |
| 2 | 2.407 | 60% | 1.19 | 0.84 | 2.90 |
| 1.5 | 2.365 | 54% | 0.89 | 1.12 | 1.92 |
| 1 | 2.309 | 49% | 0.64 | 1.57 | 1.13 |
| 0.7 | 2.262 | 44% | 0.61 | 1.65 | 0.70 |
| 0.5 | 2.229 | 40% | 0.62 | 1.60 | 0.44 |
| 0.4 | 2.213 | 36% | 0.32 | 3.10 | 0.31 |
| 0.3 | 2.182 | 32% | 0.56 | 1.80 | 0.21 |
| 0.2 | 2.164 | 29% | 0.23 | 4.40 | 0.12 |
| 0.1 | 2.12 | 26% | 0.00 | 212.00 | 0.05 |

TABLE 3-continued

| I, Current (A) | Cell Area A2/A1 | % of STD Power/ kgmole | % Power Saved by Reduced V | Δpowersaved/ m² |
|---|---|---|---|---|
| 30 | 1.000 | 77% | 23% | |
| 25 | 1.302 | 71% | 29% | 22.22 |
| 20 | 1.790 | 65% | 35% | 19.77 |
| 15 | 2.669 | 58% | 42% | 15.82 |
| 10 | 4.572 | 51% | 49% | 10.80 |
| 7.5 | 6.744 | 46% | 54% | 8.05 |
| 5 | 11.357 | 41% | 59% | 5.22 |
| 4 | 15.619 | 37% | 63% | 4.03 |
| 3 | 23.248 | 33% | 67% | 2.87 |
| 2 | 39.873 | 29% | 71% | 1.78 |
| 1.5 | 60.121 | 26% | 74% | 1.24 |
| 1 | 102.631 | 23% | 77% | 0.75 |
| 0.7 | 166.292 | 20% | 80% | 0.48 |
| 0.5 | 262.506 | 18% | 82% | 0.31 |
| 0.4 | 367.228 | 16% | 84% | 0.23 |
| 0.3 | 551.770 | 14% | 86% | 0.16 |
| 0.2 | 927.267 | 12% | 88% | 0.09 |
| 0.1 | 2103.359 | 11% | 89% | 0.04 |

Example 8

CO₂ Reduction Utilizing Calcium Carbonate

The following embodiment is one further example in which the general concepts described above can be tuned to benefit particular applications, favor production of particular end products, decrease the amount of $CO_2$ produced by the process, and/or increase the energy efficiency of a plant. Based on teachings provided in the specification, a person of ordinary skill in the art will understand that there are multiple other manners in which to adjust the inputs, outputs and energy efficiency of the invention.

Embodiments described in this example may be of use where it is advantageous to reduce $CO_2$ emissions by 50% without requiring the neutralization of large quantities of chlorine in alkali deposits. Such embodiments may come at the expense of altering the operation of the plant burner with a process that is not strictly a post-combustion process.

As explained above, in certain exemplary embodiments of the present disclosure, hydrochloric acid is added to the sodium chloride brine feed of a low power chlor-alkali electrolysis cell, allowing the following reaction to occur:

$$H_2O+NaCl+aHCl+energy \rightarrow NaOH+(\frac{1}{2}+a/2)H_2+(\frac{1}{2}+a/2)Cl_2.$$

In other embodiments, hydrochloric acid may not be added, providing for the following reaction:

$$2NaCl+2H_2O+energy \rightarrow 2NaOH+H_2+Cl_2$$

In these embodiments, hydrogen, and sodium hydroxide are produced. As explained above, the sodium hydroxide can be used to absorb carbon dioxide from a waste stream to create sodium carbonate and sodium bicarbonate. The sodium carbonate and bicarbonate can be used beneficially in numerous applications. For example, slurry mixtures of sodium bicarbonate and sodium carbonate can be slurried to tank-car for use in various forms of detergent manufacture, in glass manufacture as a flux, etc., as well as previously-mentioned water-treatment uses.

In certain embodiments incorporating power plant applications utilizing this technology, the hydrogen can be returned, unpressurized to the burner of the power plant and combusted. The "higher-heat-value" (HHV) of the hydrogen may be liberated, and turned to steam at relatively high efficiencies. In certain applications, efficiencies of 88% may be achieved. The large-scale combustion of hydrogen can have a noticeable effect upon the operating parameters of the power plant in general. For example, in certain embodiments, a power plant can be converted from a coal-powered process (with a hydrogen:carbon ratio of 0.0), to a "hybrid hydrocarbon" plant, with a hydrogen:carbon ratio of 1.0. Such a power plant will produce more water in the flue gas as a result of the hydrogen combustion. In addition, the temperature of the burner will be increased, due to the combustion of hydrogen/carbon mixtures, which burn at a higher temperature than carbon alone.

A hybrid hydrocarbon plant (with a H:C ratio of 1.0) would produce power per ton of $CO_2$ at a rate somewhere between a coal-powered plant (with an H:C ratio of 0.0) and a natural gas-powered plant (with an H:C ratio of 3.73). Typical coal-powered plants produce power at an average rate of 1051 kwh/ton $CO_2$, while typical natural-gas powered plants produce power at an average rate of 1667 kwh/ton $CO_2$. Assuming the increase in power produced per ton of $CO_2$ emissions was linearly related to the H:C ratio, the hybrid hydrocarbon plant power production would increase by 154 kwh/ton $CO_2$ to a rate of 1205 kwh/$CO_2$. It is possible that the actual hybrid hydrocarbon plant increases would be greater, as the increase in produced power per ton of $CO_2$ may not be directly linear. With the combustion of hydrogen, the hybrid hydrocarbon plant has not only benefited from the HHV of the hydrogen (903 kwh/$CO_2$), but has also increased efficiency due to the higher burner temperature (projected 154 kwh/$CO_2$).

In addition to utilizing the hydrogen produced, the chlorine may also be put to beneficial use in certain embodiments. Specifically, the chlorine may be moved, under native pressure, through water, where it dissociates fully, forming hydrochloric acid and hypochlorous acid according to the following equation:

$$Cl_2+H_2O \rightarrow HOCl+HCl$$

With the addition of a photon (provided by sunlight, or stimulated by ultraviolet light), the unstable hypochlorous acid (HOCl) decays, giving off oxygen according to the following equation:

$$HOCl+HCl+h\nu 363\ nm \rightarrow 2HCl+\frac{1}{2}O_2$$

In certain embodiments, the oxygen may be returned (unpressurized at native pressure) to the inlet of the power plant burner. The presence of oxygen further increases the intensity of combustion in the power-plant burner and raises the operating temperature (as well as the efficiency). In certain embodiments, the estimated increase in efficiency is 5-10% in kwh/ton $CO_2$. An increase of this magnitude would yield an increase of 60 to 120 kwh/ton $CO_2$ for a typical power plant, and could improve overall power-plant efficiency from a baseline of 33% to 34.5% through 35.5%.

In certain embodiments, disposal of the hydrochloric acid could be accomplished by combining the acid with calcium carbonate (readily available, and found in sources such as limestone) according to the following equation:

$$2HCl+CaCO_3 \rightarrow CaCl_2+CO_2(g)$$

Considering that a goal was to remove $CO_2$ from a stream, the combination of hydrochloric acid with calcium carbonate may seem counterintuitive since $CO_2$ is produced. However, a closer examination of the chemical reactions used illustrates that only 50% of the $CO_2$ originally absorbed by the sodium hydroxide (NaOH) is released when the hydrochloric acid is combined with calcium carbonate. Specifically, each Na-ion absorbs one $CO_2$ molecule (into bicarbonate) and each Na-ion produces one Cl-ion. In addition, each the destruction of each $CaCO_3$ molecule absorbs two Cl-ions (forming $CaCl_2$). Therefore, the amount of released $CO_2$ is one-half of the amount of absorbed $CO_2$. The $CO_2$ generated will contain some degree of native pressure, which may be run through a turbine to recover some degree of power from it.

In certain embodiments, the energy consumed in the process described above is relatively low, especially when compared to other $CO_2$ removal processes. For example, the total power required may be defined as:

Power=(−Electrolysis+HHV−$H_2$)+[H:C ratio efficiency+$O_2$ efficiency+$CO_2$ efficiency]

The following values may be used to estimate the power requirements of the $CO_2$ removal:

(−Electrolysis+HHV−$H_2$)=−347 kwh/ton $CO_2$ (according to soon-to-be published research by Southwest Research Institute; this value excludes all waste-heat effects and protonation effects).

H:C ratio efficiency=+154 kwh/ton $CO_2$ (assuming a linear relation between coal and natural gas, which is likely a conservative estimate)

$O_2$ efficiency=+60 kwh/ton $CO_2$ (conservative lower value)

$CO_2$ efficiency=+0 (assuming that no power is recovered by running $CO_2$ through a turbine)

In certain embodiments, the total power required for the $CO_2$ removal would therefore be 133 kwh/ton $CO_2$. If used on a plant generating 1260 kwh/ton $CO_2$, then 10.5% of the power generated by the plant could be used to reduce $CO_2$ emissions by 50%. Such a system would compare favorably to existing $CO_2$ removal systems using amines, which may use 47% of the power generated by a plant to reduce $CO_2$ emissions by 90%.

Example 9

Ecological Efficiency of Various Modeled Power Plants

In examining the effect of operating temperature on the electrolysis reaction, it is important to remember that the (gross) thermodynamic penalty of the process is:

$E_{penalty} = -E_{electrolysis} + E_{hydrogen}$

It has been discovered that, at standard temperature (25 C) and pressure (1 atm), the Gibbs energy requires that the minimum energy to accomplish the electrolysis is −1230.6 kwh/ton $CO_2$ and that the theoretical maximum energy returnable from the hydrogen is 903.6 kwh/ton $CO_2$, given an energy penalty at 25 C of (−1230.6−903.6)=−327 kwh/ton $CO_2$.

At elevated temperatures, the energy required to accomplish the electrolysis goes down, as the Gibbs free energy (which governs the voltage at which electrolysis occurs) calculation changes; however, and importantly, the energy recoverable from the hydrogen remains constant. Therefore, should operation at higher temperatures be accomplished, the energy-penalty of the overall operation is reduced. Indeed, at some higher temperature, the energy required for electrolysis will equate with that of the hydrogen energy-return, and the process will have an apparent zero-energy penalty.

In the case where hydrogen-produced-by-this-method displaces hydrogen-produced-by-methane-reformation, one can calculate that the methane, when consumed at today's technology, will recover 887 kwh/ton $CO_2$. Setting that as the figure for energy-return (as opposed to the theoretical value of 903.6 kwh/ton $CO_2$), and extending the temperature to approximately 301 C for the electrolysis reaction, one arrives at an electrolysis reaction that itself consumes ~887 kwh/ton $CO_2$; i.e., this is a first-order "zero energy penalty" solution.

Close observation will discover that, at this operating point, heat-energy (the source of the 300 C+ heat, for this example) is being converted into lower-electrical energy. This is the conversion of one energy source (heat) into another energy source, or fuel (hydrogen); as such, the carbon dioxide sequestration process operates throughout its range to convert otherwise "waste heat" into fuel or electrical energy.

Operating an electrolysis process at elevated temperatures is not an unknown process; electrolysis of water (producing hydrogen and oxygen) has been driving toward higher operating temperatures for several decades, and has achieved dramatic energy-penalty reductions by doing so. The carbon dioxide sequestration processes described herein can utilize elevated temperatures (from waste-heat sources at power-plants) to accomplish the same thing. Similarly, vapor-phase electrolysis can be employed in chlor-alkali electrolysis to lower energy penalties.

Elevated temperature operation requires that materials used in the chlor-alkali cells be able to withstand the high temperatures (and resulting high pressures) that occur when large quantities of thermal energy are brought-to-bear. Many of the materials used in standard chlor-alkali cells will need to be upgraded or replaced with materials suitable for the design and operating point chosen.

All of the methods and devices disclosed and claimed herein can be made and executed without undue experimentation in light of the present disclosure. While the methods and devices of this invention have been described in terms of preferred embodiments, it will be apparent to those of skill in the art that variations may be applied to the methods and devices and in the steps or in the sequence of steps of the method described herein without departing from the concept, spirit, and scope of the invention. More specifically, it will be apparent that certain compositions which are chemically related may be substituted for the compositions described herein while the same or similar results would be achieved. All such similar substitutes and modifications apparent to those skilled in the art are deemed to be within the spirit, scope, and concept of the invention as defined by the appended claims.

REFERENCES

The following references, to the extent that they provide exemplary procedural or other details supplementary to those set forth herein, are specifically incorporated herein by reference.

"Annual Energy Outlook 2005 (AEO2005)," prepared by the Energy Information Administration, available through National Energy Information Center, EI-30, Washington, D.C.

"Carbonate Chemistry for Sequestering Fossil Carbon," by Klaus S. Lackner, in Annual Review of Energy Environment, 2002, by Annual reviews.

"Effects of the Operating Pressure On The Performance of Electrolytic Cell at Elevated Temperatures," by Y. Ogata, M. Yasuda, and F. Hine, Nagoya Institute of Technology, Japan. In Proceedings of the Symposium on Electrochemical Engineering in the Chlor-Alkali and Chlorate Industries, The Electrochemical Society, 1988.

"Electrochemical Hydrogen Technologies—Electrochemical Production and Combustion of Hydrogen," edited by Hartmut Wendt, Institute fur Chemische Technologie, Stuttgart, Elsevier Press 1990.

"Electrochemical Process Engineering—A Guide to the Design of Electrolytic Plant," by F. Goodridge and K. Scott, University of Newcastle upon Tyne, 1995.

"Exergy Study of the Kalina Cycle," by Goran Wall, Chia-Chin Chuang, and Masaru Ishida, presented at 1989 American Society of Mechanical Engineers (ASME), Winter Annual Meeting, San Francisco, Calif., December 1989, published in "Analysis and Design of Energy Systems: Analysis of Industrial Processes AES Vol. 10-3, pp 73-77 ASME.

"Industrial Electrochemistry," $2^{nd}$ Edition, edited by Derek Pletcher and Frank Walsh, 1990.

"Modern Chlor-Alkali Technology," edited by M. O. Coultier, Society for the Chemical Industry, London, 1980.

"Modern Chlor-Alkali Technology," Volumes 1-7, The Royal Society of Chemistry Information Services, 1998.

"Some Guidelines for Analysis, Design, and Operational Principles of Bubble Column Reactors," and other selected information contained in "Bubble Column Reactors," by Wolf-Dieter Deckwer, Gesellschaft fur Biotechnologische Forschung mbH, Braunsweig, Germany, translated by Robert Field, 1991 ISBN 0-471-91811-3.

"Transport and Structure in Fuel Cell Proton Exchange Membranes," by Michael Anthony Hickner, dissertation submitted to the faculty of Virginia Polytechnic Institute and State University, 2003.

FIG. 8. "CO2 Absorption vs. (Low) Interfacial Gas Velocity at Various Column Heights of 0.18M Sodium Hydroxide Solution in an Unpacked Sparged Bubble Column," from A. Schumpe thesis, University of Hanover, 1978.

Klara in: *EIA Emissions of Greenhouse Gases in the U.S. 2000*, EPGA $3^{rd}$ Annual Power Generation Conference, Hershey Pa., 2002.

Mandal, et al., *J. Chem. Engineering (Canada)*, 81:212-219, 2003.

Shah et al., *AiCHE J.*, 28(3):353-379, 1982.

*Unit Operations of Chemical Engineering*, McGraw-Hill, $3^{rd}$ edition © 1976, "Gas Absorption" pp. 707-743, after Eckert.

Wie-rong et al., *J. Zhejiang University Science*, ISSN 1009-3095, 2004.

What is claimed is:

1. A method of separating heavy metals and carbon dioxide from an incoming flue-gas stream, comprising:
    obtaining a water-condensate containing heavy metals from the incoming flue-gas stream, thereby producing a dry flue-gas stream;
    obtaining a chloride salt;
        admixing the salt with water, steam, or both to produce a solution;
    electrolyzing the solution to produce a hydroxide and chlorine gas;
        admixing a portion of the hydroxide with the dry flue-gas stream to produce carbonate products, bicarbonate products, or a mixture of carbonate and bicarbonate products in an admixture;
        separating said carbonate and/or bicarbonate products from the admixture, thereby removing carbon dioxide from the incoming flue-gas stream;
        adding to the water-condensate a precipitation agent comprising a portion of the hydroxide to change the pH of the water-condensate from acidic to basic, resulting in precipitation of the heavy metals; and
    passing the water-condensate through a filtering medium.

2. The method of claim 1, wherein the filtering medium comprises activated charcoal.

3. The method of claim 1, wherein the condensate is gravity-fed through the filtering medium.

4. The method of claim 1, wherein the condensate is actively pumped through the filtering medium.

5. The method of claim 1, wherein the precipitation agent consists of the portion of the hydroxide.

6. The method of claim 1, wherein the heavy metals comprise mercury and one or more heavy metals selected from a group consisting of selenium, chromium, arsenic, lead, germanium, and vanadium.

7. The method of claim 1, wherein obtaining a water-condensate from the incoming flue-gas stream comprises separating the water condensate from the incoming flue-gas stream.

8. The method of claim 1, wherein the hydroxide used as the precipitation agent is formed solely from the electrolyzing step.

* * * * *